United States Patent [19]

Fuduka et al.

[11] Patent Number: 5,495,417
[45] Date of Patent: Feb. 27, 1996

[54] SYSTEM FOR AUTOMATICALLY PRODUCING DIFFERENT SEMICONDUCTOR PRODUCTS IN DIFFERENT QUANTITIES THROUGH A PLURALITY OF PROCESSES ALONG A PRODUCTION LINE

[75] Inventors: Etsuo Fuduka; Masayoshi Tazawa; Kazuyki Miura; Tomiko Takano; Yuichi Satoguchi; Yuichiro Ozaki, all of Tokyo, Japan

[73] Assignee: Kabushiki Kaisha Toshiba, Kawasaki, Japan

[21] Appl. No.: 31,881

[22] Filed: Mar. 16, 1993

Related U.S. Application Data

[63] Continuation-in-part of Ser. No. 745,256, Aug. 14, 1991, abandoned.

[30] Foreign Application Priority Data

| Aug. 14, 1990 | [JP] | Japan | 2-213782 |
| Sep. 13, 1990 | [JP] | Japan | 2-241107 |
| Feb. 5, 1991 | [JP] | Japan | 3-014422 |
| Mar. 16, 1992 | [JP] | Japan | 4-058248 |
| Sep. 29, 1992 | [JP] | Japan | 4-259769 |
| Nov. 13, 1992 | [JP] | Japan | 4-303579 |
| Feb. 24, 1993 | [JP] | Japan | 5-035321 |
| Mar. 4, 1993 | [JP] | Japan | 5-043726 |
| Mar. 11, 1993 | [JP] | Japan | 5-050432 |

[51] Int. Cl.$^6$ ............................. G05B 13/04
[52] U.S. Cl. ............... 364/468; 364/149; 364/578
[58] Field of Search ............... 364/468, 149–151, 364/478, 578, 401–403; 437/7, 8, 51

[56] References Cited

U.S. PATENT DOCUMENTS

| 4,646,238 | 2/1987 | Carlson, Jr. et al. | 364/468 |
| 4,796,194 | 1/1989 | Atherton | 364/468 |
| 4,807,108 | 2/1989 | Ben-Arieh et al. | 364/468 |
| 4,901,242 | 2/1990 | Kotan | 364/468 |
| 5,319,564 | 6/1994 | Smayling et al. | 364/468 |

*Primary Examiner*—James P. Trammell
*Attorney, Agent, or Firm*—Oblon, Spivak, McClelland, Maier & Neustadt

[57] ABSTRACT

A system for automatically producing semiconductor products has a section for preparing a process flow containing a series of processes and process conditions for producing different semiconductor products in different quantities in a production line; a section for simulating the producing of semiconductor products according to the process flow; a section for feeding a result of the simulation back to the process flow preparation section, which optimizes the process flow according to the simulation result; and a section for producing semiconductor products according to the optimized process flow.

24 Claims, 62 Drawing Sheets

| FIG.1a | FIG.1b |

FIG.2

```
A:Y DEMO.ELQ
NUMBER  ----|--->--1>----|----2----|----3----|----4----|----5----|----6----|----7--
   1    ****************************CHARGE*********************************************↓
   2    WORK,TRW;WNAME=  71  ,NWAFER=24,TYPE=CMOS,ISO=ACO3,FILE=REQUEST,INDICAT
   3    ',↓
   4    TRT,BTRT:MODE=NCC,TP=(ON,RE);↓
   5    OXIDIF,OX;OBJECT=FIELD,GAS=0,TEMP=1000,THICK=11000(1100);↓
   6       QC,FTHK;ID=1,OBJECT=,FILM=ASI02,POINT=1,THICK=11000(1100),TP=(OF
   7
   8
   9                                          - - - - - - - - - - -
  10
  11
  12
  13
  14
  15
  16    OXIDIF,OX;OBJECT=BUFFER,COMMENT=3rd-OX,GAS=0,TEMP=950,THICK=1000(100)
  17       QC,FTHK;ID=1,OBJECT=,FILM=ASI02,THICK=1000(100),POINT=1,TP=(OFF,
  18    ',↓
  19    WORK,OUT:;****************************DISCHARGE*****************************↑
  20    LEOF|
```

| MENU1 | MENU2 | MENU3 | SPLIT | FIND | SEL | CUT | COPY | PASTE | FAGJP |

| OXDIF | DIFF |
|---|---|
| GAS=BOX | YET |
| GAS=O2 | DRY |
| GAS=N2 | NIT |

|  | Temp 1 | Temp 2 | Time | gas 1 | gas 2 |
|---|---|---|---|---|---|
| Step 1 |  |  |  |  |  |
| Step 2 |  |  |  |  |  |
| Step 3 |  |  |  |  |  |

FIG. 13A

```
ATE=NO;
TRT,BTRT:MODE=NCC

OCF:THK:ID=1,OBJECT=,FILM=U

LIT,PEP:PNUM=1,MASK=EP0681;

OC,INSP:OBJECT=MSP;

TRT,BTRT:MODE=NCD,TP=(ON,RE);

OC,FTHK:ID=2,OBJECT=,FILM=ASIO2,
TRT,BTRT:MODE=NCD;
```

```
NORE DAT,PSX
*
*          * * * * * * * * * * * * * * * * * *
*          *                                 *
*          *   DATA FOR PROCESS S1           *
*          *   PULATOR TOPAZ V100            *
*          *   CROATED FROM PDLFLW DATA.     *
*          *                                 *
*          * * * * * * * * * * * * * * * * * *
*
* INIT DIMENSION=1 SILICON ORIENT=100 THICK=20 NSPACE=200 PHOSPHORUS=
* DE15
* * * * * * * * * * * * * * * * * * * * * * * * * * * * * * * * * * *
*
* DIFF WET TEMP=950 TOX=Q
*
* IMPL P ENERGY=50 DOSE=2
*
* DIFF WET TEMP=950 TOX=Q
```

31, 32, 33

FIG.19
|  | FILM A | FILM B |  |
|---|---|---|---|
| PROCESS a | OK | NG |  |
| PROCESS b | NG |  |  |
|  |  |  |  |
FIG.20
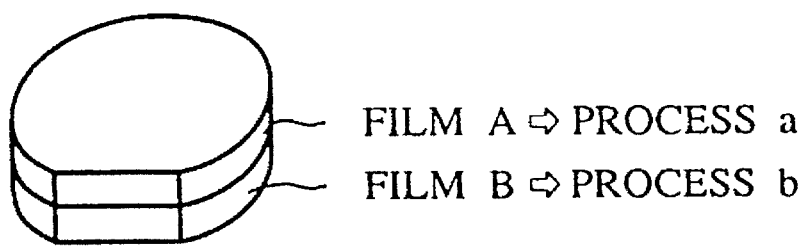
FILM A ⇨ PROCESS a
FILM B ⇨ PROCESS b
FIG.21
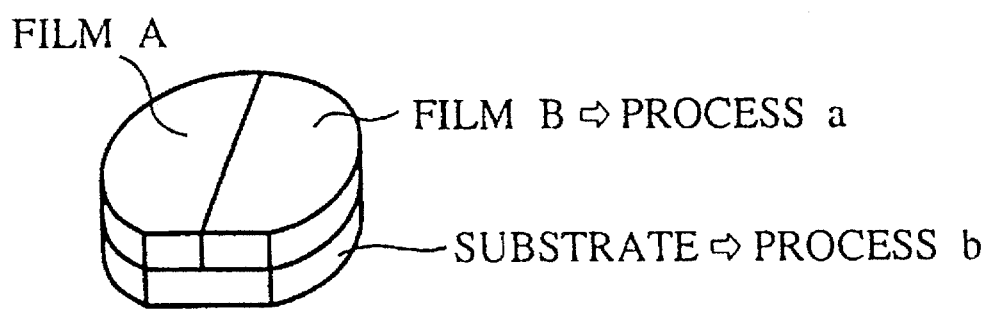
FILM A
FILM B ⇨ PROCESS a
SUBSTRATE ⇨ PROCESS b

| | C | |
|---|---|---|
| PROCESS a | OK | |
| PROCESS b | NG | |
| | | |

SUBSTRATE ⇨ PROCESS a

FILM C ⇨ PROCESS b

| | FILM A | FILM B | FILM C | |
|---|---|---|---|---|
| PROCESS b | OK | OK | NG | |
| | | | | |

FIG.25
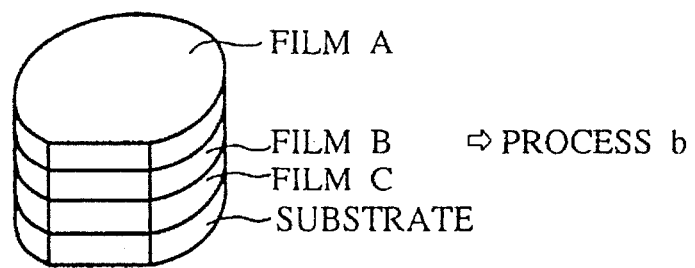
- FILM A
- FILM B
- FILM C
- SUBSTRATE
⇨ PROCESS b
FIG.26
|  | DIFFUSION FURNACE D |  |
|---|---|---|
| DIFFUSION FURNACE E | OK |  |
| DIFFUSION FURNACE F | NG |  |
FIG.27
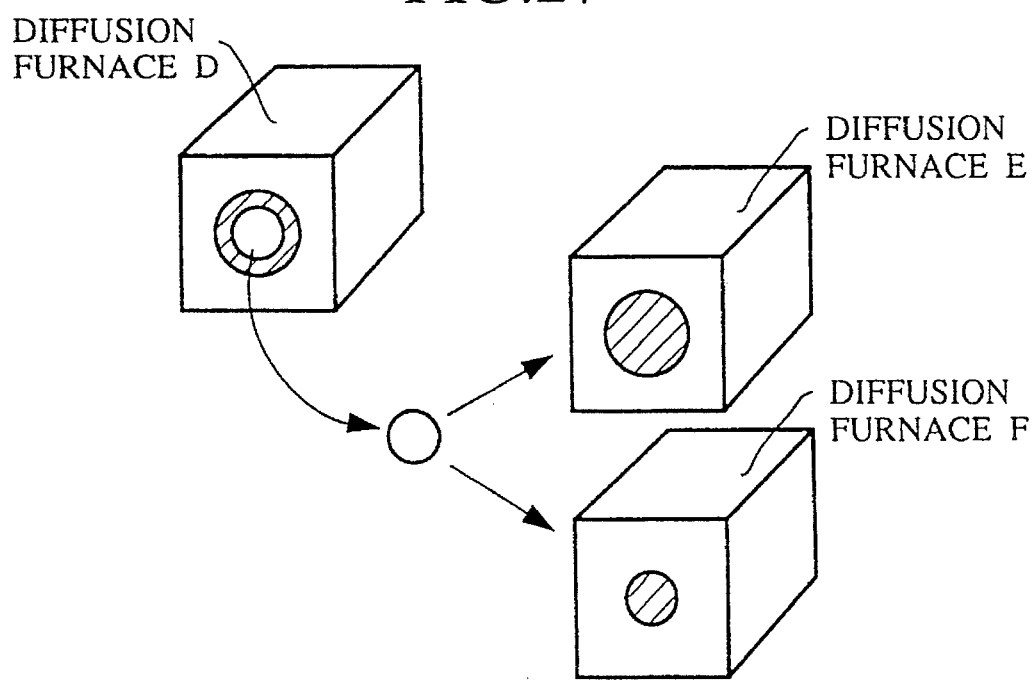

FIG.28

| PROCESS (A) | PROCESS (B) | INDISPENSABLE BETWEEN A AND B | NEVER REQUIRED BETWEEN A AND B | SPECIAL PROCESS | ERROR CODE |
|---|---|---|---|---|---|
| LITHOGRAPHY | RESIST REMOVAL | — | THERMAL OXIDATION | — | 005 |
| LITHOGRAPHY | LITHOGRAPHY | RESIST REMOVAL | — | — | 006 |

FIG.31

| ORIGINAL PROCESS | SUBJECT PROCESS | POSITION | PRESENCE | ERROR CODE |
|---|---|---|---|---|
| THERMAL OXIDATION | PRECLEANING | BEFORE | INDISPENSABLE | 009 |
| ALUMINUM FILM DEPOSITION | PRECLEANING | BEFORE | | 008 |

FIG.32
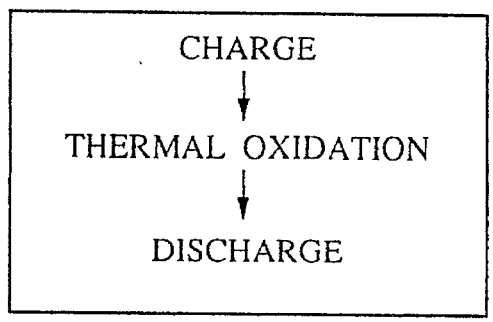
FIG.33
| ORIGINAL PROCESS | SUBJECT PROCESS | ERROR CODE |
|---|---|---|
| CHARGE | RESISTIVITY MEASUREMENT | 010 |
|  |  |  |
FIG.34
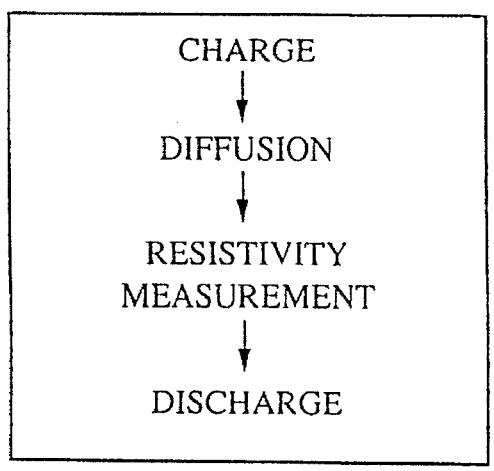

FIG.35

| TP REQUIRING PROCESS | TP INSERTION POSITION | KIND OF TP | ERROR CODE |
|---|---|---|---|
| ALUMINUM FILM DEPOSITION | PRECLEANING | A | 013 |

FIG.37

| PROCESS | PROCESS | PROCESS | PROCESS | PROCESS | PROCESS | PROCESS | ERROR CODE |
|---|---|---|---|---|---|---|---|
| CHAIN PROCESS START | PRECLEANING | OXIDATION | THICKNESS MEASURMENT | ALUMINUM FILM DEPOSITION | THICKNESS MEASURMENT | END | 00A |

| ERROR CODE | MESSAGE |
|---|---|
| 008 | NO PRECLEANING BEFORE FILM DEPOSITION |

CHARGE
↓
ALUMINUM FILM DEPOSITION
↓
THICKNESS MEASUREMENT
↓
DISCHARGE

| CHECKER | CHECK ? |
|---|---|
| FACE CHECKER | YES |
| BACK CHECKER | YES |
| SUBSTRATE CHECKER | NO |

FIG. 42

```
1  '****************************CHARGE*********************************↓
2  WORK,TRW;WNAME=  71  ,NWAFER=24,TYPE=CMOS,ISO=ACO3,FILE=REQUEST,INDICAT
3  ',↓
4  TRT,BTRT:MODE=NCC,TP=(ON,RE);↓
5     OXIDIF,OX;OBJECT=FIELD,GAS=0,TEMP=1000,THICK=11000(1100);↓
6        QC,FTHK;ID=1,OBJECT=,FILM=ASIO2,POINT=1,THICK=11000(1100),TP=(OF
7
8
9
10
11
12
13
14
15
16     OXIDIF,OX;OBJECT=BUFFER,COMMENT=3rd-OX,GAS=0,TEMP=950,THICK=1000(100)
17        QC,FTHK;ID=1,OBJECT=,FILM=ASIO2,THICK=1000(100),POINT=1,TP=(OFF,
18  ',↓
19  WORK,OUT;'**************************DISCHARGE*****************************↓
```

FIG.44

PROCESS FLOW

CHARGE, NUMBER OF PRODUCTS = 6

BRANCHING, NUMBER OF BRANCHES = 3,
NUMBER OF BRANCHED PRODUCTS = (MAIN=2,BRANCH 1=2,BRANCH2=2)
PRODUCT NUMBERS =(MAIN=1AND2,BRANCH1=3AND4 BRANCH2=5AND6)

JOINING

BRANCHING, NUMBER OF BRANCHES = 2,
NUMBER OF BRANCHED PRODUCTS = (MAIN=3,BRANCH1=3)
PRODUCT NUMBERS =(MAIN=1,3AND5,BRANCH1=2,4AND6)

JOINING

DISCHARGE

FIG.46

| BRANCHING \ PRODUCT NUMBER | 1 | 2 | 3 | 4 | 5 | 6 |
|---|---|---|---|---|---|---|
| FIRST | ① | ⓪ | ① | ① | ② | ② |
| SECOND | ⓪ | ① | ⓪ | ① | ⓪ | ② |

FIG.47

| BRANCHING \ PRODUCT NUMBER | 1 | 2 | 3 | 4 | 5 | 6 |
|---|---|---|---|---|---|---|
| FIRST | ① | ⓪ | ① | ① | ② | ② |
| SECOND | ⓪ | ① | ⓪ | ① | ⓪ | ② |
| PATTERN | a | b | c | d | e | f |

FIG.51

Table 123:

| HEADER | SUB-DIVISION | VARIABLE | | | |
|---|---|---|---|---|---|
| A | AA1 | PR1 | PR2 | PR4 | ...... |
|  | AA2 | PR1 | PR2 | ...... | ...... |

FIG.52

Table 124:

| VARIABLE | CONDITION VALUE | | | |
|---|---|---|---|---|
|  | $SiO_2$ | SiN | Si |  |
| FILM | BORON | PHOS | $A_5$ |  |
| ELEMENT |  |  |  | $BF_2$ |
|  | ...... | ...... | ...... | ...... |

FIG.53

Table 125:

| SUB-DIVISION | TYPE | VARIABLE 1 | CONDITION VALUE | VARIABLE 2 | CONDITION VALUE | ...... | A GROUP OF EQUIPMENTS | RECIPE CODE FOR EACH EQUIPMENT |
|---|---|---|---|---|---|---|---|---|
| A | AA | VL | PRI | VR | PR2 | ...... | GROUP A-1 | MMMMM |
| ...... | ...... | ...... | ...... | ...... | ...... |  | ...... | ...... |

FIG.54

| PROCESS | LOWER LIMIT | UPPER LIMIT | TARGET VALUE | 126 |
|---|---|---|---|---|
| A | | | 0 10 20 30 ······ 100 | |
| B | 10 | 50 | ·········· | |
| - | - | - | | |

FIG.55

| PROCESS 1 | PROCESS 2 | SEQUENTIAL RELATIONSHIP | 127 |
|---|---|---|---|
| A | B | FOLLOWING | |
| A | C | PROCEEDING | |
| - | - | | |
| - | - | | |

FIG.56

| PROCEEDING PROCESS \ FOLLOWING PROCESS | PROCESS A | PROCESS B | PROCESS C | ········ | 128 |
|---|---|---|---|---|---|
| PROCESS a | 2 | 1 | 0 | ········ | |
| PROCESS b | 0 | 0 | 3 | ········ | |
| PROCESS c | 0 | 1 | 4 | ········ | |
| - | - | - | - | | |

0 : OK  2 : SHOULD BE PROCESS T
1 : NG  3 : SHOULD BE PROCESS U
        4 : ············

FIG.57

| PROCESS IN A PACKAGE | | ACCEPTABLE OR NOT | 129 |
|---|---|---|---|
| PROCESS A | | OK | |
| PROCESS A | PROCESS B | NG | |
| | PROCESS C | NG | |
| | ⋮ | | |

FIG.59

| PROCESS, VARIABLE, AND PARAMETER | SUPPLEMENTARY DATA |
|---|---|
| (OXIDATION) AND (TEMP=1000°C) AND (GAS=STEAM) | ADD (TIME=100 MIN, DIELECTRIC STRENGTH=EXCELLENT) |

FIG.60

. . .
OXIDATION, TEMP=1000°C, · · ·, GAS=STEAM
. . .

FIG.61

. . .
OXIDATION, TEMP=1000°C, · · ·, GAS=STEAM, TIME=100 MIN, DIELECTRIC STRENGTH=EXCELLENT
. . .

FIG.62

| PATTERN | 1ST PROCESS, (OXIDATION) AND (THICKNESS≥900 Å) |
|---|---|
| | 2ND PROCESS, (DEPOSITION) AND (FILM=SILICON NITRIDE) |
| | 3RD PROCESS, (LITHOGRAPHY) AND (PATTERN=LOCOS) |
| | 4TH PROCESS, (REMOVAL) AND (FILM=SILICON NITRIDE) |
| | 5TH PROCESS, (REMOVAL) AND (FILM=RESIST) |
| | 6TH PROCESS, (OXIDATION) AND (GAS=STEAM) |
| | 7TH PROCESS, (REMOVAL) AND (FILM=SILICON NITRIDE) |
| NAME | ADD (ELEMENT SEPARATION) |
| CONFIDENCE | ADD (90%) |

FIG.63

| | |
|---|---|
| | . . . . |
| 10 | OXIDATION, THICKNESS=1000 Å, · · · |
| 11 | DEPOSITION, FILM=SILICON NITRIDE, THICKNESS=1000 Å, · · · |
| 12 | LITHOGRAPHY, PATTERN=LOCOS, · · · |
| 13 | REMOVAL, FILM=SILICON NITRIDE, THICKNESS=1000 Å, · · · |
| 14 | REMOVAL, FILM=RESIST, · · · |
| 15 | OXIDATION, GAS=STEAM, · · · |
| 16 | REMOVAL, FILM=SILICON NITRIDE, THICKNESS=1000 Å, · · · |
| | . . . . . |

FIG.64

. . .
RANGE=10 TO 16, PATTERN NAME=ELEMENT SEPARATION, CONFIDENCE=90%
. . .

FIG.65

| PATTERN | 1ST PROCESS, (OXIDATION) AND (THICKNESS≧900 Å) |
|---|---|
| | 2ND PROCESS, (LITHOGRAPHY) AND (PATTERN=P-WELL) |
| | 3RD PROCESS, (ION INJECTION) AND (ION=BORON) |
| | 4TH PROCESS, (REMOVAL) AND (FILM=SILICON OXIDE) |
| | 5TH PROCESS, (REMOVAL) AND (FILM=RESIST) |
| NAME | ADD (P-WELL FORMATION) |
| CONFIDENCE | ADD (90%) |
| . . . | |
| PATTERN | 1ST PROCESS, (OXIDATION) AND (THICKNESS≧900 Å) |
| | 2ND PROCESS, (LITHOGRAPHY) AND (PATTERN=N-WELL) |
| | 3RD PROCESS, (ION INJECTION) AND (ION=ARSENIC) |
| | 4TH PROCESS, (REMOVAL) AND (FILM=SILICON OXIDE) |
| | 5TH PROCESS, (REMOVAL) AND (FILM=RESIST) |
| NAME | ADD (N-WELL FORMATION) |
| CONFIDENCE | ADD (90%) |
| . . . | |
| PATTERN | 1ST PATTERN, P-WELL FORMATION |
| | 2ND PATTERN, N-WELL FORMATION |
| NAME | ADD (WELL FORMATION) |
| CONFIDENCE | ADD (95%) |

FIG.67

```
. . .
RANGE=10 TO 14, PATTERN NAME=P-WELL FORMATION, CONFIDENCE=90%
RANGE=15 TO 19, PATTERN NAME=N-WELL FORMATION, CONFIDENCE=90%
RANGE=10 TO 19, PATTERN NAME=WELL FORMATION, CONFIDENCE=95%
. . .
```

FIG.66

| | |
|---|---|
| | ... |
| 10 | OXIDATION, THICKNESS=1000 Å, · · · |
| 11 | LITHOGRAPHY, PATTERN=P-WELL, · · · |
| 12 | ION INJECTION, ION=BORON, · · · |
| 13 | DEPOSITION, FILM=SILICON OXIDE, THICKNESS=1000 Å, · · · |
| 14 | REMOVAL, FILM=RESIST, · · · |
| 15 | OXIDATION, THICKNESS=1000 Å, · · · |
| 16 | LITHOGRAPHY, PATTERN=N=N-WELL, · · · |
| 17 | ION INJECTION, ION=ARSENIC, · · · |
| 18 | DEPOSITION, FILM=SILICON OXIDE, THICKNESS=1000 Å, · · · |
| 19 | REMOVAL, FILM=RESIST, · · · |
| | ... |

RANGE=1 TO 10, PATTERN NAME=WELL FORMATION, CONFIDENCE=95%

RANGE=10 TO 16, PATTERN NAME=ELEMENT SEPARATION, CONFIDENCE=93%

RANGE=17 TO 30, PATTERN NAME=CHANNEL FORMATION, CONFIDENCE=95%

RANGE=31 TO 36, PATTERN NAME=WIRING, CONFIDENCE=92%

RANGE=1 TO 36, PATTERN NAME=WIRING, CONFIDENCE=95%

RANGE=1 TO 36, PATTERN NAME=BIPOLAR, CONFIDENCE=35%

| ENVIRONMENTAL VARIABLE | PARAMETER |
|---|---|
| STOP CONDITION | CONDITION (CONFIDENCE≥95%) |
| OPERATION AFTER STOPPAGE | DELETE (CONFIDENCE<95%) |

FIG.70

```
. . .
RANGE=1 TO 10, PATTERN MANE=WELL FORMATION, CONFIDENCE=95%
RANGE=17 TO 30, PATTERN NAME=CHANNEL FORMATION, CONFIDENCE=95%
RANGE=1 TO 36, PATTERN NAME=MOSFET, CONFIDENCE=95%
. . .
```

FIG.71

| FLOW AND PROCESS DATA | STATE DATA |
|---|---|
| (OXIDATION) AND (THICKNESS>0 Å) AND (MOSFET) | ADD (FILM=SILICON OXIDE, THICKNESS=SPECIFIED VALUE) |

FIG.72

```
. . .
FILM=SILICON, THICKNESS=SUBSTRATE, · · ·
. . .
```

FIG.73

```
. . .
FILM=SILICON, THICKNESS=SUBSTRATE, · · ·
FILM=SILICON OXIDE, THICKNESS=1000 Å, · · ·
. . .
```

| STATE DATA | OUETPUT DATA |
|---|---|
| (FILM = ALUMINUM) AND (THICKNESS < 200Å) | ADD (ERROR=BREAKAGE, CONFIDENCE=90%) |

20 | DEPOSITION, FILM=ALUMINUM, THICKNESS=100 Å, · · ·

· · ·
FILM=ALUMINUM, THICKNESS=100 Å, POSITION=20TH LINE, · · ·
· · ·

· · ·
ERROR=BREAKAGE, POSITION=20TH LINE, CONFIDENCE=90%, · · ·
· · ·

FIG.80

| | 12 | | 41 |
|---|---|---|---|
| CVD | CVD | ASHR | ASHER |
| ENG | PROCESS BY ENGINEERS | ATCVD | ATMOSPHERIC CVD |
| ETC | ETCHING | ATRT | AFTER-TREATMENT |
| IMP | IMPLANTATION | BRUSH | BRUSHING SCRUBBER |
| INDEX | INDICATION | BTRT | BEFORE-TREATMENT |
| LIT | LITHOGRAPHY | CDE | CDE |
| LPD | LPD | CHANGE | BOX CHANGE |
| OXDIF | OXIDATION/DIFFUSION | CHR | CHARACTERISTIC CHECK |
| QC | QC | COLIN | COLIN TREATMENT |
| SPT | SPATTERING | D/S | DIE/SORT |
| STOP | STOP | DUST | DUST CHECK |
| TRT | TREATMENT | DIF | DIFFUSION |
| WORK | WORK | EB | EB |
| | | EPRO | [ENGINEER] PROCESS |
| | | ESTOP | [ENGINEER] STOP |
| | | EXMA | EXCIMER LASER |
| | | FTHK | MEASURING FILM THICKNESS |
| | | HDOSE | HIGH IMPLANTATION |
| | | HMATEL | HIGH MELTING METAL SPATTERING |
| | | INSP | INSPECTION |
| | | LDOSE | LOW IMPLANTATION |
| | | LMETAL | LOW MELTING METAL SPUTTERING |
| | | LPCVD | LPCVD |
| | | LPD | LIQUID PHASE DEPOSITION |
| | | EPRO | [ENGINEER] PROCESS |
| | | ESTOP | [ENGINEER] STOP |
| | | MULTI | MULTI LAYER |
| | | NHF | NH4F.Etg |
| | | OUT | CARRYING LOT OUT |
| | | OX | OXIDATION |
| | | PART | INDICATION FOR DIVIDING |
| | | PEP | PEP |
| | | PMCVD | PLASMA CVD |
| | | PS | PS MEASURING |
| | | RIE | RIE |
| | | SEM | SEM |
| | | SERIES | SERIES |
| | | SH | SH PROCESS |
| | | SPREAD | RESIST SPREADING |
| | | STRT | SPRAYING TREATMENT |
| | | UV | UV CURE |

| LARGE CODE | PROCESS NAME | VARIABLES | SETTING VALUE |
|---|---|---|---|
| WORK | CARRYING LOT IN | WAFER NAME | 7-2871C02 |
| | | THE NUMBER OF WAFERS | 24 |
| | | TYPE | CMOS |
| | | DEVICE SEPARATION | ACop.3 |
| | | FILE | Z5P38AB |
| | | ALIGNMENT | NO |
| PROCESS | BEFORE-TREATMENT | MACHINES | BTRT2 |
| | | MACHINE | |
| OXIDATION/ DIFFUSION | OXIDATION | MACHINES | OX1 |
| | | MACHINE | |
| | | RECIPE | |
| | | GAS | BOX |
| | | TEMPERATURE | 1000 °C |
| | | FILM THICKNESS | 11000±1100A |
| QC | MEASURING FILM THICKNESS | MACHINES | FTHK2 |
| | | MACHINE | |
| | | THE NUMBER OF MEASURING POINTS | 1 |
| | | FILM THICKNESS | 11000±1100A |

FIG.82

| TYPE OF PROCESS | COMBINATION OF CODES | | MANAGEMENT CODE | RECIPE CODE FOR DEVICE | | |
|---|---|---|---|---|---|---|
| | VARIABLE AND ITS VALUE | | | | | |
| OXDIF.OX | OBJECT=BUFFER,GAS=0,TEMP=950,THICK=1000 (100),ID=RB | | D01 | DD 950 | OX | 1000 |
| OXDIF.OX | OBJECT=BUFFER,GAS=0,TEMP=950,THICK=1500 (150),ID=1ST | | D12 | DD 950 | OX | 1500 |
| ............ | ............ | | ............ | ............ | | |
| IMP.LDOSE | ELEMENT=BORON,DOSE=1E13,ENERGY=80,ID=1 | | I01 | IB 80 | | 1-13 |
| IMP.LDOSE | ELEMENT=PHOS,DOSE=1E13,ENERGY=80,ID=1 | | I22 | IP 80 | | 1-13 |
| .... | .... | | .... | .... | | |

```
DK02/CMS-MLIB          DEMO
•MAIN
WORK              TRW
MCG
WNAME             7-2871C82
NWAFER            24
TYPE              CMOS
ISO               AC03
FILE              REQUEST
INDICATE          KO
..........................
TRT               BTRT
MCG               BTRT         02
MODE              NCC
TP                (ON,RE)
..........................
OXDIF             OX
MCG               OX           01
OBJECT            FIELD
RECIPE            DD100    BOX
GAS               BOX
TEMP              1000
THICK             11000 (1100)
..........................
QC                FTHK
MCG               FTHK         02
FILM              ASIO2
POINT             1
THICK             11000 (1100)
ID                1
TP                (OFF,RE)
..........................
ETG               RIE
MCG               RIE          05
RECIPE            03
FILM              SIN
DEPO              LP
THICK             >400
STR               SIN (1500)
..........................
QC                INSP
MCG               INSP         05
OBJECT            MSP
..........................
QC                FTHK
MCG               FTHK         01
OBJECT            ATHK
FILM              POLY
POSITION          FIELD
POINT             1
THICK             >400
ID                1
..........................
TRT               ASHR
MCG               ASHR         01
MODE              ASHR
TIME              3QM
..........................
TRT               SH
MCG               SH           01
..........................
TRT               BTRT
MCG               BTRT         02
MODE              NCC
TP                (ON,RE)
..........................
```

FIG.85

| PAGE | ARTICLE NAME | LOT NO. | CLASSIFICATION | DIVISION |
|---|---|---|---|---|
| | TEST | N001 | EXPERIMENTAL LOT | BODY |

| | CHECK | PROCESS NAME | CONDITION NAME | SETTING VALUE | | TP |
|---|---|---|---|---|---|---|
| 1 | | CARRYING LOT IN | WATER NAME | 24 | | |
| | | | TYPE | CMOS | | |
| | | | DEVICE ISOLATION | ACop.3 | | |
| | | | FILE | T5M68L | | |
| | | | ALIGNMENT DESIGNATION | NO | | |
| 2 | | BEFORE-TREATMENT | MACHINES MACHINE | BTRT2 | | |
| 3 | | OXIDATION 1 | MACHINES MACHINE | OX2 | | |
| | | | GAS | $O_2$ | | |
| | | | TEMPERATURE | 950°C | | |
| | | | FILM THICKNESS | 1000±100A | | |
| 4 | | DUST CHECK 1 | MACHINES MACHINE | DUST1 | | |
| | | | THE NUMBER OF MEASURING POINTS | 1 | | |
| 5 | | MEASURING FILM THICKNESS 1 | MACHINES MACHINE | FTHX6 | | |
| | | | THE NUMBER OF MEASURING POINTS | 1 | | |
| | | | FILM THICKNESS | 1000±100A | | |
| 6 | | IMPLANTATION 1 B | MACHINES MACHINE | LDOSE1 | | |
| | | | ACCELERATING VOLTAGE | 260KeV | | |
| | | | AMOUNT OF DOSE | 1.0E13 | | |
| 7 | | LITHOGRAPHY (P-WELL) | MACHINES MACHINE | PEP20 | | |
| | | | FILE | T5M68L | | |
| | | | MASK | EM68T1 | | |
| 8 | | | | | | |

FIG.87

| EQUIPMENT | THEORETICAL QUANTITY OF PRODUCTS |
|---|---|
| EQUIPMENT A | 10 |
| EQUIPMENT B | 5 |
| EQUIPMENT C | 10 |
| ⋮ | ⋮ |

| EQUIPMENT | THEORETICAL RETENTION TIME (MIN) |
|---|---|
| EQUIPMENT A | 300 |
| EQUIPMENT B | 200 |
| EQUIPMENT C | 600 |
| ⋮ | ⋮ |

| PRODUCT KIND | | SECTION | | GROUP | | PRODUCT NAME | |
|---|---|---|---|---|---|---|---|
| A | 120 | SECTION 1 | 50 | GROUP 1 | 30 | A1AA | 10 |
| | | | | | | A1AB | 20 |
| | | | | GROUP 2 | 20 | A2AA | 5 |
| | | | | | | A2AB | 15 |
| | | SECTION 2 | 70 | GROUP 3 | 70 | A3AA | 50 |
| | | | | | | A3AB | 20 |
| B | 100 | SECTION 1 | 40 | GROUP 1 | 10 | B1AA | 10 |
| | | | | GROUP 2 | 20 | B2AA | 10 |
| | | | | | | B2AB | 10 |
| ............ | | ............ | | ............ | | ............ | |

FIG. 90

| PRODUCT KIND | SECTION | | GROUP | | PRODUCT NAME | |
|---|---|---|---|---|---|---|
| A | 80 | SECTION 1 | 40 | GROUP 1 | 20 | A1AA 10 |
| | | | | | | A1AB 10 |
| | | | | GROUP 2 | 20 | A2AA 5 |
| | | | | | | A2AB 15 |
| | | SECTION 2 | 70 | GROUP 3 | 70 | A3AA 50 |
| | | | | | | A3AB 20 |
| B | 50 | SECTION 1 | 15 | GROUP 1 | 7 | B1AA 7 |
| | | | | | | B2AA 3 |
| | | | | GROUP 2 | 8 | B2AB 5 |
| ............ | | ............ | | ............ | | ............ |

184

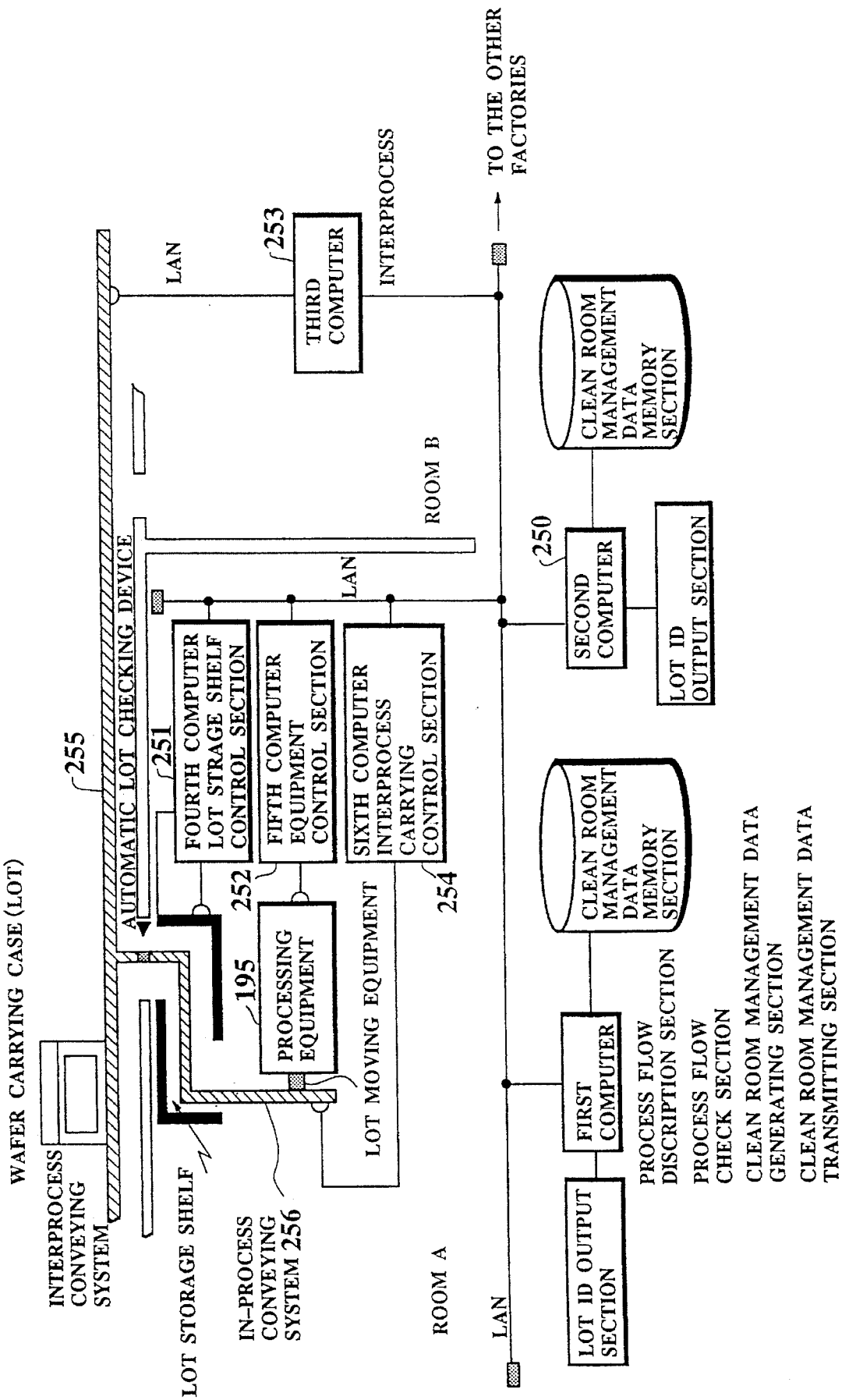

SYSTEM FOR AUTOMATICALLY PRODUCING DIFFERENT SEMICONDUCTOR PRODUCTS IN DIFFERENT QUANTITIES THROUGH A PLURALITY OF PROCESSES ALONG A PRODUCTION LINE

This is a continuation-in-part of U.S. Ser. No. 07/745,256 filed on Aug. 14, 1991, now abandoned.

BACKGROUND OF THE INVENTION

1. Field of the Invention

The present invention relates to a system for automatically producing different semiconductor products in different quantities through a plurality of processes along a production line. Before starting actual production, the system automatically simulates the characteristics and reliability of products, to prepare a process flow containing optimum process conditions for producing best products. The system evaluates and analyzes the products actually produced and the simulation results, and according to results of the evaluation and analysis, improves simulation accuracy.

2. Description of the Prior Art

Generally speaking, in semiconductor manufacturing, there is provided information representing a series of process flow steps (process flow information) based upon which the production of a semiconductor device is controlled. This information is prepared by presuming at the discretion of technical experts completeness of a product based upon their experience or know-how. In this case, since it is extremely difficult for the technical experts to devote all their time to decide the process conditions, the undefined process conditions have beforehand been set on many divergences and the product has dividually been produced at actually processing the product. Therefore, it takes a great deal of time to carry out dividing/combining operations for the products, the data analysis after the operations are completed, or the like, so that the time required for manufacturing the product has been prolonged.

Moreover, in the case where the process conditions are presumed, a process/equipment simulator or a simulation such as a circuit simulator or the like has been used. In such a simulator feedbacks of the simulation results and the process conditions to the process flow are conducted according to a judgement of the technical expert, and consequently it has been impossible to correct the feedbacks by differences between individuals and to perform appropriate feedbacks.

Moreover, after the process flow is decided, the products are actually manufactured, and they are completed, the analysis on an electrical characteristic or data of reliability has been carried out by the technical experts, and in the case where any product is delinquent, the information of the processed process flow has been analyzed one by one, alternatively it has so far been judged from a viewpoint of the experience of the technical experts and analyzed. Moreover, since it is difficult that the results of the actually manufactured product is performed the feedbacks to the simulation or the like, it is difficult to enhance precision of the simulation.

In this manner, in the conventional semiconductor manufacturing techniques, it is difficult to provide exchange of information between the process flow information and various simulations or a production system.

Therefore, a manufacturing process has increased in an assignment of the process conditions, the divisions of the product, or the like, and therefore the time of process has been prolonged. Moreover, it is difficult to skillfully fetch the calculation results derived from various simulation into the process flow, and furthermore it is difficult to carry out the inferior analysis of the product and enhance the precision of the simulation itself by comparing the results of the completed produce with those of the simulation.

Next, in a stage of the above-mentioned process flow preparation, various simulations, checks, and verifications are carried out. With such the execution, the conventional drawbacks in the course of various processes will be described hereinafter.

First, in the initial process flow preparation of the prior art, a process flow sheet for controlling a product flow line is composed of several figures of alphanumeric "process codes", a process title, and the contents. The product flow line generally constitutes a series of a plurality of processes and the individual process is sequence-processed to manufacture a product from an original material.

Conventionally, such a series of process flow steps has been described on the basis of several figures of alphanumeric codes called the above-mentioned "process codes".

The process codes have a preferred format such that one code corresponds to one process and a great amount of information such as the process conditions, the contents, or the like is annexed to these codes. For instance, citing as a sample the codes for use in a semiconductor manufacturing line in order to comment on these codes, "process code= R01" was secured to "buffer oxidized gas (oxygen) temperature (900° C.) time (20 min.)".

Such codes are annexed to every process existing in the manufacturing line, which is controlled according to table of values describing a corresponding relationship between the codes and the process contents. Also, the number of codes may be several thousands.

Using such a table of values corresponding the above-mentioned codes to the process contents, the technical experts have been able to prepare process flow sheet along with the manufacturing process flow each process by hand-writing, or making use of a word processor, a screen editor, or the like.

Accordingly, in the above-mentioned prior art, when the kind of process increases in the manufacturing process line, the number of the process code also increases concurrently. In the case where the technical experts described the process flow in such a code management, there were caused such drawbacks that it became difficult to pick out the codes and that it became very difficult to describe the manufacturing process flow.

Moreover, there were also caused such drawbacks that an incorrect spelling of the codes, a mistake in a describing format, or the like was provoked in the handwriting method, the word processor, or the screen editor, therefore it took a great amount of time to describe the manufacturing process flow.

Next, in the simulation process of the process flow, the process flow information for use in the manufacturing line has conventionally had a format which is completely different from that of the process flow information for use in the simulation and further the contents between those have been different to some degree.

Specifically, a manufacturing management system was separated from a simulation system, whereby, in the case where the product was manufactured and concurrently the simulation was performed, the exclusive process flow information must individually be prepared and stored into each file.

Since the process flow preparation was troublesome and burdensome on the semiconductor technical experts, the technical experts frequently omitted the simulation.

Moreover, since the process flow information for the conventional simulations did not include peculiar data for activating manufacturing equipment, for instance information (recipe data) such as a speed of a temperature variance, gas, time, or the like at rising/falling an oxidation furnace, some differences were produced between the process flow information and the actual process results of the product.

In order to make up for absence of the recipe data, parameters of a calculating equation within the simulator have been adjusted. However, since the recipe data are different according to the equipment or the process conditions and further the variances are frequently made, it becomes necessary to adjust the parameters on all such occasions and this is ineffective. Also, such a compensating method is not attributable to the precision enhancement in the simulator itself.

Alternatively, the technical experts directly procured the recipe data of each process from a person responsible to each manufacturing line to describe the process flow for the simulation. However, the procurement of this information as occasion demands became very troublesome as works of the technical experts and the fetching of the recipe data into the process flow for the simulation become quite burdensome to the semiconductor technical experts.

In this manner, since an intermediate medium having interchangeable functions of the process flow information was provided between the manufacturing process management system and the simulator, a great deal of time was conventionally consumed to prepare a plurality of process flows by the technical experts. Moreover, since the process flow data for the simulation not including the recipe data was prepared, some problems resulted in the reliability of the characteristic precision between the simulation results and the real equipment was not obtained.

Next, the problems in the prior art in a check process of the process flow will be described.

Generally speaking, the technical experts, researchers, or computers do not necessarily prepare a correct process flow. Accordingly, the skilled experts of a process or an equipment have checked on the process flow. However, the number of the skilled experts for checking on it is short, as compared with the number of the technical experts and the researchers who prepare the process flow and the number of the process flow, and then it is the present conditions that the skilled experts cope with the check on it for a considerable time of a day (it takes about 30 min. to check on the process flow composed of 300 processes).

Moreover, the skilled experts who check on the process flow need long-termed experience and knowledge of the process and equipment, whereby the number of persons who check on it cannot readily be increased. Further, it is the present conditions that such things as the knowledge, experience, know-how of the skilled experts are not necessarily continued accurately and that these are specific to the skilled experts themselves. Further, the process flow has a tendency to be increasingly prolonged in the future and then it is expected that even the skilled experts may readily make mistakes upon checking on it.

Moreover, the process flow transfers information to a process simulator, an equipment simulator, and a configuration simulator by using specific converting means to calculate it. However, since design information (mask information) in a lithography process is short in the process flow, the technical experts selected only the information on layers which are desired to calculate it and then calculated it before and after the process flow transfers it. That is, only one-dimensional information can automatically be transferred in calculating it in the simulator.

As described above, in the case where the process flow is checked, a human being will inevitably make a mistake. Further, a great amount of time is necessary in checking the process flow. Moreover, it is expected that the number of steps in the process flow increases and that a human being positively overpasses his strength in the near future.

Moreover, since the design information (mask information) was not included in the process flow, the process flow treated only the one-dimensional information in the process and equipment configuration simulator and could not carry out the two-dimensional and three-dimensional simulations.

Moreover, in the case where the technical experts and researchers manufacture the product in multi-factory in accordance with the process flow in which the simulation or the check process is performed, they must prepare each instruction for manufacturing process conditions and each data for the manufacturing factory management which are suitable for each factory. Moreover, they must separately prepare the instruction for manufacturing process conditions and the data for the manufacturing factory management, that is two kinds of process flow data with respect to one factory.

Moreover, in the case of the manufacturing process of diversified variable-quantity, there were such drawbacks that the management process such as modifications, additions, or the like of the process flow was complicated since the codes for the conventional computer were not used for various purposes.

Moreover, when selecting the product to be phased in the manufacturing line, a production controller has conventionally judged it at his own discretion. Check items and decision data at that time were the following: that is (1) checking of a process flow data file, (2) checking of product name, (3) priority classification among different product types (4) priority classification within the product having the same kind, (5) checking of the number of allowable products in the manufacturing line to be phased in according to the priority, and (6) judging from equipments in the manufacturing line and product manufacturing progress conditions (6-1 the remaining number of products, 6-2 production capacity of the equipments, 6-3 the number of products in process in the equipment per time, and 6-4 the number of stopped products per time). When roughly classified, the check item can be classified into six items as described above, and then the production controller decides the number of products to be phased in and the phasing-in sequence based on this information.

In the above-mentioned prior art, the production controller, who decides the product to be phased in, must always check the process flow data for each product, and concurrently grasp equipment conditions in the manufacturing line or manufacturing progress conditions of the product. Therefore, accompanying enlargement in the process flow data and an increase in the kind of manufacturing equipment or the number of products to be phased in, it becomes difficult to seize correspondence of the equipment to the product manufacturing progress and presume a production planning (manufacturing progress schedule). Moreover, there are other problems in that it takes a great deal of time to judge a product decision.

In many cases in a conventional production system, the process flow information is managed as one information each kind of product, and in such a management method, it is difficult to make changes/additions/cancellations to the process flow information for each product.

Moreover, in order to decide the process conditions of a product, in particular, in the factory equipped with research development line, the processes such as product divisions for dividing the product conditions, the condition assignment, or the like is performed, and as described above, it is difficult to divide the process conditions for each product.

Moreover, the process flow information in the conventional production system is prepared according to information as represented by process codes, and the information (recipe information) for processing in the equipment corresponding to these codes also existed by the same number as the process codes. Therefore, the equipment recipe information increased together with the process conditions, whereby the recipe information management became difficult.

Moreover, in most of the conventional production systems, a process of the product, conveyance of the product, and a test of the process are performed by a human being. In particular, as a logic mechanism for deciding process sequence of the process, a human being system or a method of first processing the product which was first inputted (first-in first-out) was taken. However, taking into consideration the following process, a product balance remained in the whole factory, and therefore does not have excellent efficiency. Therefore, numerous unprocessed products remained to be processed in the equipment, and a bottleneck or the like results in the product flow.

SUMMARY OF THE INVENTION

An object of the present invention is to provide a semiconductor production system that simulates process conditions of products, to provide a best process flow for producing semiconductor products.

Another object of the present invention is to provide a semiconductor production system that evaluates and analyzes simulation results and products actually produced, to improve simulation accuracy.

Still another object of the present invention is to provide a process flow preparation system that enables an operator to quickly and easily prepare a process flow for producing semiconductor products in a production line, with least knowledge of the production line.

Still another object of the present invention is to provide a semiconductor production system having a production management section and a simulation section that efficiently work without interfering with each other.

Still another object of the present invention is to provide a semiconductor production system having a process flow checking section that checks even a long complicated process flow at high speed.

Still another object of the present invention is to provide a semiconductor production system having a process flow checking section that adds design data to a process flow and converts the process flow into one that is processible by process, device, and shape simulators that two- and three-dimensionally simulate the producing of products according to the process flow.

Still another object of the present invention is to provide a semiconductor production system having a production management section for providing a plurality of processing equipment with process data according to a process flow.

Still another object of the present invention is to provide a semiconductor production system having a data verify section for automatically verifying and determining products to be charged to a production line according to production progress in the production line.

Still another object of the present invention is to provide a semiconductor production system that provides each product or each group of products with a process flow, to produce different kinds of semiconductor products in different quantities.

Still another object of the present invention is to provide a semiconductor production system that is capable of managing a process flow involving branching processes.

To accomplish the objects, a semiconductor production system according to an aspect of the present invention includes a section for preparing a process flow, a section for simulating the producing of products according to the process flow, a section for feeding a result of the simulation back to the process flow preparation section, a section for managing the processing of semiconductor products and collecting process results of the products, a section for analyzing the process results, a section for evaluating the results of the analysis and simulation and feeding the evaluation results to the simulation section, and a section for producing semiconductor products.

The process flow preparation section optimizes the process flow according to the simulation results provided by the simulation section. According to the optimized process flow, the production section processes semiconductor products. Process results of the products are collected and analyzed. Results of the analysis are compared with the simulation results. Results of the comparison are used to study the quality of the products and improve simulation accuracy.

A semiconductor production system according to another aspect of the present invention has a process flow preparation unit. The process flow preparation unit includes a code management table for hierarchically managing codes representing kinds of processes, codes representing groups of the processes in each kind, and variables representing process conditions and objects; attribute management tables each for managing the attributes of one of the codes and variables; a variable manager for managing relationships between the code management table and the attribute management tables; a data selector for selecting codes and variables from the code management table; and a display unit for displaying the selected codes and variables as well as a process flow formed of the selected codes and variables.

The code management table and attribute management tables are controlled by computer. Relationships between the tables are always controlled by the variable manager.

Codes that are located at the top of hierarchy in the code management table are displayed in a guide window on the display unit. Among the displayed codes, a proper one is selected through the data selector. The selected code is displayed in a main window on the display unit. Codes or variables that are located below the top codes in the hierarchy are then displayed in the guide window.

Required codes and variables are sequentially selected to the bottom of the hierarchy, to complete a process in a process flow. These operations are repeated until the process flow is completed.

A semiconductor production system according to still another aspect of the present invention has a simulation section. The simulation section includes a code conversion table for managing relationships between a process flow for production management and a process flow for simulation; a data converter for converting a process flow for production management into a process flow for simulation according to the code conversion table; a recipe data converter for converting the operating conditions of equipment into recipes for simulation; a recipe data file for storing the recipes; a recipe adder for adding a proper one of the recipes to the process flow for simulation; simulators for simulating the producing of products according to the process flow with the recipe; and a data transfer unit for transferring results of the simulations to a production management section.

This aspect of the present invention automatically prepares a process flow for production management as well as a process flow for simulation. Recipes of equipment are automatically added to the process flow for simulation, so that the processing of products is properly simulated with the environmental data of the production line such as materials employed, the kinds of equipment, and the operating conditions of the equipment.

This aspect of the present invention efficiently prepares process flows and reduces load on operators. Recipes of equipment are added to a process flow for simulation, to improve simulation accuracy.

This aspect of the present invention finds optimum process conditions such as an optimum dose of ions for an ion injection process. This results in reducing the number of test products and a wait time and increasing the throughput of a production line.

A semiconductor production system according to still another aspect of the present invention has a process flow checker. The process flow checker checks a process flow containing a series of processes and process conditions for producing different kinds of semiconductor products in different quantities in a production line. The process flow checker includes a process flow input unit for loading the process flow from an external storage unit to a main memory; a branch data generator for finding branching processes in the process flow, and if there is any branching process, preparing branch data to allot products for branches; a layer data generator for loading a mask data management table to the main memory and preparing layer data according to the table, the mask data management table managing mask pattern dimensions and resists that are needed by lithography process; a film structure management table for managing two-dimensional film structures deposited on the wafer surface and back of each product, according to the layer data; a film structure checker for determining whether or not the structure of a film stipulated in an etching process in the process flow is equal to the structure of a film actually deposited on a product; a wafer surface condition management table for managing processes that are permitted or prohibited on a film exposed on the wafer surface of a product; a wafer surface checker for checking the wafer surface of a product according to the face condition management table; a back condition management table for managing processes that are permitted or prohibited on a film exposed on the back of a product; a back checker for checking the back of a product according to the back condition management table; a substrate condition management table for managing processes that are permitted or prohibited on films deposited on a product; a substrate checker for checking a product according to the substrate condition management table; a diffusion condition management table for ranking and managing the contamination levels of diffusion furnaces; a diffusion checker for checking the process flow according to the diffusion condition management table; a package condition management table for managing processes that are permitted or prohibited in a package of processes; a package checker for checking the process flow according to the package condition management table; a sequence management table for managing a sequence of processes; a sequence checker for checking the process flow according to the sequence management table; an off-routine management table for managing unauthorized processes and processes that must not be carried out after a given process; an off-routine checker for checking the process flow according to the off-routine management table; a test piece management table for managing the insertion position, extracting position, and kind of a test piece; a test piece checker for checking the process flow according to the test piece management table; a chain process management table for managing processes that must be continuously carried out; a chain process checker for checking the process flow according to the chain process management table; an error code management table for managing error messages; an error message generator for generating error messages according to the error code management table; a check management table for managing whether or not the abovementioned checkers are activated; a decision unit for selecting checkers to be activated according to the check management table; and a result output unit for providing results of the check operations of the checkers.

The film structure checker, wafer surface checker, back checker, and substrate checker check the process flow while simulating production processes. The film structure checker, wafer surface checker, and substrate checker employ layer data provided by the layer data generator, to simultaneously check a plurality of layers of each product.

The layer data generator has a mask data fetcher, a mask data management table, a layer data unit, a function selector, a layer data output unit, and a mask data generator, to generate layer data for each design drawing according to dimensional data provided by a CAD system and resist data.

The layer data provided by the layer data generator are used by process, device, and shape simulators for two- and three-dimensional simulations.

A process flow is saved in a floppy disk or a hard disk of a computer. The branch data generator finds branching processes in the process flow and classifies the branching processes according to patterns. The layer data generator generates layer data according to the mask data provided by the CAD system. The layer data is added to the process flow. The various checkers mentioned above refer to the tables, which may be in a recording medium or prepared according to the progress of operation, to check the process flow having the layer data.

A semiconductor production system according to still another aspect of the present invention has a process flow checker. The process flow checker includes a process flow storage unit for storing a process flow; a process data table for storing process data corresponding to process conditions; a process data generator for retrieving proper process data from the process data table according to the process conditions contained in the process flow; a state data generator for simulating the processing state of each product according to the process data and process flow; an output data table for storing error data corresponding to process conditions; and an output data generator for comparing the data provided by the process data generator with the output data table, to find an error in the process flow and providing an error output if there is any error.

This aspect of the present invention employs a computer to provide a process flow containing a series of processes each including a code for indicating the kind of the process, variables indicating process conditions, and values substituting for the variables. The process flow is stored in a recording medium such as a floppy disk or a hard disk of the computer. Before checking and simulating the process flow, supplementary data are added to the process flow if necessary. The process flow is then tested according to data tables previously stored in the recording medium and data generated during the operation.

Since this aspect of the present invention employs a computer for checking and simulating a process flow, it can check a complicated large process flow that is impossible to check manually. This aspect of the present invention enables anyone to use the checking and simulation know-how off an expert.

A semiconductor production system according to still another aspect of the present invention has a process flow preparation section for preparing a process flow for producing semiconductor products in a production line; a production management section for managing the processing of products and the operating conditions of equipment in the production line; and a verify section for verifying products to be charged to the production line according to the process flow and the product and equipment management data provided by the production management section and informing the production management section of the products to be charged to the production line.

The data verify unit includes a data input unit for receiving the process flow; a data analyzer for determining whether or not the process flow has an error; an error output unit for providing error information if the data analyzer finds any error; an error transfer unit for transferring the error information to the process flow preparation section; a data fetcher for fetching the process flow if the data analyzer finds no error therein; a progress prediction unit for predicting production progress in each equipment; a production condition tester for examining the process flow, the predicted production progress, and the product and equipment data provided by a production section and determining whether or not products stipulated in the process flow are allowed to be charged to the production line; a product decision unit for determining products to be charged to the production line according to the determination of the production condition tester; a data sorter for sorting the products to be charged; and a data transfer unit for transferring data of the products to be charged and the process flow to the production section.

The production condition tester includes a production capacity checker for comparing a theoretical production capacity of each equipment specified in the process flow with an actual production capacity of the equipment predicted by the progress prediction unit; and a retention time checker for comparing a theoretical retention time of a product in the equipment with an actual retention time.

The product decision unit compares an allowable number of products which can be processed by each equipment with an actual number of products that are being processed by the equipment, to find a marginal number of products processible by the equipment, and then compares the marginal number with the number of products to be charged to the equipment, to determine the number of products that can be actually charged to the equipment, the determined number being output to the production section.

The data verify unit employs a theoretical production capacity table having the theoretical production capacity of each equipment and a theoretical retention time table having the theoretical retention time of each equipment. The retention time is defined as "time at which the last product is started to be processed minus the time at which a half-finished product is completely processed" for a given device.

The product decision unit employs a product allowance table for hierarchically managing products allowed to be charged to a production line according to their kinds, sections, groups, and names, and an actual product table for managing products presently in the production line.

According to this aspect of the present invention, the process flow preparation section provides a process flow to the data input unit. The data analyzer checks the name and contents of the process flow.

The production condition tester refers to the theoretical production capacity table and the actual production capacity of given equipment managed by the production management section, for each process contained in the process flow. The production condition tester compares the theoretical retention time table with an actual retention time of the equipment managed by the production management section.

After the process flow is tested, the product decision unit refers to the product allowance table and actual product table, to determine products to be charged to the production line.

The data sorter sorts the process flow according to the names and priority of the products to be charged to the production line. The sorted products are displayed on a CRT. The data transfer unit transfers the sorted process flow to a production management computer of the production management section, or to a computer of a production block.

A semiconductor production system according to still another aspect of the present invention has a process flow conversion unit for converting a process flow checked by a checker unit into one that is applicable to a semiconductor production line; and a semiconductor production management unit for managing semiconductor production processes according to the converted process flow.

This aspect of the present invention checks codes contained in a process flow and converts the process flow into one having a proper format for managing a semiconductor production line. According to the process flow, products are transferred to clean rooms where the products are processed by equipment.

Even if there are semiconductor production lines employing process flows of different formats, this aspect of the present invention automatically converts codes contained in an input process flow into those of a process flow appropriate for a given production line. This aspect of the present invention automatically checks the contents of an input process flow and instantaneously deals with errors in the process flow.

When producing semiconductor products, the production system according to the present invention prepares a process flow for each lot of wafers, or for each wafer, to control the process conditions of the lot or of the wafer.

A process flow for a given lot or wafer may be divided into branches. Each of the branches is provided with sufficient data so that it may be independently handled. This enables products to be easily grouped, branched, and processed.

The production system according to the present invention is capable of combining input codes to generate required recipes. This helps reduce recipe data controlled by an equipment managing computer.

Unlike a conventional system that employs one or a plurality of computers to control equipment, products, and transportation systems, the present invention realizes a distributed system with a plurality of computers.

These and other objects, features and advantages of the present invention will be more apparent from the following detailed description of preferred embodiments in conjunction with the accompanying drawings.

BRIEF DESCRIPTION OF THE DRAWINGS

FIG. 2 shows a process flow employed by the system of FIG. 1.

FIG. 19 shows a wafer surface condition management table;

FIG. 20 shows a product having a film A on which processes a and b are carried out;

FIG. 21 shows a product having films A and B on which processes a and b are carried out;

FIG. 25 shows a product having films A, B, and C on which a process b is carried out;

FIG. 26 shows a diffusion condition management table;

FIG. 27 shows a product to be transferred from a diffusing furnace D to a diffusion furnace E or F;

FIG. 28 shows a package condition management table;

FIG. 31 shows a sequence management table;

FIG. 32 shows a process flow checked by a sequence checker;

FIG. 33 shows an off-routine management table;

FIG. 34 shows a process flow checked by an off-routine checker;

FIG. 35 shows a test piece management table;

FIG. 37 shows a chain process management table;

FIG. 42 shows a manually prepared process flow;

FIG. 44 shows a process flow involving a branching process;

FIG. 46 shows relationships between product numbers and branches;

FIG. 47 shows relationships between patterns and the branches of FIG. 46;

FIGS. 51 to 57 show management tables employed by the modification of FIG. 50;

FIG. 59 shows a supplementary data table;

FIG. 60 shows a process flow to be converted by a process flow converter disposed in the second checker of FIG. 58;

FIG. 61 shows a process flow converted from the process flow of FIG. 60 according to the table of FIG. 59;

FIG. 62 shows a process data table;

FIG. 63 shows a process flow to be processed by a process data generator;

FIG. 64 shows process data generated from the process flow of FIG. 63 according to the table of FIG. 62;

FIG. 65 shows a process data table;

FIG. 66 shows a process flow to be processed by the process data generator;

FIG. 67 shows process data generated from the process flow of FIG. 66 according to the table of FIG. 65;

FIG. 68 shows process data generated by the process data generator;

FIG. 69 shows an environmental data table;

FIG. 70 shows process data generated from the process data of FIG. 68 according to the table of FIG. 69;

FIG. 71 shows a state data table;

FIG. 72 shows state data to be processed by a state data generator;

FIG. 73 shows state data generated from the data of FIG. 72 according to the table of FIG. 70;

FIG. 80 shows a Kana-Kanji conversion table;

FIG. 81 shows conversion data for a process check sheet;

FIG. 82 shows a conversion table;

FIG. 83 shows a printed sheet having management codes;

FIG. 85 shows a process check sheet;

FIG. 87 shows a theoretical production capacity table;

FIG. 88 shows a theoretical retention time table;

FIG. 89 shows a product allowance table;

FIG. 90 shows an actual product table;

FIG. 95 shows a production progress manager; and

DETAILED DESCRIPTION OF THE EMBODIMENTS

Embodiments of the present invention will be explained with reference to the drawings. In the following explanation and accompanying drawings, the letter "C" added to a temperature value is for centigrade, and the letter "A" added to a film thickness value is for angstroms.

Figures 1, 1A:
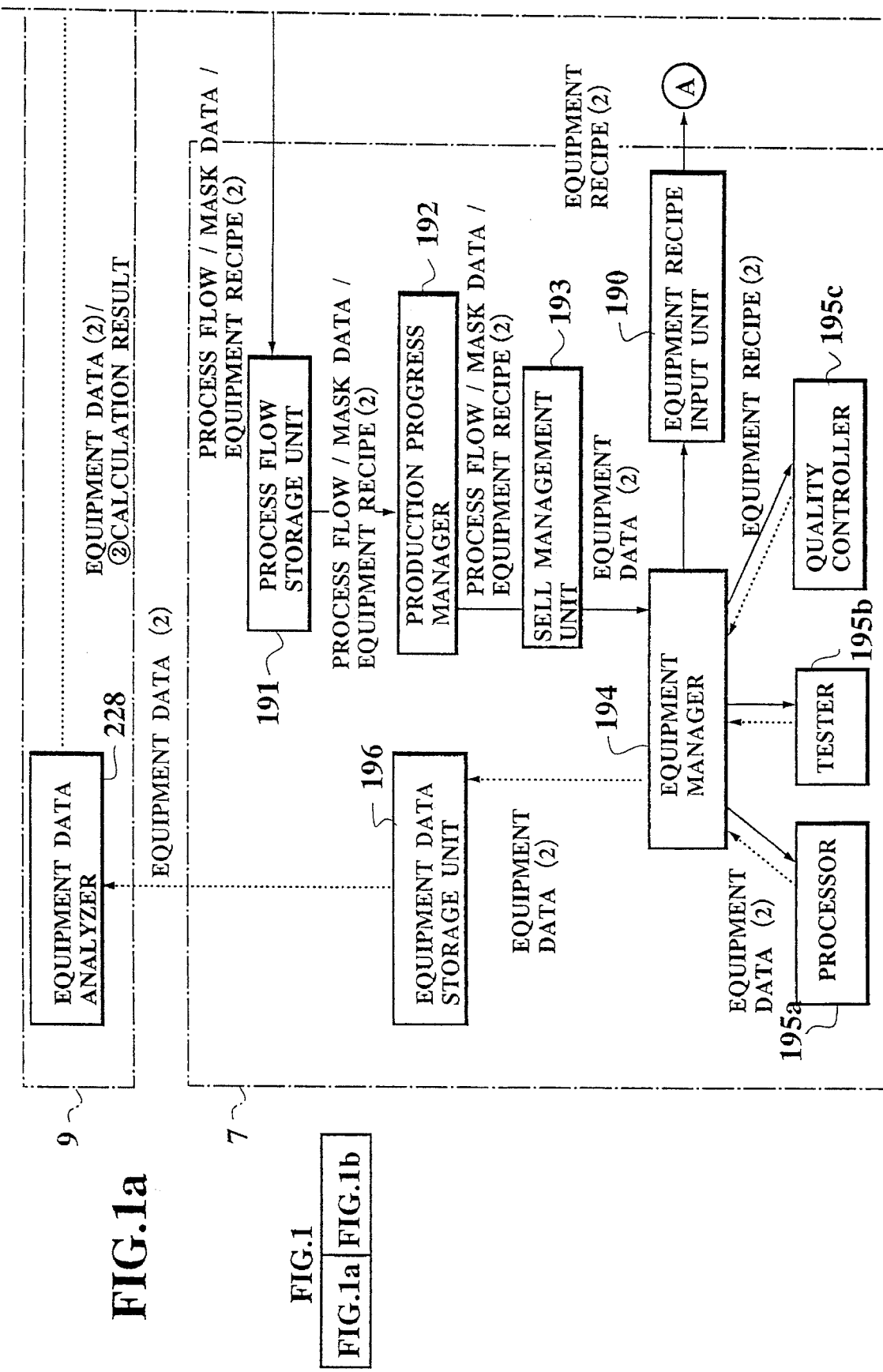
FIGS. 1a and 1b generally shows a semiconductor production system according to the present invention.
Figure 1B:
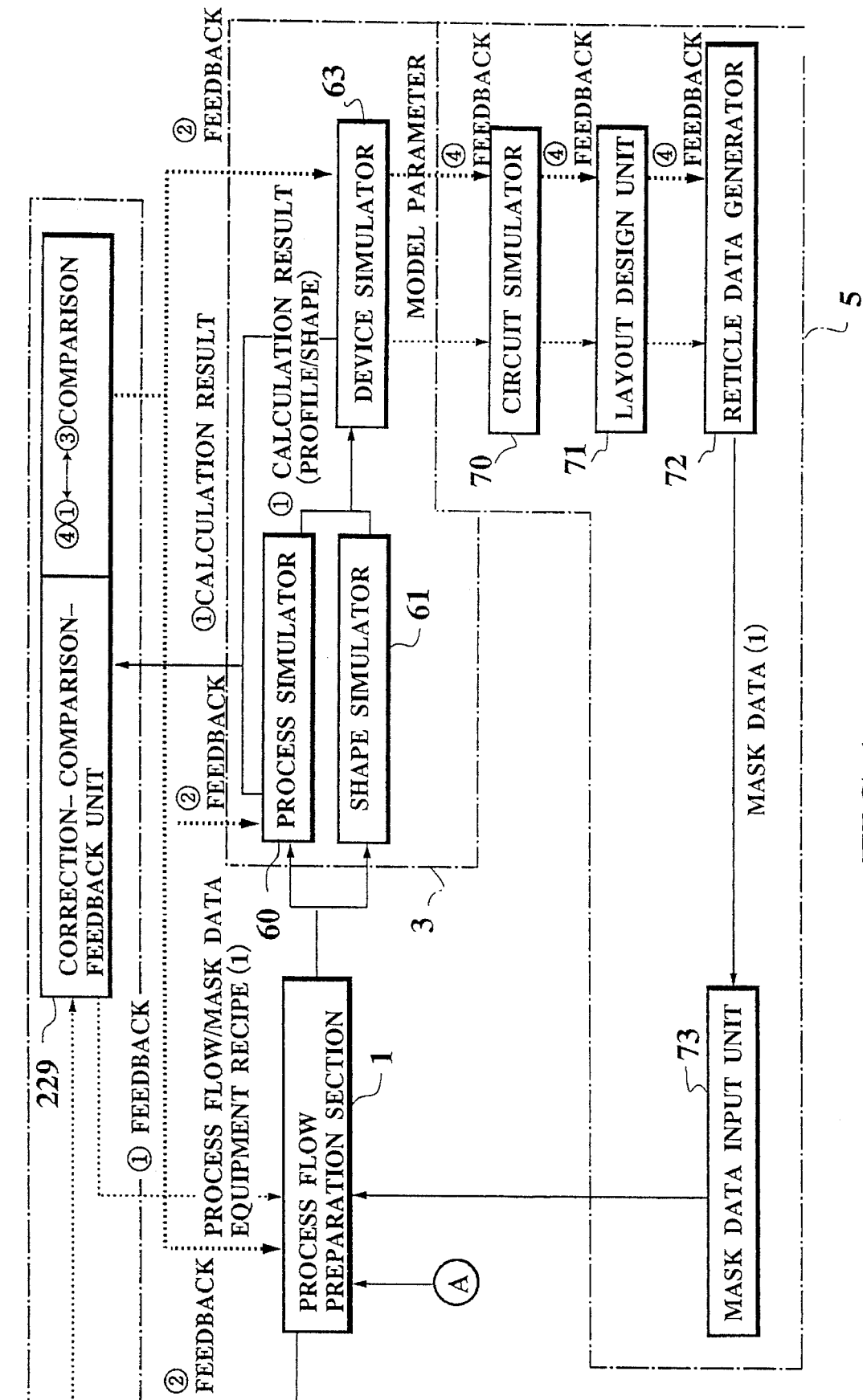

FIG. 1 shows a semiconductor production system according to the present invention.

This system includes a process flow preparation section 1, a simulation section 3, a computer aided design (CAD) section 5, a production section 7, and a feedback section 9.

The process flow preparation section 1 prepares a process flow containing process names, process conditions, required equipment, process instructions, etc., necessary for the production section 7 to produce semiconductor products. The process flow is simulated by the simulation section 3 and CAD section 5.

Simulation results from the sections 3 and 5 are returned to the process flow preparation section 1. The section 1 precisely studies the simulation results and provides a verified process flow to the production section 7, which produces semiconductor products accordingly.

The feedback section 9 collects production data from the production section 7 and feeds them back to the sections 1, 3, and 5.

Each process flow prepared by the section 1 involves processes, process conditions, equipment recipes, variables for specifying equipment, process instructions, etc., required for producing semiconductor products. The process flow is expressed with alphabetic, numeric, and Kanji codes. These codes are converted into those that are executable in the sections 3, 5, and 7. Any kinds of codes are acceptable if they properly express process flows and are executable in the sections 3, 5, and 7.

FIG. 2 shows an example of a process flow made of codes. Each of the alphabetic and numeric codes represents a process condition, and each line corresponds to one process. Numbers in the leftmost column show a sequence of execution of the processes.

Figure 3:
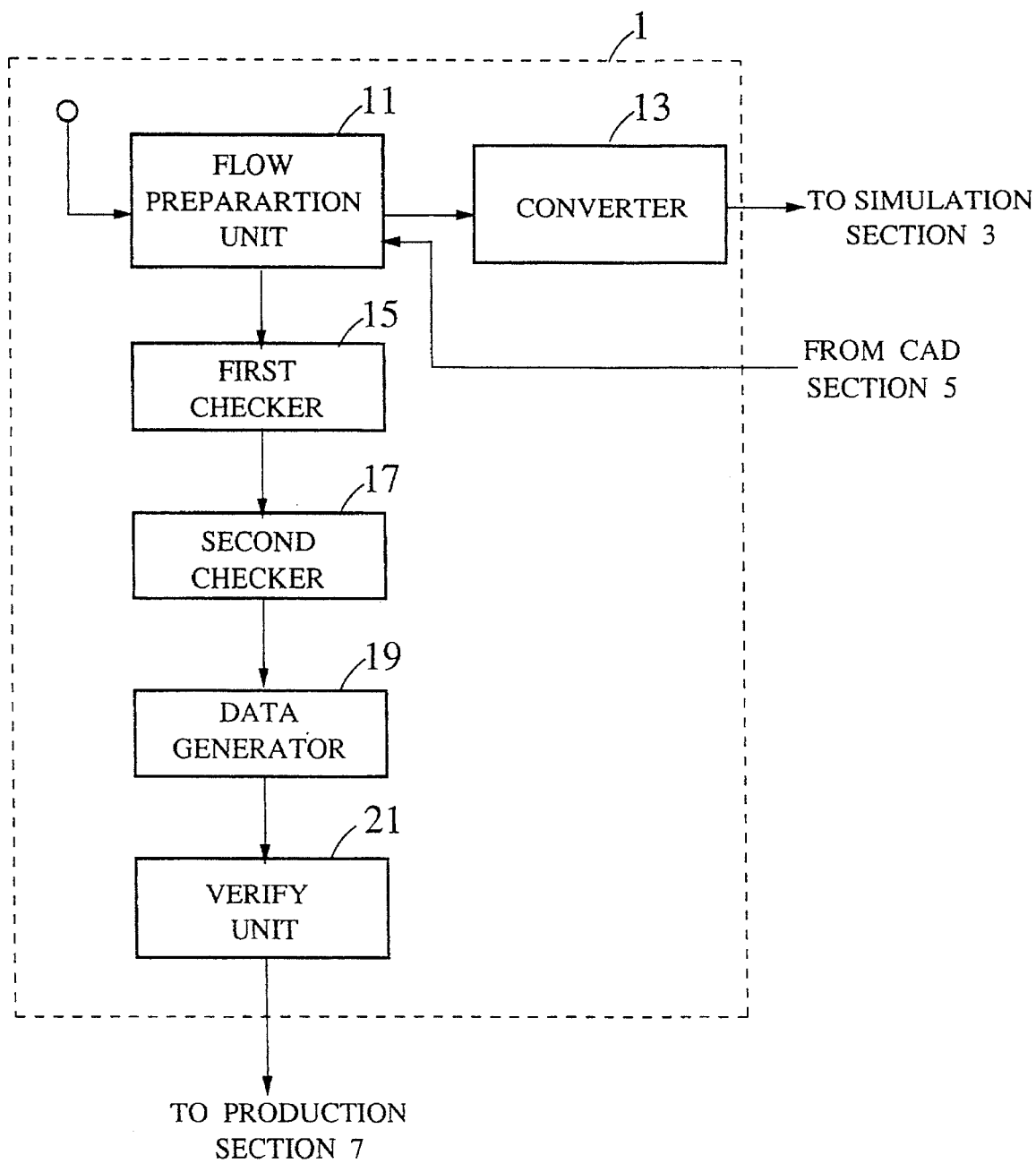
FIG. 3 shows a process flow preparation section in the system of FIG. 1.

FIG. 3 shows an example of the process flow preparation section 1, which includes a flow preparation unit 11, a converter 13, a first checker 15, a second checker 17, a data generator 19, and a verify unit 21.

The flow preparation unit 11 prepares a process flow. The converter 13 converts the process flow into one that can be simulated. The first checker 15 checks the process flow, to see whether or not the process flow keeps each clean room of the production section 7 uncontaminated. The second checker 17 checks production know-how of the production section 7. The data generator 19 converts the process flow into one that is executable in the production section 7. The verify unit 21 determines whether or not the process flow is acceptable for the section 7.

Figure 4:
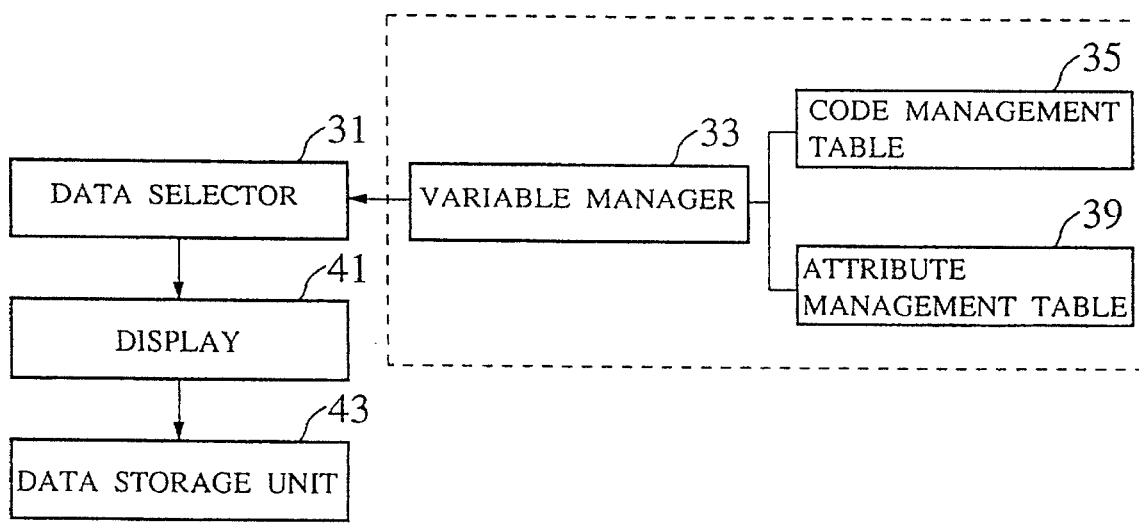
FIG. 4 shows a process flow preparation unit in the section of FIG. 3.

FIG. 4 shows an example of the flow preparation unit 11, which includes a data selector 31, a variable manager 33, a code management table 35, an attribute management table 39, a display 41, and a data storage unit 43.

The data selector 31 may be a mouse or a keyboard. The data selector is used to select codes, variables, and parameters that are managed by the code management table 35 and are employed to describe semiconductor production processes. These codes usually specify the kinds of production processes, the variables determine process conditions, and the parameters substitute for the variables. Each code may be single or composed of a header code representing a group and a segment code representing a segment.

For example, a low-pressure CVD (chemical vapor deposition) process is represented with a code "CVD" expressing the kind of the process, or with a header code "CVD" plus a segment code "LPCVD."

Variables for the CVD process are, for example, "FILM" for representing the kind of a film to be deposited and "THICK" for the thickness of the film. Parameters to substitute for the variables are, for example, "SIN" and "1000." These codes are managed by the code management table 35 and attribute management table 39.

The code management table 35 hierarchically controls header codes, segment codes, variables, and parameters.

Figure 5:
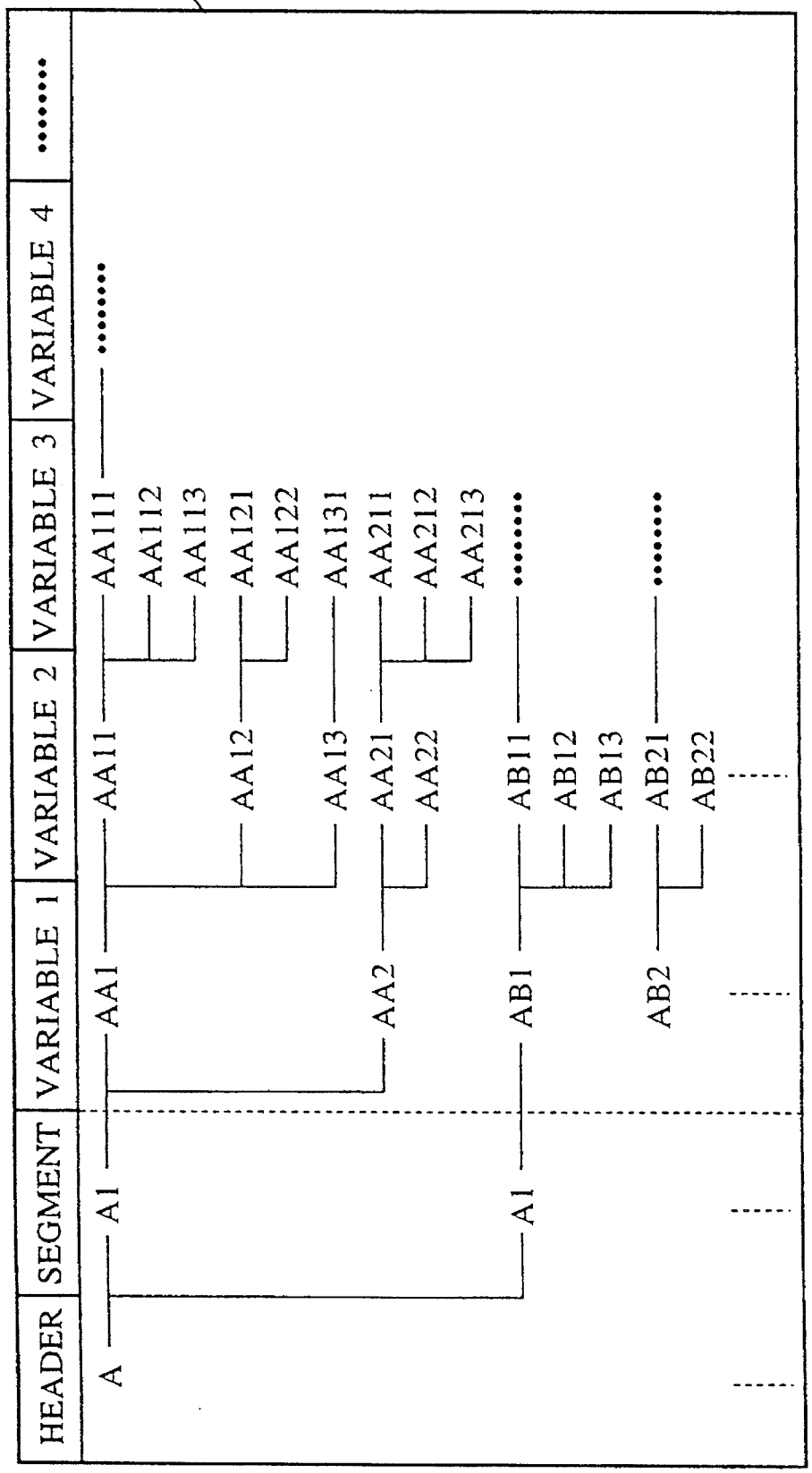
FIG. 5 shows a code management table in the unit of FIG. 4.

FIG. 5 shows an example of a hierarchy stored in the code management table 35. Under this hierarchy, a header code A controls segment codes A1 and A2. The segment code A1 controls first variables AA1 and AA2. The first variable AA1 controls second variables AA11, AA12, and AA13. In this way, the table 35 hierarchically relates codes to one another.

Each variable has attributes. For example, the code A1 has a character attribute, an indispensable input attribute, and an optional input attribute. These attributes are managed by the table 39.

Figures 6, 7:
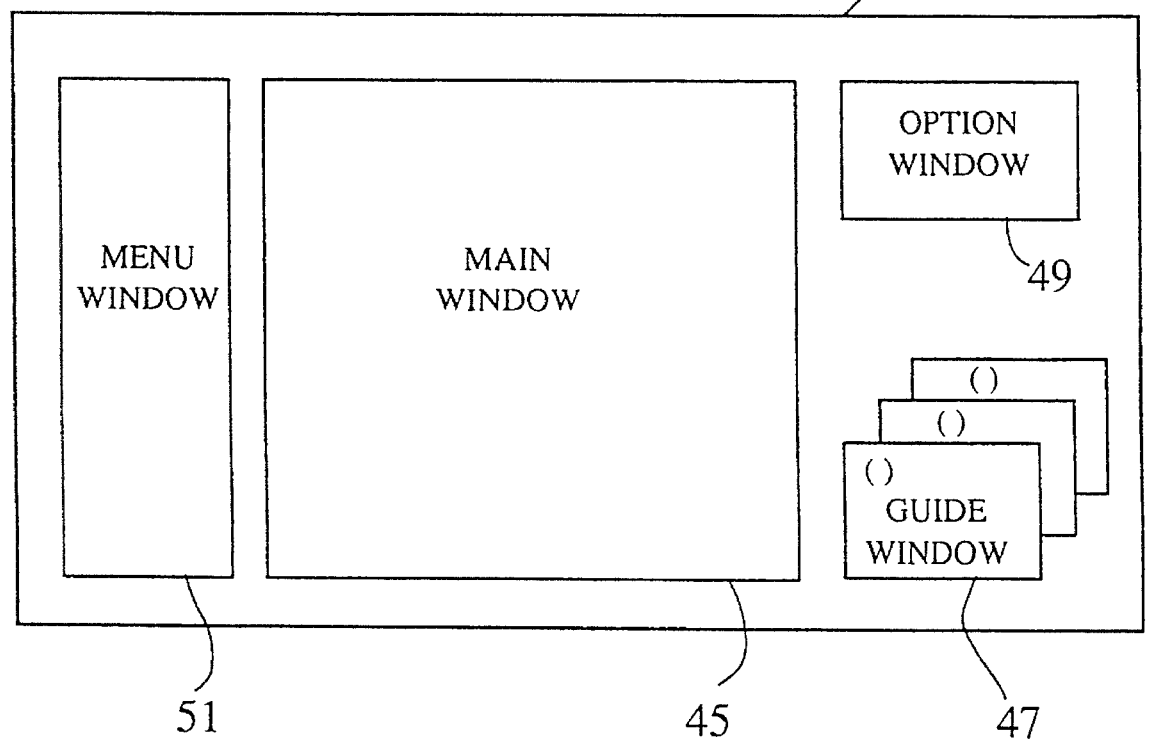
FIG. 6 shows an attribute management table in the unit of FIG. 4.
FIG. 7 shows a display in the unit of FIG. 4.

FIG. 6 shows an example of the attribute management table 39. The attribute management table is prepared for every code, variable, and parameter. The table 39 of FIG. 6 is for a variable THICK.

It is understood from FIG. 6 that the variable THICK has attributes of (1) no input limit, (2) guided input of a series of numerals, (3) a range of 10 to 1000 A at intervals of 10 A, and (4) angstrom as a unit. If it is required to change the range of 10 to 1000 to 5 to 2000, "10" and "1000" are simply changed to "5" and 2000, respectively in the table 39.

The attribute management tables 39 and code management table 35 are controlled by the variable manager 33. Namely, the variable manager 33 controls relationships between the codes, variables, parameters, and attribute management tables.

FIG. 7 shows an example of the display 41 used for writing a process flow. The display 41 includes a main window 45 for displaying codes and variables selected by the data selector 31, a guide window 47 for selecting character codes and entering numbers, an option window 49 for displaying the contents of a file storing descriptive data, and a menu window 51 for selecting special functions.

Codes, variables, and parameters hierarchically managed by the code management table 35 are displayed in the guide window 47 for selection. Whenever any code displayed in the window 47 is selected through the data selector 31, the selected one is displayed in the main window 45.

Data displayed in the guide window 47 may be selected according to a choice method, a slide method, or any other method depending on the data's attribute specified in the attribute management tables 39.

Some codes, variables, and parameters are loaded from another file. These data are displayed in the option window 49. The option window 49 may include an input window that requires a special input method.

The menu window 51 is used to select special functions such as code input, duplication, range, and link with another system.

The data storage unit 43 stores a process flow prepared on the display 41 in a proper format depending on a purpose of use. There are no restrictions for data storage.

Figure 8:
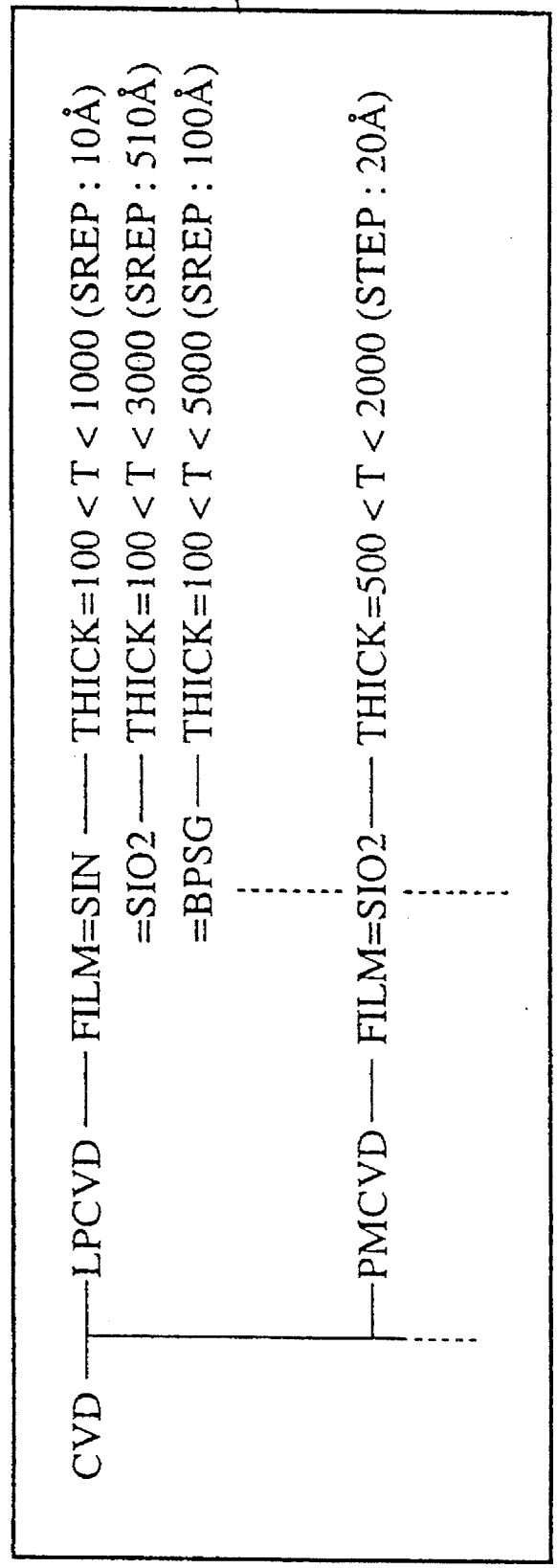
FIG. 8 shows a code management table.

An embodiment of the present invention will be explained with reference to a low-pressure CVD process of forming a silicon nitride (SIN) film of 1000 angstroms thick on a substrate. This process is coded as follows:

CVD, LPCVD:FILM-SIN, THICK=1000;

FIG. 8 shows a hierarchy of the CVD process managed by the code management table 35. Attributes of all codes, variables, parameters in the table 35 are managed by the attribute management tables 39. For example, a variable FILM has attributes of (1) guided input of characters, (2) no unit, and (3) displaying a flow. A variable THICK has attributes of (1) inputting a series of numbers, (2) angstrom as a unit, and (3) displaying a flow.

A flow of the CVD process is prepared on the display 41 with use of the data selector 31.

The data selector 31, which may be a mouse, is clicked in the main window 45, to display the leftmost code CVD of the table 35 in the guide window 47.

The code CVD displayed in the guide window 47 is selected with the data selector 31 and is displayed in the main window 45. Codes LPCVD and PMCVD of the second level in the hierarchy of FIG. 8 are then displayed in the guide window 47. The code LPCVD is selected with the data selector 31. As a result, the main window 45 displays as follows:

CVD, LPCVD:FILM=?

The variable FILM is integral with the code LPCVD, and therefore, it is also displayed in the main window 45.

The guide window 47 displays parameters (FIG. 8) for the variable FILM, and one of the parameters is selected with the data selector 31. In this way, codes and parameters are selected according to the hierarchy managed by the code management table 35.

Finally, a flow of the low-pressure CVD process for forming the silicon nitride (SiN) film of 1000 A thick is displayed in the main window 45 as follows:

CVD, LPCVD:FILM=SIN, THICK=1000;

Attributes that the variable FILM is a string of characters and that the variable THICK is a series of numbers are managed by the attribute management tables 39. Relationships between the attribute management tables 39 and the code management table 35 are controlled by the variable manager 33.

Once the process flow is completed on the display 41, it is stored in the data storage unit 43. The data storage unit 43 may be a magnetic disk unit from which the process Flow is retrieved as and when required.

In this way, the flow preparation unit 11 includes a code management table for hierarchically managing codes, variables, and parameters, and attribute management tables for managing the attributes of the codes, etc. The flow preparation unit 11 helps an operator prepare a process flow with a minimum knowledge of production lines and with no spelling errors.

In the flow preparation unit 11, it is easy to add codes, variables, parameters, and their attributes. Accordingly, the flow preparation unit 11 saves labor and time in preparing a process flow.

The process flow prepared by the flow preparation unit 11 is sent to the converter 13 before it is simulated in the simulation section 3.

Figure 9:
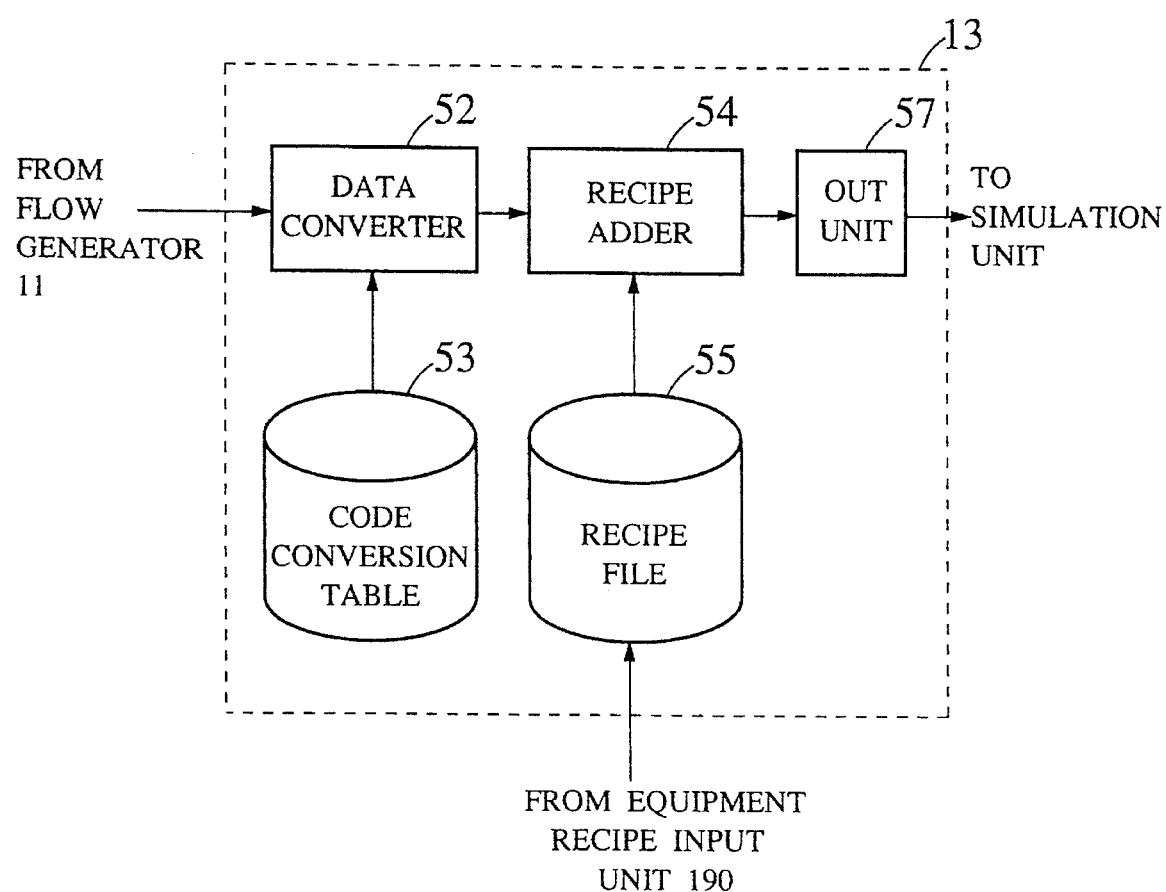
FIG. 9 shows a converter in the section of FIG. 3.

FIG. 9 shows an example of the converter 13. The converter 13 includes a data converter 52, a code conversion table 53, a recipe adder 54, a recipe file 55, and an output unit 57.

The data converter 52 converts the codes and parameters of a process flow provided by the flow preparation unit 11 into codes that are executable in the simulation section 3.

For example, an oxidizing diffusion process is expressed as follows for a process simulation:

$$\&\text{DIFF WET TEMPERATURE}=900 \text{ TIME}=60 \quad (1)$$

The same process is expressed as follows for production management when prepared by the flow preparation unit 11:

$$\text{OXDIF:GAS=BOX, TEMP=900, TIME=1H}; \quad (2)$$

Before simulation, the expression (2) must be converted into the expression (1). For this purpose, the data converter 52 refers to the code conversion table 53 of FIG. 10, and converts, for example, the GAS=BOX in the expression (2) into the WET of the expression (1). In this way, the data converter 52 thoroughly converts a given process flow for production management into a process flow for simulation according to the code conversion table 53. The table 53 is prepared for every production line.

The recipe adder 54 adds a recipe to the process flow provided by the flow preparation unit 11. The recipe is retrieved from the recipe file 55 serving as a database.

The output unit 57 transfers the process flow with the recipe to the simulation section 3.

An example of a recipe added by the recipe adder 54 will be explained with reference to the oxidizing diffusion process in semiconductor manufacturing.

Figures 10, 11, 12:
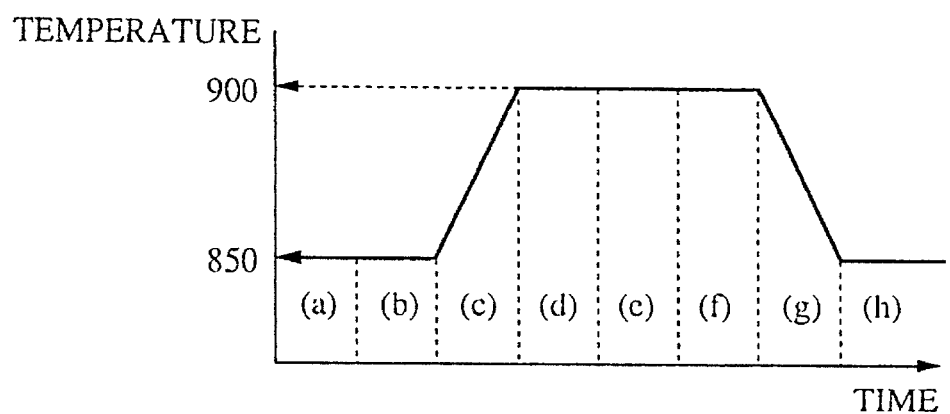
FIG. 10 shows a code conversion table used when converting a process flow for production management into a process flow for simulation.
FIG. 11 shows an equipment recipe.
FIG. 12 shows a recipe table.
Figure 13B:
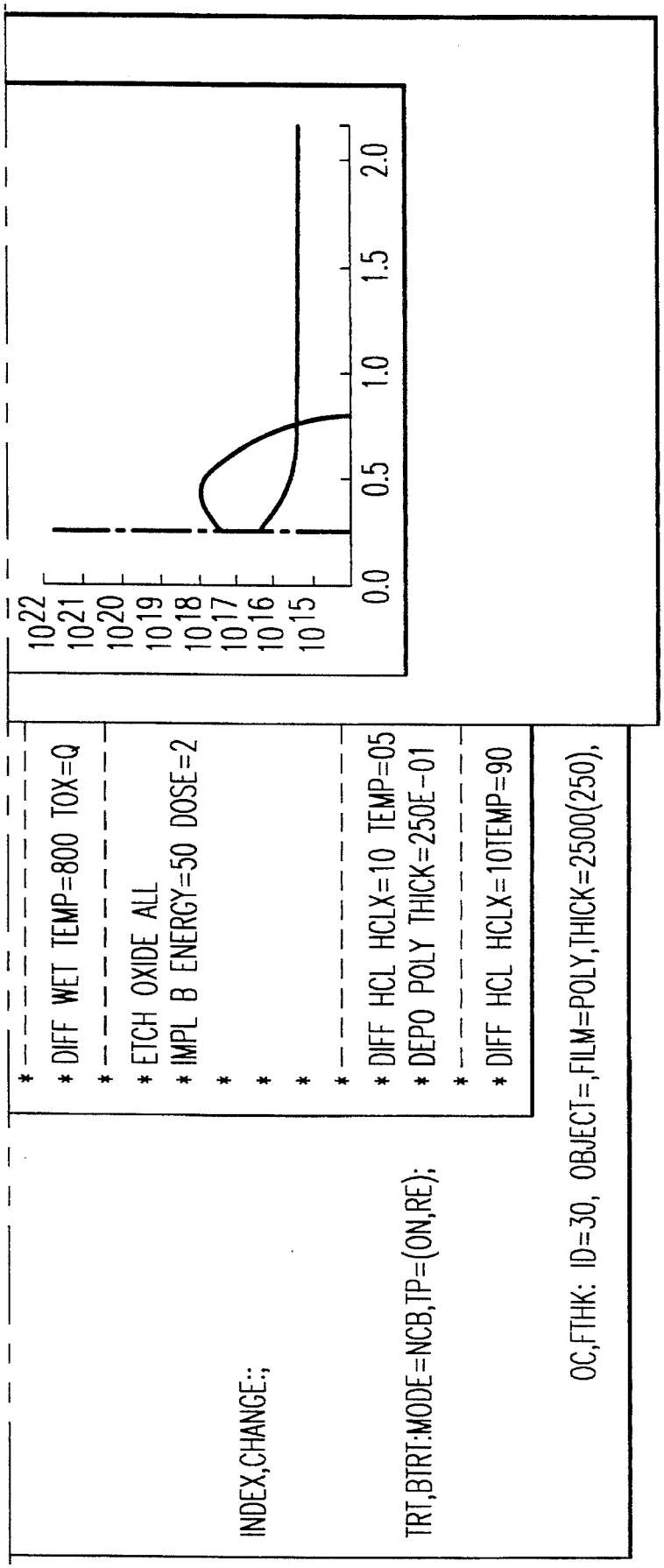
FIG. 13 shows a multiwindow display showing a process flow and simulation results.

FIG. 11 shows the oxidizing diffusion process. After the start of the process, a sample is placed in a furnace. Oxidizing diffusion conditions such as the kinds, flow rates, and heating speeds of gasses are determined.

More precisely, the sample is placed in the furnace at 850 degrees centigrade (C) and left as it is in steps a and b. The temperature is increased to 900° C. in step c. The sample is left as it is in step d. A process specified by the process flow is carried out in step e. The sample is left as it is in step f. The temperature is decreased to 850° C. in step G. The sample is taken out of the furnace in step h. During these steps, different gasses may be introduced.

The recipe file 55 prescribes the process conditions of each of these steps. For example, the recipe file 55 provides process start temperatures, process end temperatures, periods, gasses, gas flow rates, and partial pressures of gasses. FIG. 12 shows an example of a format of the recipe file 55.

A sequence of the steps a to h of FIG. 11 is usually determined according to a combination of gasses and temperatures.

The period of the actual process step e differs depending on process conditions set by a user. Accordingly, an actual process time "Step5, Time" in the recipe file 55 is substituted by a value prescribed in the process flow.

If the format shown in FIG. 12 of the recipe file 55 is fixed, different recipes may be prepared for different process conditions and equipment only by rewriting the recipe file 55.

An automatic recipe data adding function of the converter 13 (FIG. 3) will be explained with reference to an oxidizing diffusion process employing an oxygen gas, a process temperature of 900° C., and an oxidation time of 50 minutes.

The flow preparation unit 11 provides a process flow of the oxidizing diffusion process as follows:

$$OXDIF, OX:GAS=BOX, TEMP=900, TIME=50M \quad (3)$$

The data converter 52 converts this process flow into a simulation process flow, and provides it to the recipe adder 54. The recipe adder 54 retrieves a recipe for the oxidizing diffusion process from the recipe file 55, and adds it to the simulation process flow.

Namely, the recipe adder 54 identifies the oxidizing diffusion process according to the code OXDIF and retrieves a recipe suitable for "GAS=BOX, TEMP=900" from the recipe file 55. The recipe retrieved from the file 55 may be as seen in the following Table 1:

TABLE 1

|  | TEMP1 | TEMP2 | TIME | GAS1 | FLW1 | GAS2 | FLW2 |
|---|---|---|---|---|---|---|---|
| STEP1 | 850 | 850 | 7 | O2 | — | — | — |
| STEP2 | 850 | 850 | 28 | O2 | — | — | — |
| STEP3 | 850 | 900 | 13 | O2 | — | — | — |
| STEP4 | 900 | 900 | 10 | O2 | — | — | — |
| STEP5 | 900 | 900 | X | O2 | 0.88 | — | — |
| STEP6 | 900 | 900 | 15 | N2 | — | — | — |
| STEP7 | 900 | 850 | 20 | N2 | — | — | — |
| STEP8 | 850 | 850 | 40 | N2 | — | — | — |

According to this table. STEP1 places a wafer in a furnace and supplies an oxygen (O2) gas at 850° C. for seven minutes. This step corresponds to the step a of FIG. 11. STEP3 increases the temperature in the O2 gas from 850° to 900° C. within 13 minutes. This step corresponds to the step c of FIG. 11. STEP5 carries out the process stipulated in the expression (3). This step corresponds to the step e of FIG. 11.

An actual process time X of STEP5 is substituted by 50 stipulated in the expression (3). STEP7 decreases the temperature to 850° C. This step corresponds to the step G of FIG. 11. STEP8 takes the wafer out of the furnace, to complete the oxidizing diffusion process. This step corresponds to the step h of FIG. 11.

In this way, the recipe adder 54 adds the recipe to the process of STEP5, i.e., to the simulation process flow of the expression (3).

Each step of the recipe file 55 is additionally written as a process to the simulation process flow. Namely, the recipe adder 54 automatically converts the simulation process flow of the expression (3) into the following expression (4) by adding the recipe:

| .DIFF DRY TEMP=850 TIME=7 | ... STEP1 |
|---|---|
| .DIFF DRY TEMP=850 TIME=28 | ... STEP2 |
| .DIFF DRY TEMP=850 TRATE=10 TIME=13 | ... STEP3 |
| .DIFF DRY TEMP=900 TIME=10 | ... STEP4 |
| .DIFF DRY TEMP=900 TIME=50 PRES=0.88 | ... STEP5 |
| .DIFF NIT TEMP=900 TIME=15 | ... STEP6 |
| .DIFF NIT TEMP=900 TRATE=2 TIME=50 | ... STEP7 |
| .DIFF NIT TEMP=850 TIME=50 | ... STEP8 |
|  | ... (4) |

In this expression (4), steps excluding STEP5 are the recipe data added.

In this way, the recipe adder 54 adds a recipe to a simulation process flow, to complete the simulation process flow, which is transferred to the simulation section 3 from the output unit 57.

The simulation section 3 includes a process simulator 60, a shape simulator 61, and a device simulator 63, as shown in FIG. 1.

The process simulator 60 such as "SUPREM" receives a process flow from the process flow preparation section 1 and mask data from a mask data input unit, to simulate the impurity profiles and thresholds of a silicon substrate. The process simulator 60 may be of any type if it achieves the required function.

The shape simulator 61 receives the process flow and mask data, to simulate product shapes through a production line. For example, it simulates the cross-sectional shapes of films deposited on a silicon substrate. The shape simulator 61 may be of any type if it achieves the required function.

The device simulator 63 receives simulated results from the process simulator 60 and shape simulator 61, to simulate the electric characteristics, etc., of the product in question. For example, it simulates the current-voltage characteristics and threshold voltage of a semiconductor device. The device simulator 63 may be of any type if it achieves the required function.

Figure 18:
FIG. 18 shows another film structure management table.

FIG. 18 shows windows 65, 66, and 67 of a CRT of a computer, displaying simulation results of the simulation section 3. The window 65 shows a process flow for production management, the window 66 shows a process flow for simulation, and the window 67 shows simulation results. The simulation results are sent to the CAD section 5.

As explained above, the simulation section 3 simulates the equipment and operating conditions of a given production line, to help prepare an actual process flow. Recipe data are automatically added to correctly simulate the actual states of the production line so that the production line will efficiently produce products.

The CAD section 5 (FIG. 1) includes a circuit simulator 70, a layout design unit 71, a reticle data generator 72, and a mask data input unit 73.

The circuit simulator 70 receives simulation results such as device model parameters from the device simulator 63 of the simulation section 8, to simulate the operation of circuits of a product such as a semiconductor product. The circuit simulator 70 may be of any type if it achieves the required function.

The layout design unit 71 receives a result of simulation from the circuit simulator 70, to simulate a circuit layout of the product. The unit 71 may be of any type if it achieves the required function.

The reticle data generator 72 receives a simulation result from the unit 71, to simulate reticle data needed for exposing the product. The reticle data generator 72 may be of any type if it achieves the required function.

The mask data input unit 73 receives a result of computation from the reticle data generator 72, to provide mask data such as the lengths of patterns to the process flow preparation section 1.

Figure 14:
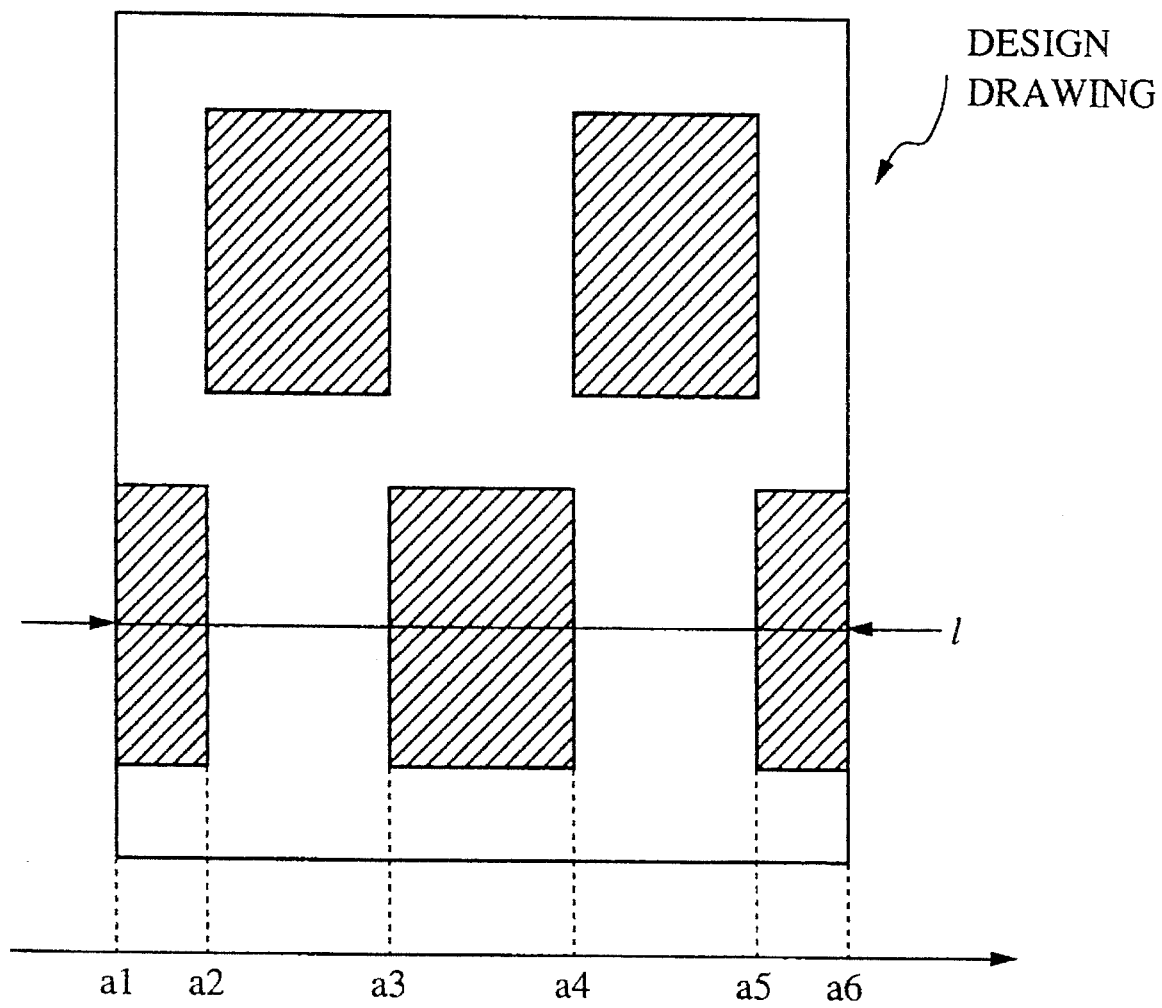
FIG. 14 shows mask data provided by a mask data input unit in the system of FIG. 1.

FIG. 14 shows an example of mask data for designing semiconductor circuits. In the figure, distances a1, a2, a3, a4, a5, and a6 from an original point are length data, i.e., one-dimensional data. It is possible to vertically scan a line 1 at given intervals, to provide two-dimensional length data. The mask data input unit 73 may be of any type if it achieves the required function.

The first checker 15 of FIG. 3 receives the mask data from the mask data input unit 73 and the corresponding process flow from the flow preparation unit 11, to carry out a process flow rule check to see if any clean room in the production section 7 will be contaminated.

Figure 15:
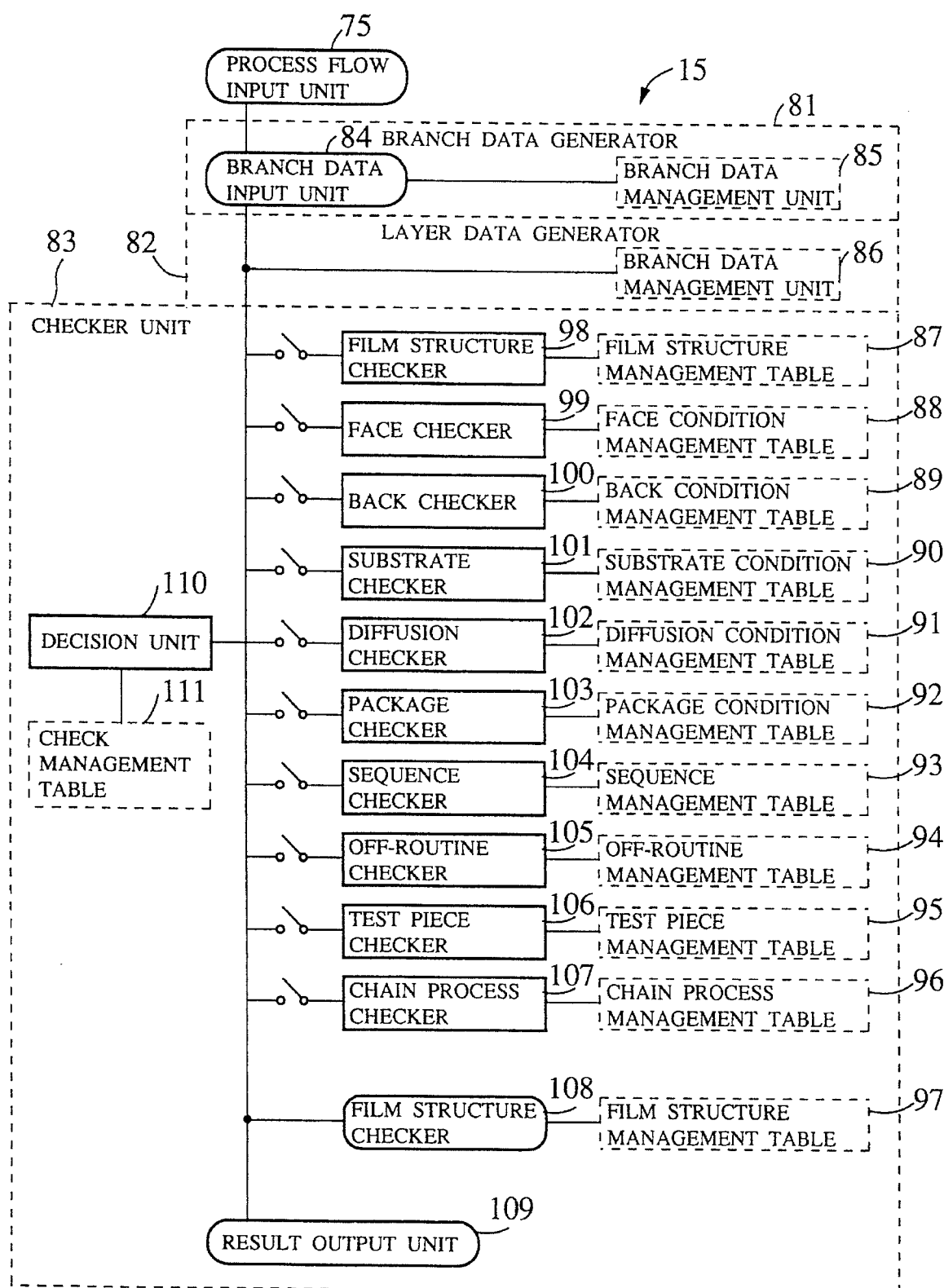
FIG. 15 shows a first checker in the section of FIG. 3.

FIG. 15 shows an example of the first checker 15, which includes a process flow input unit 75, a branch data generator 81, a layer data generator 82, and a checker unit 83. The branch data generator 81 has a branch data input unit 84 and a branch data management table 85. The layer data generator 82 has a mask data management table 86.

The checker unit 83 has management tables 87 to 97, checkers 98 to 107, an error message generator 108, a decision unit 110, and a check management table 111.

The process flow input unit 75 loads a process flow from a storage unit such as a hard disk to a main memory of a computer. As explained above, the process flow is composed of codes, variables, and parameters, which indicate a recipe of production conditions of, for example, semiconductor devices.

The branch data generator 81 receives the process flow from the input unit 75, finds branching processes in the process flow, and prepares a branch data management table 85 accordingly.

If there are branching processes, the branch data generator 81 finds the number of branches in each of the branching processes as well as the number of products and product numbers delivered to each of the branches. The branch data generator 81 groups products according to the branches through which they are going to be processed. The branch data generator 81 then prepares the branch data management table 85. Consequently, a new process flow involving no branching process is prepared for each of the groups. The branch data management table 85 manages the process flow of each product.

In semiconductor device manufacturing, semiconductor products are gathered into lots, and products in the same are processed together. Products in the same lot are sometimes divided into branches in which they are processed branch by branch and then gathered into the original lot. This is called the branching process.

For example, when processing a lot of products 1 to 6 through a main route and a branch, the products 1 to 3 may be processed through the main route and the products 4 to 6 through the branch. This sort of branching is described in the branch data management table 85.

The branching technique is applicable even for a single product. The inside of the product is divided into sections, which are separately processed.

The layer data generator 82 prepares layer data according to mask data, which have been stored in the storage unit through the mask data input unit 73. The mask data include the dimensions of the mask and resist patterns. The layer data generator 82 stores the layer data in the mask data management table 86. The number of layers is managed by a film structure management table 87.

The checkers 98 to 107 check the process flow. The decision unit 110 determines whether or not the checkers 98 to 107 must carry out the check functions. The checkers 98 to 107, management tables 87 to 97, decision unit 110, and check management table 111 will be explained.

The film structure checker 98 checks the process flow, to see whether or not a film structure used to calculate a film etching time is equal to a film structure actually deposited on a product. The actual film structure is managed by the film structure management table 87.

Figure 16:
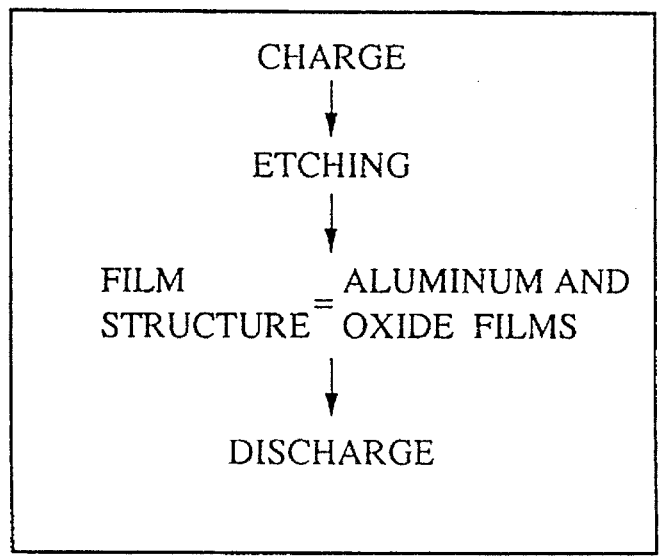
FIG. 16 shows a process flow involving a process checked by a film structure checker.
Figure 17:
FIG. 17 shows a film structure management table.

FIG. 16 shows an example of a process flow, which tells that an aluminum film and an oxide film are etched. FIG. 17 shows an example of The film structure management table 87. This table indicates that only an aluminum film is actually deposited. Consequently, the film structure checker 98 determines that there is an unacceptable difference between the film structure stipulated in the process flow and the actual film structure.

The film structure management table 87 controls films on the face and back of a wafer. When a wafer with no film is oxidized, an oxide film will deposit over the wafer. This oxide film is added to the film structure management table 87.

FIG. 18 shows another example of the film structure management table 87. The table 87 stores each layer data provided by the layer data generator 82. The table 87 of FIG. 18 indicates that the corresponding product has a single layer, which is an oxide film layer.

The wafer surface checker 99 refers to the film structure management table 87, to check allowable and unallowable processes for a film exposed on a product. Rules used for this checking are managed by the wafer surface condition management table 88.

FIG. 19 shows an example of the wafer surface condition management table 88. The top row of the table shows the names of films that may exist on the surface of a product, and the leftmost column shows the names of expected processes.

FIG. 20 shows an example of a product. This product has an exposed film A and is going to receive processes a and b. Table 88 of FIG. 19 indicates that this product is allowed to receive the process a but is not allowed to receive the process b because it has the exposed film A.

FIG. 21 shows an example of another product having exposed films A and B. In this case, table 88 of FIG. 19 indicates that this product is not allowed to receive the process a because it has the exposed film B.

The back checker 100 refers to the film structure management table 87, to determine allowable and unallowable processes for a film exposed on the back of a product. Rules used for this checking are managed by the back condition management table 89.

Figures 22, 23, 24:
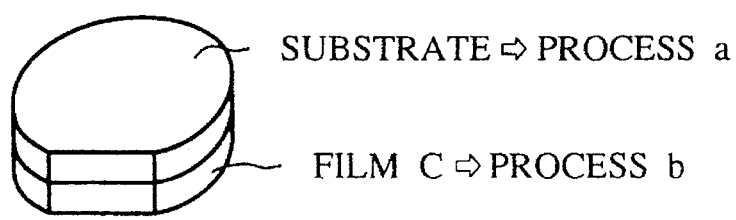
FIG. 22 shows a back condition management table.
FIG. 23 shows a product with a film C on the back thereof subjected to processes a and b.
FIG. 24 shows a substrate condition management table.

FIG. 22 shows an example of the back condition management table 89. The top row shows the names of films that may be on the back of a product, and the leftmost column shows the names of expected processes.

FIG. 23 shows an example of a product. The back of the product has an exposed film C. The table 89 of FIG. 22 indicates that this product is allowed to receive the process a but is not allowed to receive the process b because its back has the exposed film C.

The substrate checker 101 refers to the film structure management table 87, to determine allowable and unallowable processes for films deposited on a product. Rules used for the checking are managed by the substrate condition management table 90.

FIG. 24 shows an example of the substrate condition management table 90. The top row shows the names of films that may exist on a substrate of a product, and the leftmost column shows the names of expected processes.

FIG. 25 shows an example of a product having films A, B, and C on a substrate. In this case, the table 90 of FIG. 24 indicates that this product is not allowed to receive the process b because it has the film C.

The diffusion checker 102 prevents a product that has entered a contaminated diffusion furnace from entering a clean diffusion furnace, to prevent contamination of the clean diffusion furnace. Rules used by the checker 102 are managed by the diffusion condition management table 91.

FIG. 26 shows an example of the diffusion condition management table 91. The top row shows the names of diffusion furnaces which have contained a given product just before, and the leftmost column shows the names of diffusion furnaces to which the product is going to be transferred.

FIG. 27 shows an example of transportation of a product among diffusion furnaces D, E, and F. The product has been in the furnace D and is going to be transferred to the furnace E or F. The table 91 of FIG. 26 indicates that the product is allowed to enter the furnace E but is not allowed to enter the furnace F because it has been in the furnace D.

The package checker 103 checks processes that must be or must not be between processes A and B that make a package process. It also checks processes that must be present when a given process is present. Rules used for this checking are managed by the package condition management table 92.

FIG. 28 shows an example of the package condition management table 92. Each row of the table 92 shows the names of base processes that form a package process, the name of a process that must be included in the package process, the name of a process that must not be included in the package process, the name of a process that must be included in the package process if a given process is included in the package process, and an error code.

Figure 29:
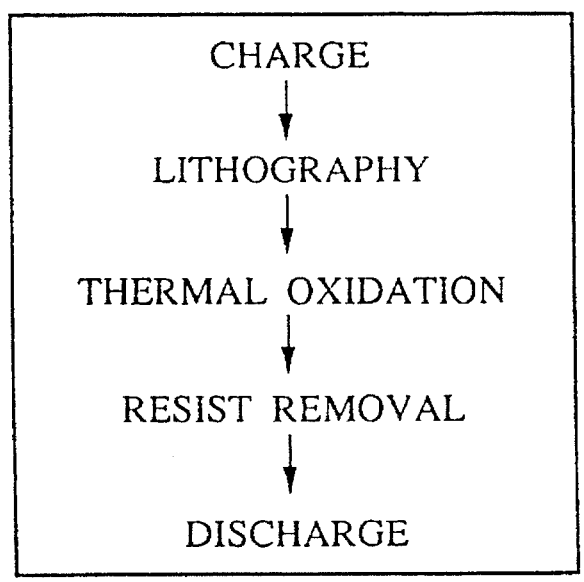
FIG. 29 shows a process flow checked by a package checker.

FIG. 29 shows an example of a process flow including a lithography process, a thermal oxidation process, and a resist removing process. The table 92 of FIG. 28 indicates that a product must not be put in an oxidation furnace if the product includes photoresist.

Figure 30:
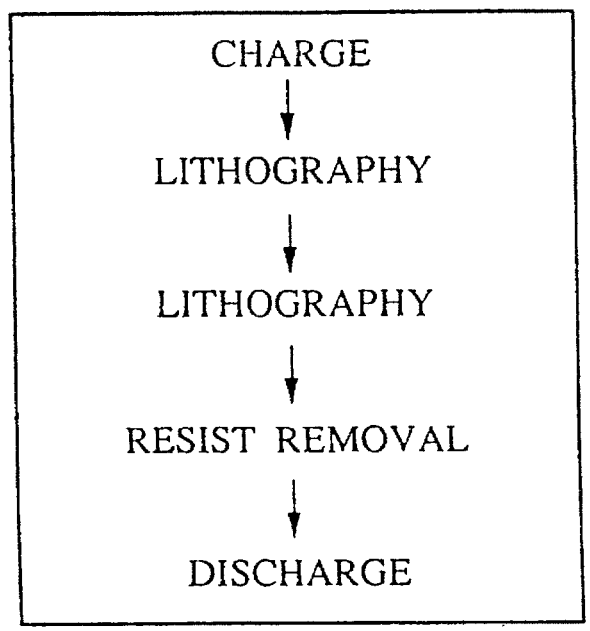
FIG. 30 shows a process flow checked by the package checker.

FIG. 30 shows an example of a process flow including two lithography processes between which no resist removing process is carried out. The table 92 of FIG. 28 indicates that this process flow is not acceptable because the resist removing process is not present between the two lithography processes.

The sequence checker 104 checks a process that must present before a given process, a process that must be present after the given process, a process that must not be present before the given process, and a process that must not be present after the given process. Rules for this checking are managed by the sequence management table 93.

FIG. 31 shows an example of the sequence management table 93. Each row of the table 93 shows the name of a base process, the name of a process to be checked, the position of the process to be checked, the necessity of the process, and an error code.

FIG. 32 shows an example of a process flow including a thermal oxidation process before which no cleaning process is present. The table 93 of FIG. 31 indicates that this process flow is unacceptable because there is no cleaning process before the thermal oxidation process.

The off-routine checker 105 checks a process flow to see whether or not a given process requires an operator's permission. Rules used for this checking are managed by the off-routine management table 94.

FIG. 33 shows an example of the off-routine table management 94. Each row of the table 94 shows the name of a base process, the name of a process to be checked, and an error code.

FIG. 34 shows an example of a process flow including a resistivity measuring process. The table 94 of FIG. 33 indicates that this process flow is unacceptable because the resistivity measurement needs permission.

The test piece checker 106 checks the kind and insertion position of a test piece. The test piece is used to measure the thickness of a film deposited on a product as well as the resistivity of the product after ion injection. Rules used for this checking are controlled by the test piece management table 95.

FIG. 35 shows an example of the test piece management table 95. Each row of the table 95 shows the name of a process that require a test piece, the insertion position of the test piece, the type of test piece, and an error code.

Figure 36:
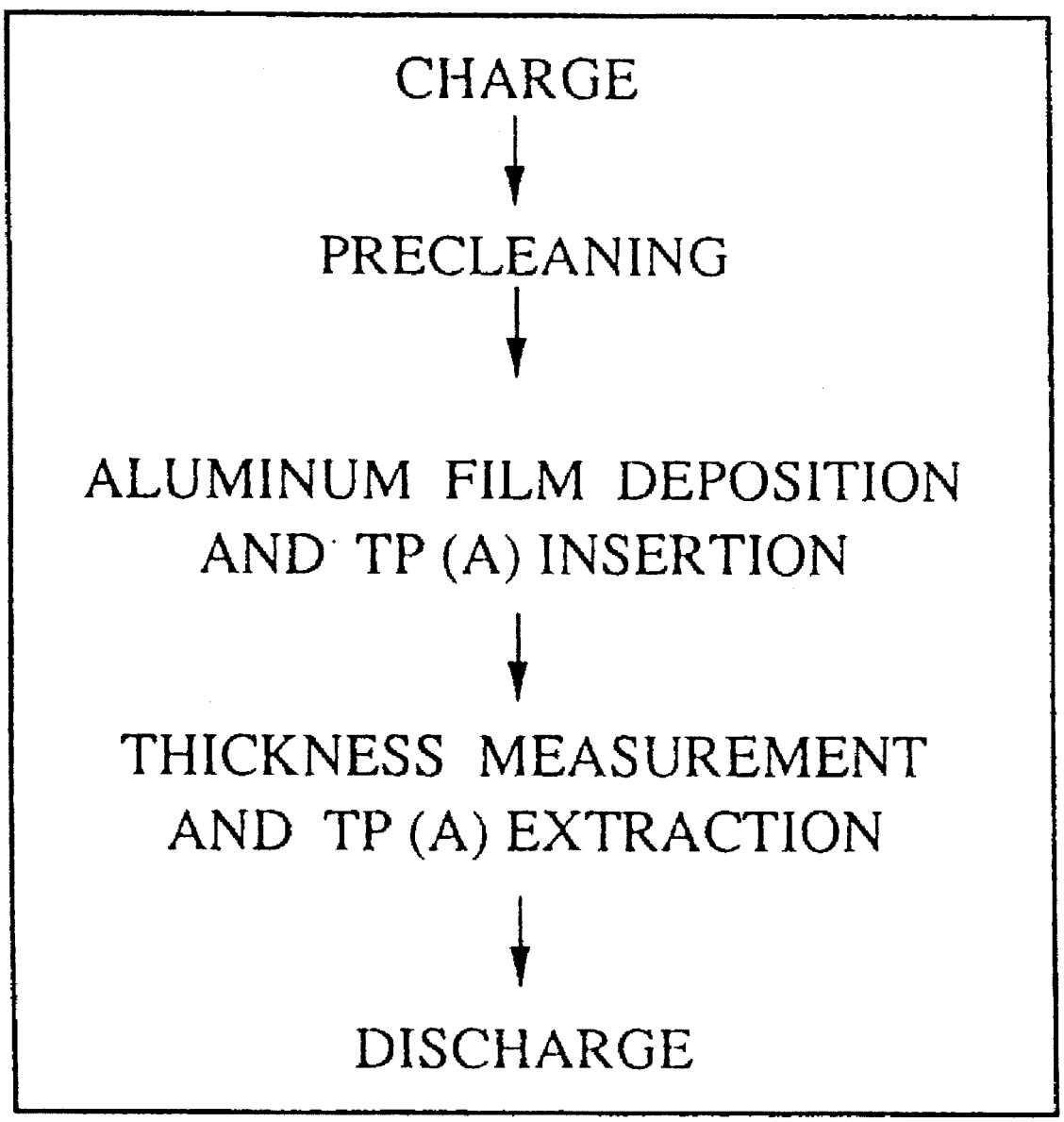
FIG. 36 shows a process flow checked by a test piece checker.

FIG. 36 shows an example of a process flow including a precleaning process, an aluminum deposition process, and a film thickness measuring process. The test piece must be inserted in the precleaning process and removed in the film thickness measuring process according to the table 95 of FIG. 35. The process flow of FIG. 36, however, inserts the test piece in the aluminum deposition process and removes it in the film thickness measuring process. Accordingly, this process flow is unacceptable.

The table 95 of FIG. 35 also checks the kind of the test piece. The table indicates that the test piece for measuring the thickness of an aluminum film must be of exclusive one. The process flow of FIG. 36, however, uses a recycled test piece. Accordingly, this process flow is unacceptable.

The chain process checker 107 checks a process flow, to see whether or not chain processes that must not be interrupted with a wait state are correctly described. Rules used for this checking are managed by a chain process management table 96.

FIG. 37 shows an example of the chain process management table 96. Each row of the table shows the names of chain processes and an error code.

Figure 38:
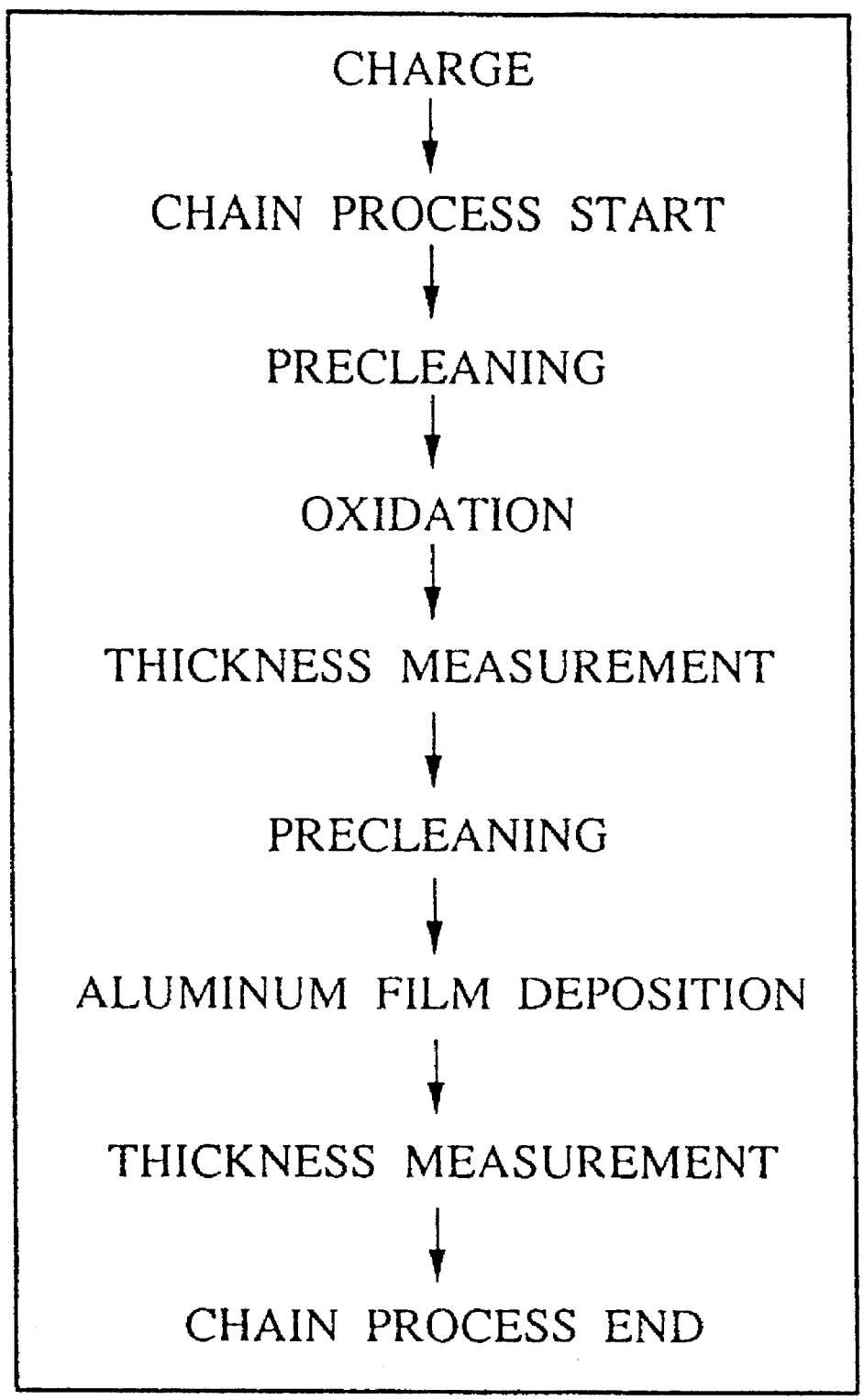
FIG. 38 shows a process flow checked by a chain process checker.

FIG. 38 shows an example of a process flow including a precleaning process, an oxidation process, a film thickness measuring process, a precleaning process, an aluminum film deposition process, and a film thickness measuring process.

The table 96 of FIG. 37 indicates that the precleaning process is required only at the start of the chain of the processes. The process flow of FIG. 38, however, repeats the precleaning process before the aluminum film deposition process. Accordingly, this process flow is unacceptable.

The error message generator 108 provides an error message once an unacceptable state occurs in any one of the checkers 98 to 107. Error message data are managed by the error code management table 97.

Figures 39, 40, 41:
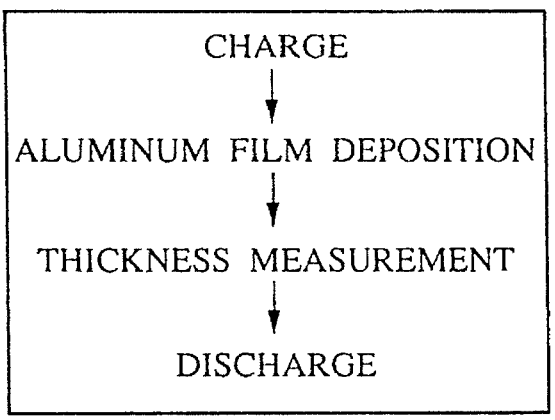
FIG. 39 shows an error code management table.
FIG. 40 shows a process flow checked by an error message generator.
FIG. 41 shows a check management table.

FIG. 39 shows an example of the error code management table 97. Each line of the table shows an error number and an error message corresponding to the error number.

FIG. 40 shows an example of a process flow. This flow has no precleaning process before an aluminum film deposition process. Accordingly, the sequence checker 104 and sequence management table 98 provide an error code 008 to indicate that this flow is unacceptable. According to the error code, the table 97 of FIG. 39 prepares the following message:

NO PRECLEANING PROCESS BEFORE FILM DEPOSITION PROCESS

A result output unit 109 prepares an error file containing error messages according to check results. If there is no error, the unit 109 provides a CAM file.

The decision unit 110 determines whether or not the checkers 98 to 107 must carry out the checking operations, according to the check management table 111.

FIG. 41 shows an example of the check management table 111. This table contains the checker names and data specifying whether or not the checking operations must be carried out. The table of FIG. 41 indicates that all checkers except the substrate checker must be activated. In this way, the table 111 effectively manages the checkers that are activated and inactivated.

Operation of the first checker 15 will be explained.

The process flow input unit 75 loads a process flow, which has been prepared with use of a screen editor, etc., and stored in a storage unit such as a hard disk and a floppy disk, to a main memory of a computer.

FIG. 42 shows an example of a process flow. The process flow is formed of sequential codes. Each line of the codes corresponds to a process.

The branch data generator 81 checks the process flow to see whether or not it includes any branching process. If it includes the branching process, the branch data generator 81 finds the number of branches in the branching process, the numbers of products divided to the respective branches, and the product numbers allocated for each of the branches. According to the product numbers, the products are grouped for the respective branches.

In this way, the branch data generator 81 prepares for every product a process flow that includes no branching. The prepared data are written in the branch data management table 85, which is used by the checkers 98 to 107. Accordingly, the check system is remarkably simplified.

The layer data generator 82 obtains the mask dimensions and resist data of each lithography process contained in the process flow, and separates overlay mask patterns from independent mask patterns. Consequently, the layer data generator 82 forms a new layer data management table 86. The number of layers provided by this table is used by the film structure management table 87.

Each process flow newly prepared by the branch data generator 81 is checked by the checkers 98 to 107 with use of the management tables 87 to 96.

As an example, the fifth process in the process flow of FIG. 42 will be explained.

The film structure checker 98 compares a film structure written in the process with a film structure that has been deposited on a product and recorded in the film structure management table 87. In the case of the example of FIG. 42, however, this step is omitted because the process of FIG. 42 includes no etching.

The wafer surface checker 99 fetches information about the surface of the product from the film structure management table 87 as well as information about the fifth process from the process flow. The unit 99 then refers to the face condition management table 88, to determine whether or not the fifth process is executable according to the film present on the surface of the product.

The back checker 100 fetches information about a film present on the back of the product from the film structure management table 87 as well as the information about the fifth process from the process flow. The unit 100 refers to the back condition management table 89, to determine whether or not the fifth process is executable according to the film on the back of the product.

The substrate checker 101 fetches information about all films present on the product from the film structure management table 87 as well as the information about the fifth process from the process flow. The unit 101 refers to the substrate condition management table 90, to determine whether or not the fifth process is executable according to the films on the product.

The diffusion checker 102 compares a diffusion furnace used by the fifth process with a diffusion furnace to be used by the 16th process. The unit 102 refers to the diffusion condition management table 91 to prevent the product from being transferred from a contaminated furnace to a clean furnace.

The package checker 103 refers to the package condition management table 92, to determine whether or not the fifth process is in a package of processes.

The sequence checker 104 refers to the sequence management table 93, to determine whether or not processes that must be present before and after the fifth process are present, and whether or not processes that must not be present before and after the fifth process are present.

The off-routine checker 105 refers to the off-routine management table 94, to determine whether or not the fifth process is authorized be carried out.

The test piece checker 106 refers to the test piece management table 95, to determine whether or not a test piece employed in the fifth process is correct and whether or not the test piece is inserted and removed at the appropriate times.

Finally, the chain process checker 107 refers to the chain process management table 96, to determine whether or not chain processes are carried out in correct order.

If any one of these checkers provides an unacceptable result, the error message generator 108 refers to the error code management table 97 and provides an error message, which is provided to an external storage unit through the result output unit 109. If there is no unacceptable result, the result output unit 109 provides a CAM file to the external storage unit.

The decision unit 110 refers to the check management table 111, to determine whether or not the above checking steps must be carried out.

As explained above, the first checker 15 uses the checkers 98 to 107 and management tables 87 to 96 to check a process flow at high speed. For example, human check will take about 30 minutes when checking a flow of about 300 processes. On the other hand, the above check system of the present invention takes about one tenth of the human check time when checking the same process flow. The check operations mentioned above may be optionally carried out according to a system manager's judgment.

The branch data generator 81 of FIG. 15 will be explained in detail.

Figure 43:
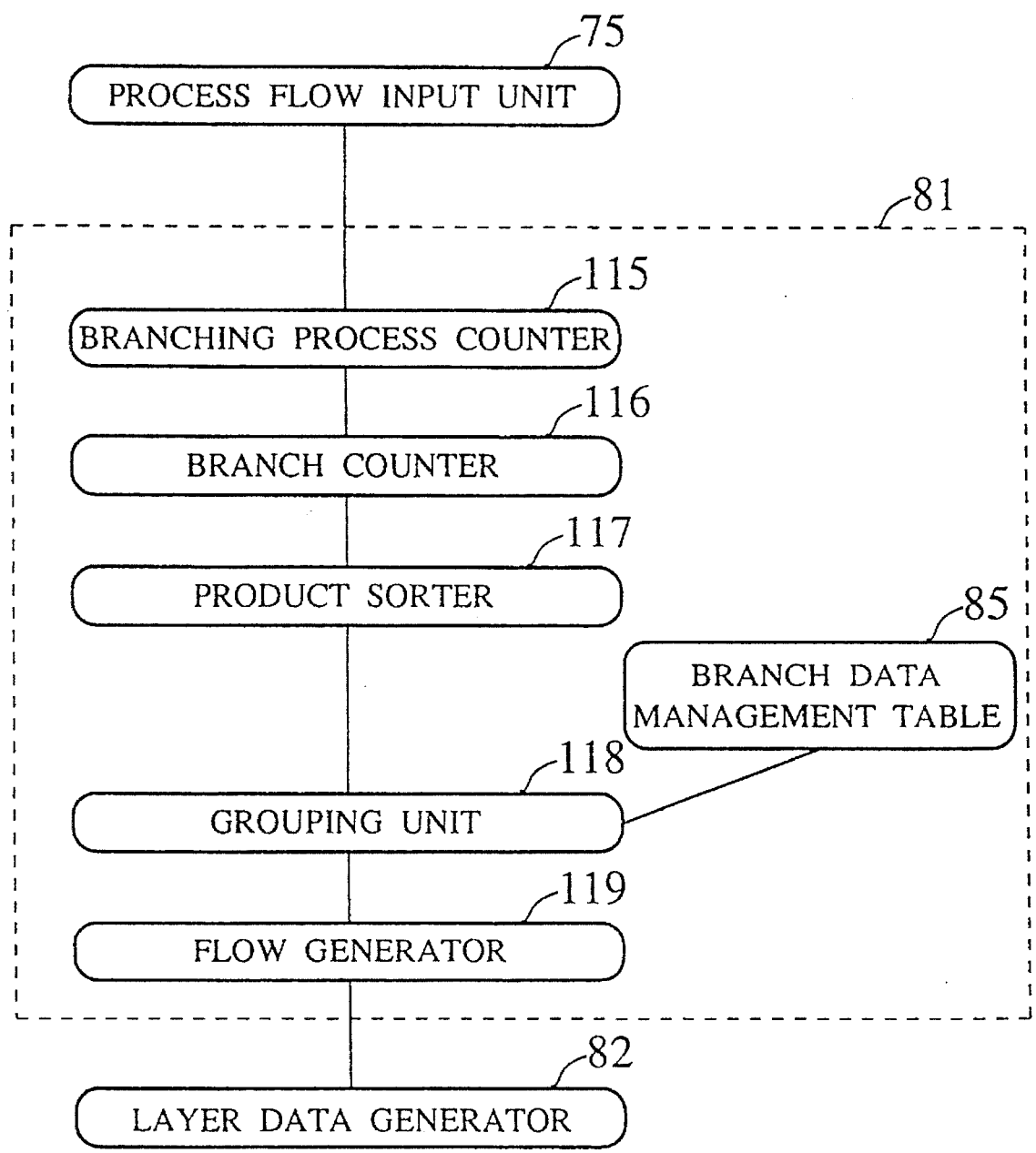
FIG. 43 shows a hardware arrangement of a branch data generator in the unit of FIG. 15.

In FIG. 43, the branch data generator 81 includes a branching process counter 115, a branch counter 116, a product sorter 117, a grouping unit 118, a flow generator 119, and the branch data management table 85.

The branching process counter 115 counts the number of branching processes in a given process flow. For example, an example of a process flow of FIG. 44 involves two branching processes. In this case, the number of branching processes is two.

Figure 45:
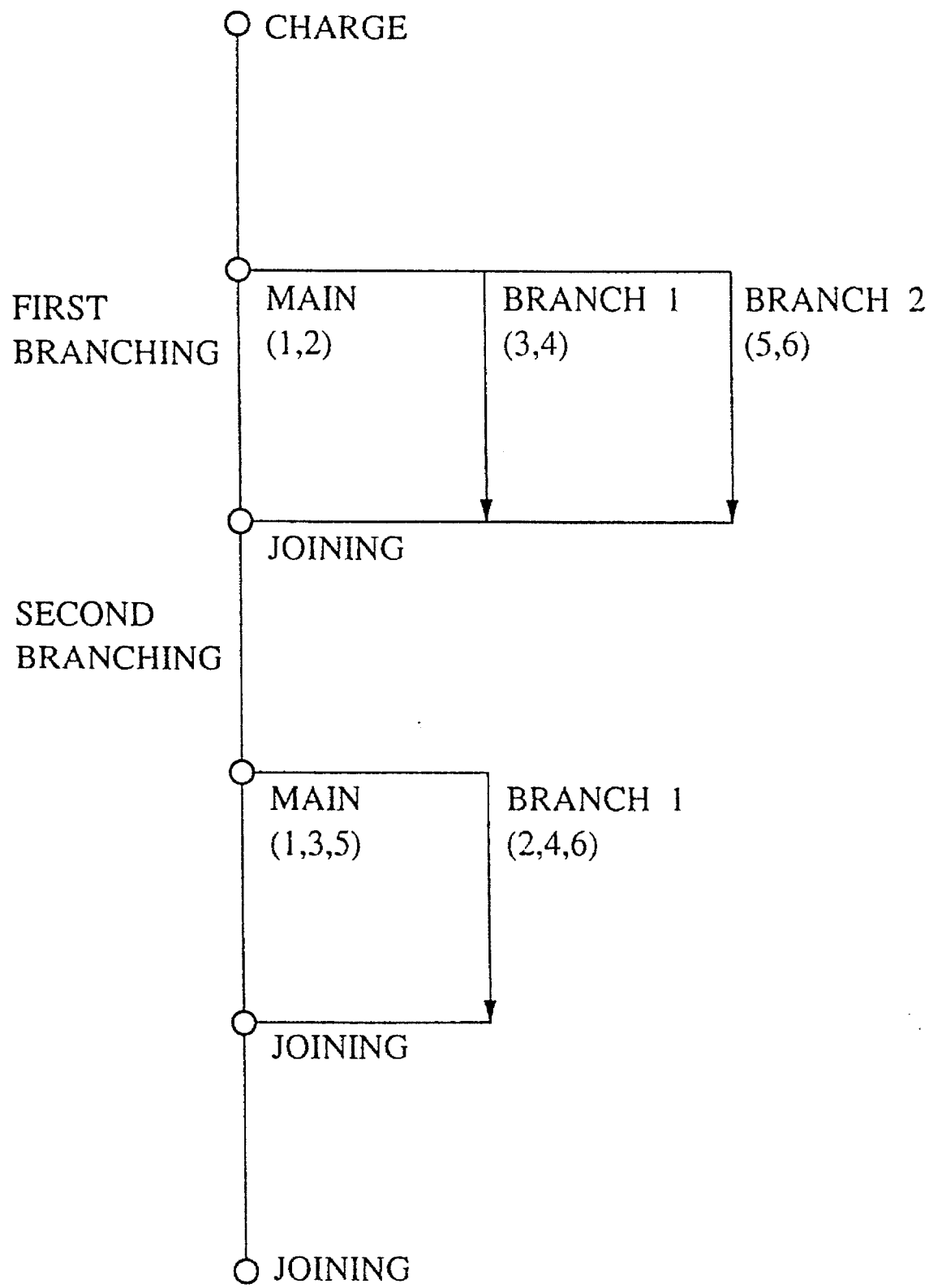
FIG. 45 shows the branching process of FIG. 44.

FIG. 45 shows routes and branches for passing a lot of products 1 to 6.

The branch counter 116 counts the number of branches of each branching process. According to the process flow of FIG. 44, the first branching process divides a main flow into three branches, and the second branching process divides the main flow into two branches.

The product sorter 117 sorts the products according to the branches. For the first branching process of FIG. 44, the products 1 and 2 are sorted for a main path, the products 3 and 4 for a branch 1, and the products 5 and 6 for a branch 2. For the second branching process, the products 1, 3, and 5 are sorted for a main path, and the products 2, 4, and 6 for a branch 1. FIG. 46 shows the details of the sorting.

The grouping unit 118 refers to the data provided by the product sorter 117, to group the products according to their routes and prepare the branch data management table 85.

FIG. 47 shows an example of the branch data management table 85. Since none of the products has the same process pattern in FIG. 46, there are six groups a, b, c, d, e, and f. The grouping unit 118 employs the table 85, to prepare a process flow for each of the groups or the products.

Figure 48:
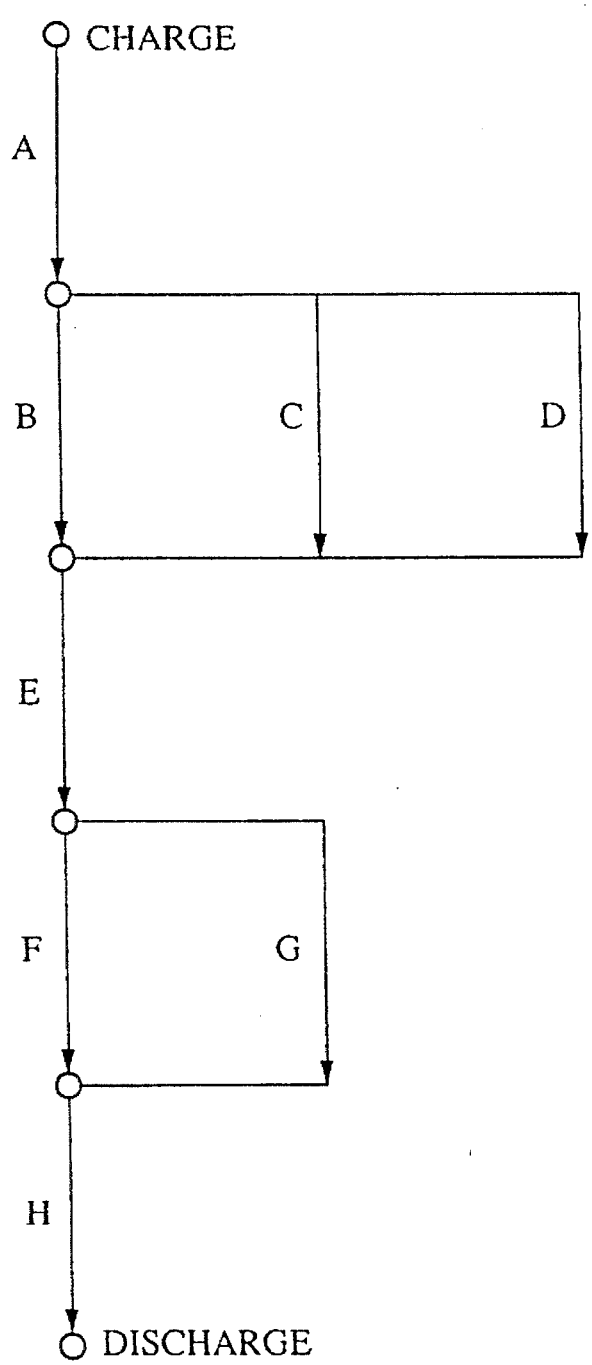
FIG. 48 shows a process flow divided into patterns.

In FIG. 48, a route from the start to the first branching process is A. The first branching process involves a route B running along the main path, a route C along the branch 1, and a route D along the branch 2. A route from a downstream Joint of the first branching process to the second branching process is E. The second branching process involves a route F running along the main path and a route G along the branch 1. A route from a downstream joint of the second branching process to the end is H.

Figure 49:
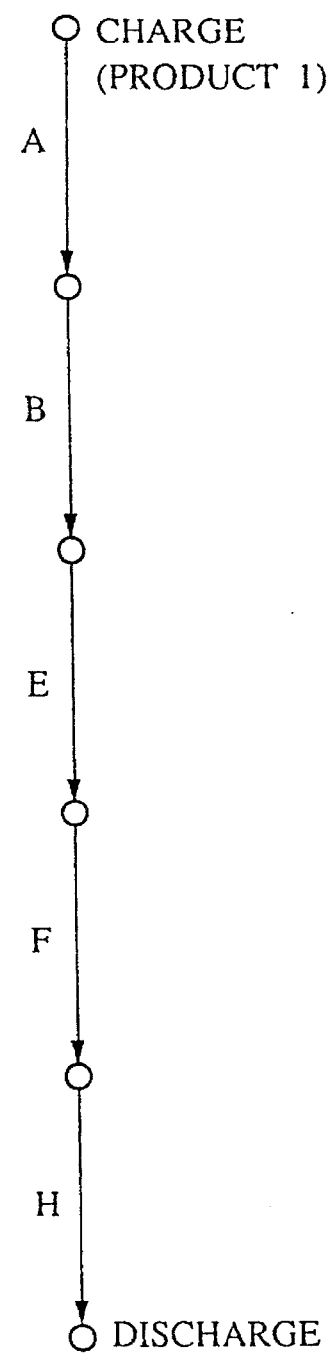
FIG. 49 shows a process flow for a product 1 involving no branches.

According to the table 85 of FIG. 47, the flow generator 119 prepares, for each group or for each product, a process flow that includes no branching process. For example, a flow for the product 1 will be A+B+E+F+H as shown in FIG. 49.

Means for realizing the above system will be explained with reference to FIG. 43.

The branching process counter 115, branch counter 116, product sorter 117, grouping unit 118, and flow generator 119 are realized in a main memory of a CPU. The branch data management table 85 is stored in a storage unit such as a hard disk or a floppy disk.

The branching process counter 115, branch counter 116, product sorter 117, and grouping unit 118 may be realized in the main memory in time series. Results provided by these units are accumulated in the branch data management table 85. The flow generator 119 refers to this table, to prepare process flows each including no branching process. These process flows are stored in the storage unit.

Operation of this system will be explained.

The process flow input unit 75 loads a process flow into the main memory. The branching process counter 115 checks the process flow to see whether or not it includes branching processes. If there are, the counter 115 counts the number of the branching processes. If there are no branching processes, this operation ends.

The branch counter 116 counts the number of branches in each branching process.

The product sorter 117 refers to the data written in the process flow and sorts products according to the branches. The grouping unit 118 groups the products according to process routes. A result of the grouping is stored in the branch data management table 85.

The flow generator 119 refers to the table 85, to prepare a process flow, which includes no branching process, for each group. The newly prepared process flows are used for checking.

In this way, the present invention prepares process flows including no branching process from an original process flow that may include branching processes, and lets a computer check the process flows at high speed. The checking of the process flows by computer will be easy because the process flows involves no branching process.

The first checker 15 realized in a computer automatically checks process flows. Accordingly, anyone can easily check process flows without mistake.

The first checker 15 is not limited to the arrangement mentioned above. Modifications of the checker will be explained.

Figure 50:
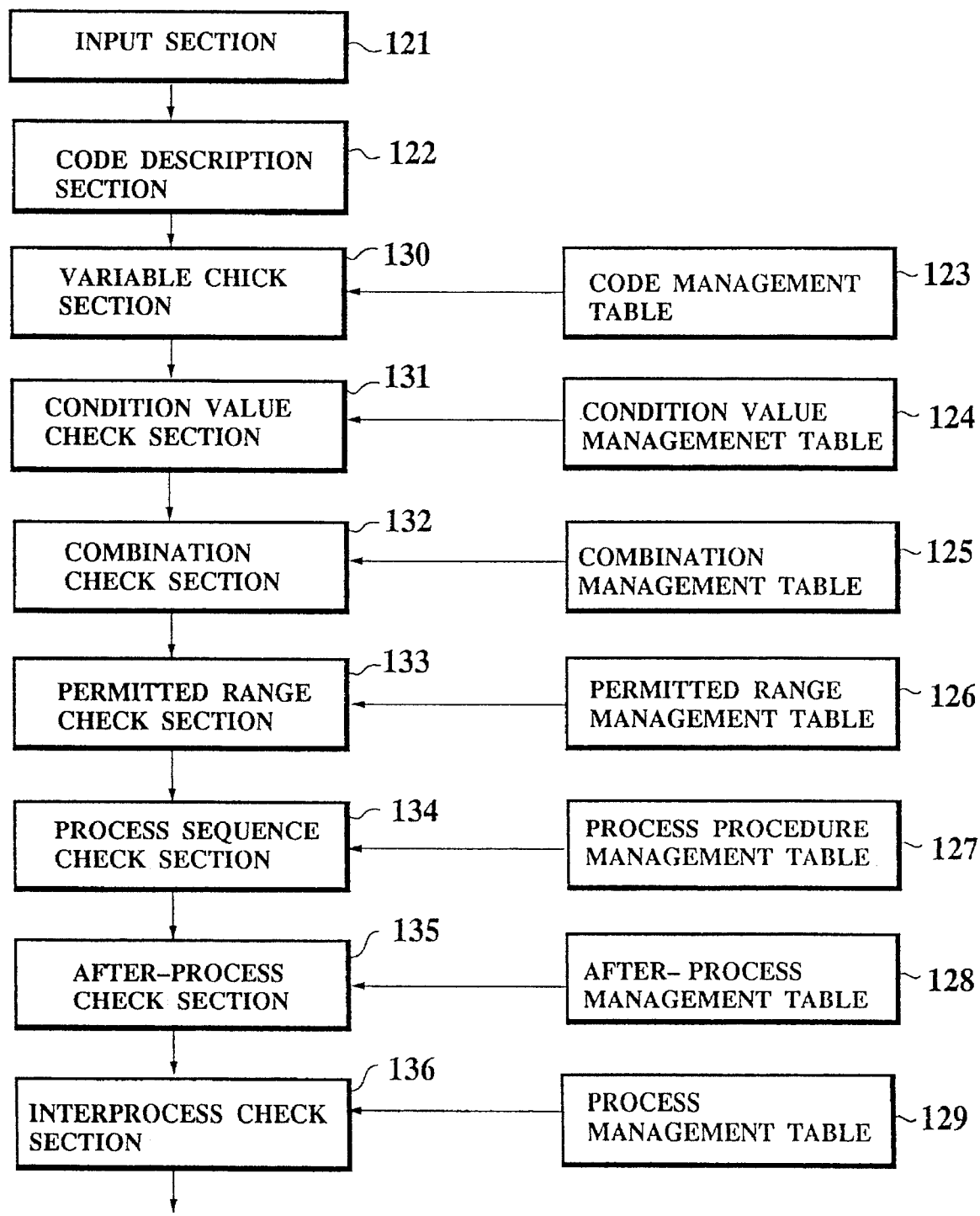
FIG. 50 shows a modification of the first checker of FIG. 15.

FIG. 50 is a functional block diagram of a modification of the first checker.

The above-mentioned block diagram comprises an input section 121, a code description section 122, a plurality of management tables 123 to 129, and a plurality of checking sections 130 to 136.

A plurality of codes (process development language) indicating each process in the manufacturing of semiconductors is input at the input sections 121.

These codes are made up of the codes which indicate the type of processing in the manufacturing process, the variables attached to each process, and the parameters (variable values) which are assigned to the variables. In addition, there are two codes which indicate the process type—a header which indicates a major code (large code), and a subdivision which indicates a medium code (middle code).

For example, a code which indicates a header of a low pressure Chemical Vapor Deposition (CVD) process in a CVD process is "CVD", and the code which indicates a subdivision is "LPCVD".

In addition, the variables attached to the CVD process include, for example, "FILM" which indicates the type of film, and "THICK" which indicates a deposited thick film.

The parameters under "FILM" include "POLY" which indicates polycrystalline silicon, or "SIN" which indicates silicon nitride film, and the like. The figures "1000" or "500" or the like assigned to "THICK" give the desired thickness of the deposited film in angstrom units (Å).

Accordingly, a process to form a 1000Å silicon carbide film is indicated by the code "CVD, LPCVD: FILM=SIN, THICK=1000;".

The header code for an ion implantation process is "IMP", and the subdivision code for a low-dose ion implantation process under that header is "LDOSE". In the variables attached to ion implantation, "ELEMENT" indicates the type of ion, "ENERGY" indicates the implantation accelerating voltage, "DOSE" indicates the amount implanted, and the like. Parameters under "ELEMENT" include "BORON", "AS", and the like for the type of ion, and as parameters under "ENERGY", "100", "150" and the like give the value for the accelerating voltage in keV units. For "DOSE", "2E13" indicates 2×10$^{13}$, and "1.5E13" indicates 1.5×10$^{13}$ as the amount implanted in cm$^{-2}$ units. For example, in a low-dose ion implantation process, the code "IMP, LDOSE:ELEMENT=BORON, ENERGY=50, DOSE= 1E13:" is an instruction to implant 1×10$^{13}$ cm$^{-2}$ of boron at 50 keV.

These types of code designate the various processes and types of treatment, and the appended variables indicate changes in the process and treatment.

Easy management is provided by breaking down the designation for types of treatment into four codes (headers, subdivisions, variables, and variable values) which can be efficiently checked by computer, and in addition, the type of treatment can be established by one code arranged into a header and subdivision as desired, and a process can be indicated using three types of codes. An operator can enter a number of codes from the code description section 122 to describe the manufacturing process in sequence. For example, the above-mentioned series of processes can be arranged into a manufacturing process sequence using the code description section 122 as follows:

"CVD, LPCVD:FILM=SIN, THICK=1000; IMP, LDOSE:ELEMENT= BORON, ENERGY=50, DOSE=1E13; . . ."

As a specific example of the code description section 122, a screen editor or word processor can be used, and the input section 121 can be a keyboard.

The relationship of the header, subdivision, and variable appended to each treatment is preset from a code management table 123. An example of the code management table 123 is given in FIG. 51.

As shown in FIG. 51, codes AA1, AA2 and the like which indicate the subdivision are classified under a code A which indicates the header. Variables PR1, PR2, PR4 and the like are classified under AA1.

Taking a CVD process as an example, the header indicated by the code A is CVD, the subdivision indicated by the code AA1 is LPCVD, and the variables PR1 and PR2 indicating the treatment are FILM and THICK respectively.

The codes preset in the code management table 123 are compared using a variable check section 130, then the presence or absence of each input code and the spelling are checked. The condition values attached to each variable (component names) are preset in a condition value management table 124 (see FIG. 52).

The condition value management table 124 is compared with a condition value check section 131, then the condition values attached to each variable (component names) are checked for their presence or absence in the condition value management table 124.

The code groups (header, subdivision) stipulated in the code management table 123 combined with the variable groups are preset in a combination management table 125. In addition, when the combination of the code groups and the variable groups is correct, a recipe code, which is a code for interfacing one or more pieces of equipment, is allotted in the combination management table 125 (see FIG. 53). The recipe code is for specifying the treatment mode in the control computer attached to the processing equipment 195.

The correctness of the above-mentioned combination of code groups and variable groups is checked by a combination check section 132, using the combination management table 125.

An upper limit and a lower limit for the condition values (variable values) assigned to each variable are preset using an allowable range table 126 (see FIG. 54). The permitted range table 126 is provided for each process so that the number of the tables 126 is equal to the number of the process. The condition values are established from the capacity of the processing equipment 195 and the like.

Regulation of the treatment condition values of the code described between allowable upper and lower limits is checked by an upper/lower limit check section 133 using the permitted range table 126.

Condition values other than numerical values are handled by the condition value management table 124 shown in FIG. 52, but condition value which are numerical values are handled by the allowable range table 126 shown in FIG. 54.

In this case, as shown in FIG. 54, there is one case where target values only are established because the process precision is inadequate so that a specific permitted range cannot established, for example, as in the case of a thick film from a CVD process, and there is another case where the production equipment can cope with the required precision, when an upper limit and/or a lower limit is established, even if a specific allowable range is set, as in the amount of implantation in an ion implantation process.

The basic dimensions of the process flow and the condition values (component names or variable values) are checked using the foregoing management tables 123 to 126.

Next, checking the process flow procedures using the following management tables 127 to 129 and check sections 134 to 136 will be described.

Two optional process procedures/combinations are managed with a process procedure management table 127 (FIG. 55).

The correctiveness of two continuous optional process procedures/combinations is checked with a process sequence check section 134 using the process procedure management table 127.

The process procedure management table 127 shown in FIG. 55 indicates that the process B may follow the process A. But, if the process B does not follow the process A or the process B precedes the process A, the process procedure/combination is not acceptable (NG). In the same manner, the table 127 indicates that a process C may precede the process A. But, if the process C does not precede the process A or the process C follows the process A, the process procedure/combination is not acceptable (NG).

A check is made for errors in the sequential relationship, and for the incorporation of a process (C) prior to, and of an inspection process (B) as an auxiliary process, following a main process (A), which is liable to be overlooked by the engineers and researchers, and the like.

The correctness of a process which deals with a certain process following one process or following several processes, is managed by an after-process management table 128 (see FIG. 56).

The correctness of a process which deals with a certain process following one process or following several processes, is checked by an after-process check section 135 using the after-process management table 128.

In the after-process management table 128 shown in FIG. 56, when a process 'a' follows a process A, there may be a process T between them, but if there is no process T between them, then the process 'a' may not follow the process A, and the process C may not follow the process B.

For example, when a process (a) for forming a Poly Si film by LPCVD follows a BPSG film forming process (A), a process (T) may be used to form an oxidized film to prevent soiling of the LPCVD furnace by B and P, but if the Poly Si film forming process (a) does not follow the oxidized film forming process (T), the process procedure/combination is not acceptable (NG).

In addition, if a thermal oxidation film forming process (C) follows an evaporation process (B) for an Al film, the process procedure/combination is not acceptable (NG).

A process which must come between a certain two processes (in one package) or a process which must not come between those two processes is managed by a process management table 129 (see FIG. 57).

A process which must, of necessity, come between two processes, or, a process which must not come between those two processes, is checked by an interprocess check section 136 using the process management table 129. For example, because a resist peeling process always must be present between two lithography processes, a check is made for the presence or absence of this resist peeling process. If the resist removal process is present, an oxidation process must be present between the lithography process and the resist removal process, so a check is made for the presence or absence of the oxidation diffusion process.

In the process management table 129 shown in FIG. 57, it is acceptable (OK) for a process A to come between a certain two processes (in one package), but it is not acceptable (NG) for the process A to be absent. So when the process A is present, it is not acceptable (NG) for the process B to be present in a certain interval, for example, in the package in the interval up to the process A. The judgment is made in the same way for the following package.

In a package, for example, repeating units are used, and the production process is divided by these repeating units. More than twenty masks are used in the process for manufacturing integrated circuits. For example, a group of processes from one lithography process to the next lithography process is considered to be a package. Accordingly, when the oxidation process takes place prior to the resist removal process (A), the oxidation furnace is soiled by the resist, therefore that sequence is forbidden (NG in the table).

In processes other than the lithography process, it is also possible to consider a package to be a group of processes between two oxidation diffusion processes, and the like, so that an optional group of processes can be determined as a package.

As described above, the correctness of two continuous process procedures/combinations is checked with the process sequence check section 134 using the process procedure management table 127. The correctness of the description of a process which is handled after a certain process is checked by the after-process check section 135 using the after-process management table 128. And a process which must, of necessity, come between two processes, or, a process which must not come between those two processes, is checked by the interprocess check section 136 using the process management table 129.

In these sequence checks of the process flow, there are two regulations. First one is an against-device regulation to prevent a device manufactured by a prior treatment and inspection process from not functioning as planned with respect to the function pertaining to the device, and second one is an against-manufacturing device regulation, for example, to prevent the line being stopped because the LPCVD furnace is fouled by the BPSG film in the case where a Poly Si film is formed by LPCVD after film Forming by BPSG. The process flow check is performed by the check sections 134 to 136 according to these against-device-prohibition conditions and against-manufacturing-equipment-prohibiting conditions.

Next, the function of the modification of the first checker will be explained.

The header codes showing the type of production process or treatment, the subdivision code, and the codes such as the variables associated with a treatment and the parameters (variable values) assigned to those variables, are input to the first computer 101 from the input device 121.

The codes which have been input are described in the sequence of the process in the code description section 122 as process flow data. At this time, the program described in the code description section 122 is used, for example, in the screen editor or word processor or the like. In addition, the described process flow data is stored in a recording medium such as a floppy disk or a hard disk or the like, which has been omitted from the drawings. An example of process flow data which is displayed on a display screen which has been omitted from the drawings is illustrated in FIG. 42. A code group described in the sequence of the process is also shown in FIG. 42. One line of process flow data corresponds to one process. For example, the fifth statement listed under NUMBER indicates that the treatment carried out is "an oxidation process, by field oxidation, using oxygen gas at a temperature of 1000° C. to a film thickness of 11,000Å".

Next, a process flow check is carried out for the process flow data stored in the recording medium, using the management tables 123 to 129 and the check sections 130 to 136. The check made under the fifth statement for the process flow data shown in FIG. 42 will now be explained.

This fifth statement first calls the conversion check section 130 to check for the presence of the variables OXDIF, OX, OBJECT, GAS, TEMP, THICK, and the like, and the correctness of their spelling, using the code management table 123.

Next, in the condition value check section 131, a check is made, using the condition value management table 124, to see if FIELD is assigned to the code OBJECT, indicating a variable, and O to the code GAS, and the like. Here, the specification of condition values which are not managed by the condition value management table 124 is forbidden.

A check is made by the combination check section 132 using the combination management table 125 to determine whether the code groups and variables are correctly combined. If the results of this check show that the combinations are correct, a recipe code is allotted as an interface code between individual pieces of production equipment.

A check is made by the upper/lower limit check section 133 using the permitted range management table 126 to determine whether a film thickness of 11,000 Å is contained in the standards.

Next, the decision is made by the process sequence check section 134 using the process procedure management table 127 as to whether an inspection process occurs prior to the oxidation process of the fifth line.

In addition, a decision is made by the after-process check section 135 based on the after-process management table 128 as to whether a treatment is carried out after the oxidation process of the fifth line in FIG. 42.

Further, a decision is made by the interprocess check section 136, using the process management table 129, as to whether a process may come between the oxidation diffusion process of the fifth line and the oxidation diffusion process of the sixteenth line in FIG. 42.

The results of all these checks are output to the printer. If the results are satisfactory, the process flow data is stored in a hard disk.

These are the operations of the modifications of the first checker 15.

The second checker 17 will be explained. This checker inspects a process flow, which has been checked by the first checker 15, for production know-how of the production section 7.

Figure 58:
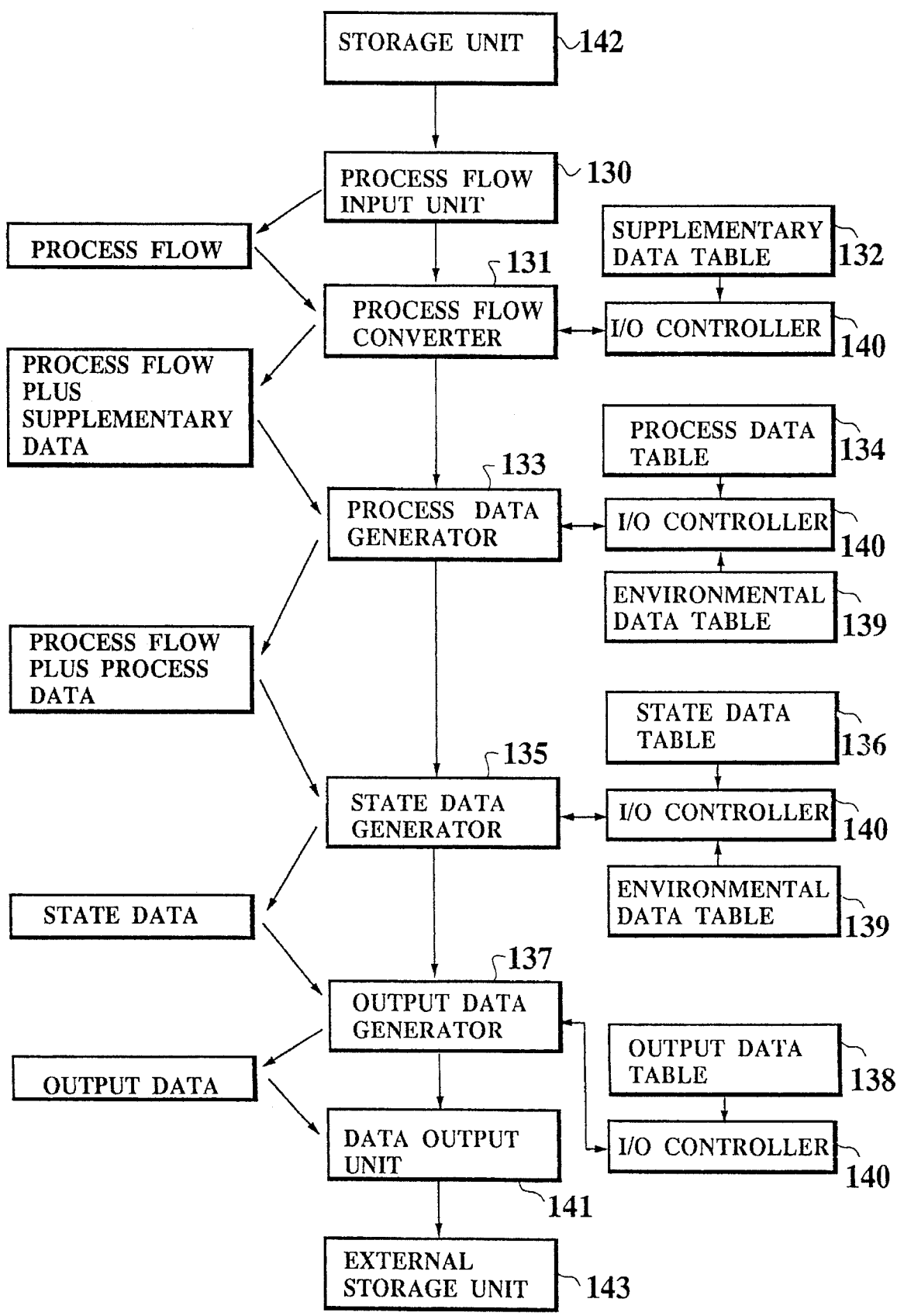
FIG. 58 shows a second checker in the section of FIG. 3.

FIG. 58 shows the second checker 17. The second checker 17 includes a process flow input unit 130, a process flow converter 131, a supplementary data table 132, a process data generator 133, a process data table 134, a state data generator 135, a state data table 136, an output data generator 137, an output data table 138, an environmental data table 139, an I/O controller 140, and a data output unit 141.

The process flow input unit 130 fetches a process flow from a storage unit such as a hard disk to a main memory of a computer. The process flow is a sequence of processes represented with codes, variables, and parameters.

The process flow converter 131 adds supplementary variables, parameters, etc., to the process flow and converts the flow into a processible one. Rules used for this conversion are specified in the supplementary data table 132.

FIG. 59 shows an example of the supplementary data table 132. The table shows a combination of a process, a variable, and a parameter as well as a way of obtaining supplementary data. The I/O controller 140 interprets the table 132 and obtains the data therefrom. The process flow converter 131 communicates with the I/O controller 140 when adding and converting the data.

FIG. 60 shows an example of a process contained in the process flow. The process is as follows:

OXIDATION, TEMPERATURE=1000° C. . . . , GAS=STEAM

This process corresponds to the left column of the table 132 of FIG. 59. Accordingly, the process flow converter 131 adds the following supplementary data of the right column of the table 132 to the process of FIG. 60:

TIME=100 MIN, DIELECTRIC STRENGTH=EXCELLENT

As a result, the process of FIG. 60 is converted into the following process as shown in FIG. 61:

OXIDATION, TEMPERATURE=1000° C. GAS=STEAM, TIME=100 MIN, DIELECTRIC STRENGTH=EXCELLENT in this way, the process flow converter 131 adds data to a given process if corresponding conditions are found in the supplementary data table 132.

The process data generator 133 infers a pattern of processes in the process flow and generates data representing the object, contents, and meaning of the pattern. More precisely, the process data generator 133 generates data representing the location of the pattern in the process flow, the name of the pattern, and the probability (confidence value) of the pattern. Rules for this pattern inference are specified in the process data table 134.

FIG. 62 shows an example of the process data table 134. This table shows a pattern of processes, the name of the pattern, and a way of obtaining a confidence value for the pattern.

FIG. 63 shows an example of a process flow. The 10th line of the process flow stipulates the following process:

OXIDATION, THICKNESS=1000 A

This process corresponds to the first line of the table 134 of FIG. 62, which reads:

1ST PROCESS, (OXIDATION) AND (THICKNESS>=900 A)

The 11th line of the process flow of FIG. 63 shows the following process:

DEPOSITION, FILM=SILICON NITRIDE, THICKNESS=1000 A

This process corresponds to the second line of the table 134 of FIG. 62, which reads:

2ND PROCESS, (DEPOSITION) AND (FILM=SILICON NITRIDE)

Similarly, processes in the 12th to 16th lines of the process flow of FIG. 63 correspond to the third to seventh processes in the table 134 of FIG. 62. Accordingly, a pattern of the processes in the 10th to 16th lines of the process flow of FIG. 63 is equal to the pattern named "ELEMENT SEPARATION" of FIG. 62. Since the confidence value of this pattern is 90%, the process data generator 133 generates the following process data shown in FIG. 64:

RANGE=10 to 16, PATTERN NAME=ELEMENT SEPARATION, CONFIDENCE=90%

This process data indicates that the pattern of the 10th to 16th lines of the process flow of FIG. 63 corresponds to the pattern "ELEMENT SEPARATION" of the table 134 of FIG. 62 at the confidence value of 90%.

FIG. 64 shows the process data prepared by the pattern inference mentioned above. This data is added to the original process flow. There are many process data tables 134 each holding a pattern, a pattern name, and a confidence value.

In this way, the process data generator 133 generates the process data of FIG. 64 from the process flow of FIG. 63 according to the process data table 134 of FIG. 62. The data of FIG. 64 indicates that the process flow of FIG. 63 corresponds to the process pattern "ELEMENT SEPARATION" and that the object of the process flow is an element separation at the probability (confidence) of 90%.

The process data generator 133 repetitively finds patterns of obtained process data and generates new process data. Rules for this pattern inference are specified in a process data table an example of which is shown in FIG. 65.

In FIG. 65, there are two patterns "P-WELL FORMATION" and "N-WELL FORMATION." A combination of these two patterns forms a new pattern "WELL FORMATION."

FIG. 66 shows an example of a process flow. According to the table of FIG. 65, the process data generator 133 infers patterns of processes. The 10th line of the process flow of FIG. 66 reads as follows:

OXIDATION, THICKNESS=1000 A, . . .

The 14th line of the same process flow reads as follows:

REMOVAL, FILM=RESIST, . . .

The processes in the 10th to 14th lines correspond to the pattern "P-WELL FORMATION" of the table of FIG. 65. Accordingly, the process data generator 133 generates the following data:

RANGE=10 to 14, PATTERN NAME=P-WELL FORMATION, CONFIDENCE=90%

This data indicates that the pattern in the range of 10th to 14th lines of the process flow of FIG. 66 corresponds to the pattern "P-WELL FORMATION" at the probability of 90%.

Similarly, the process data generator 133 refers to a pattern in the 15th to 19th lines of FIG. 66, to generate the following process data:

RANGE=15 to 19, PATTERN NAME=N-WELL FORMATION, CONFIDENCE=90%

This data indicates that the pattern in the 15th to 19th lines of the process flow of FIG. 66 corresponds to the pattern "N-WELL FORMATION" at the provability of 90%.

A combination of the first pattern "P-WELL FORMATION" and second pattern "N-WELL FORMATION" corresponds to the pattern "WELL FORMATION" of FIG. 65. As a result, the process data generator 133 generates the following process data:

RANGE=10 to 19, PATTERN NAME=WELL FORMATION, CONFIDENCE=95%

This data indicates that the pattern in the 10th to 19th lines of the process flow of FIG. 66 corresponds to the pattern "WELL FORMATION" at the probability of 95%. In the end, the process data generator 133 provides process data shown in FIG. 67 by the pattern inference.

The pattern inference is repeated until conditions stipulated in the environmental data table 139 are satisfied. Thereafter, addition, change, and deletion operations are carried out on the process data according to the environmental data table 139.

FIG. 69 shows an example of the environmental data table 139. This table shows that process data having a confidence value of 95% or greater must be prepared to finish the process data generation operation and that process data having a confidence value of less than 95% must be deleted.

FIG. 68 shows an example of process data prepared by the process data generator 133. According to the conditions stipulated in the environmental data table 139 off FIG. 69, each data having a confidence value of less than 95% is deleted from FIG. 68, and finally, the process data of FIG. 68 becomes that of FIG. 70.

In practice, the I/O controller 140 interprets the process data table 134 and environmental data table 139 and obtains data therefrom. The process data generator 133 communicates with the I/O controller 140, to generate process data.

The state data generator 135 simulates and generates state data according to the process data and process flow. The state data include, for example, a film structure, a film thickness, and the shape of an object. Rules for the state simulation are specified in the state data table 136.

FIG. 71 shows an example of the state data table 136. As explained above, the process data of FIG. 70 is prepared from the process flow of FIG. 66.

The process data of FIG. 70 meets "(OXIDATION) AND (THICKNESS>0 A) AND (MOSFET)" stipulated in the left column of the table 136 of FIG. 71, because the 10th line of the process flow of FIG. 66 reads "OXIDATION, THICKNESS=1000 A" to show that the thickness is greater than zero, and because the process data of FIG. 70 indicates that the 1st to 36th lines of the process flow correspond to the pattern "MOSFET."

FIG. 72 shows state data for the process "OXIDATION, THICKNESS=1000 A . . . " in the 10th line of the process flow of FIG. 66. The state data generator 135 adds state data of "FILM=SILICON OXIDE, THICKNESS=SPECIFIED VALUE" to the data of FIG. 72. Here, the "SPECIFIED VALUE" is "1000 A" for the variable "THICKNESS" stipulated in the 10th line of the process flow of FIG. 66.

FIG. 73 shows an example of state data generated by the state data generator 135. Namely, the state data of FIG. 73 is formed from the 10th line of the process flow of FIG. 66, the state data table of FIG. 71, and the state data of FIG. 72. In this way, the state data generator 135 simulates the process flow of FIG. 63 according to the state data table 136 of FIG. 71.

When the variable "THICKNESS" is unspecified and the variables "TEMPERATURE" and "TIME" are specified, the variable "THICKNESS" must be calculated according to the variables "TEMPERATURE" and "TIME." At this time, an oxidation speed, i.e., the thickness of a silicon oxide film formed in a unit time under a fixed temperature is needed. This sort of necessary data are written in the environmental data table 139.

In practice, the I/O controller 140 interprets the state data table 136 and environmental data table 139. The state data generator 135 communicates with the I/O controller 140, to generate state data.

The output data generator 137 checks the state data provided by the state data generator 135 and produces output data. Rules used for preparing the output data are specified in the output data table 138.

Figures 74, 75, 76, 77, 78:
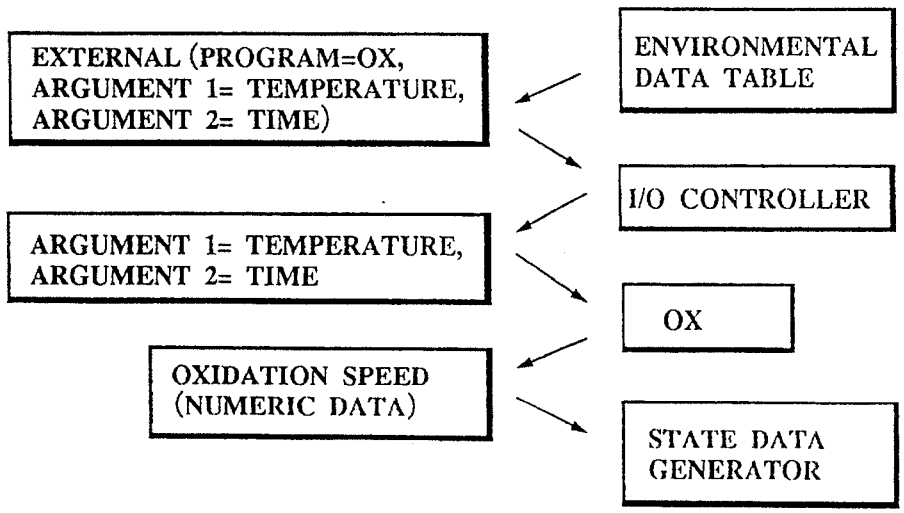
FIG. 74 shows an output data table.
FIG. 75 shows a process flow to be processed by an output data generator.
FIG. 76 shows state data generated by the output data generator.
FIG. 77 shows output data generated from the data of FIG. 76 according to the table of FIG. 74.
FIG. 78 explains an I/O controller.

FIG. 74 shows an example of the output data table 138. FIG. 75 shows a process written in the 20th line of a given process flow, which reads:

DEPOSITION, FILM=ALUMINUM, THICKNESS=100 A, . . .

According to this process, the state data generator 135 generates the following state data as shown in FIG. 76:

FILM=ALUMINUM, THICKNESS=100 A, POSITION=20TH LINE

This data corresponds to the following condition written in the left column of the output data table 138 of FIG. 74:

(FILM=ALUMINUM) AND (THICKNESS<200 A)

As a result, the output data generator 137 generates the following output data according to the right column of the output data table 138, as shown in FIG. 77:

ERROR=BREAKAGE, POSITION=20TH LINE, CONFIDENCE= 90%

This indicates that aluminum wiring has a risk of breakage at the confidence value (probability) of 90%.

The output data generator 137 may generate only data that have a confidence value greater than a given level. Such restrictions on the output data are specified in the environmental data table 139.

In practice, the I/O controller 140 interprets the tables 138 and 139 and obtains data therefrom. The output data generator 137 communicates with the I/O controller 140, to prepare output data.

The data output unit 141 provides data to a printer and a display through an external storage unit 143. As shown in FIG. 58, data for the data output unit 141 are generated by the output data generator 137.

The environmental data table 139 specifies the operation environments of the process flow checkers. Data for the table 139 are entered by an operator before starting the process flow checking operation. FIG. 69 shows an example of the table 139.

In practice, the I/O controller 140 interprets the environmental data table 139 and obtains data therefrom. The data generators 133, 135, and 137 communicate with the I/O controller 140 when generating data. The I/O controller 140 interprets the tables 132, 134, 136, 138, and 139.

FIG. 78 explains the operation of the I/O controller 140. When the state data generator 135 requires numeric data such as an oxidation speed from the environmental data table 139, the I/O controller 140 accesses the table 139 to obtain the following data:

EXTERNAL (PROGRAM=OX, ARGUMENT 1=TEMPERATURE, ARGUMENT 2=TIME)

Then, the I/O controller 140 searches the database "OX"

with the variables TEMPERATURE and TIME as keywords, to obtain the oxidation speed. The I/O controller 140 provides the oxidation speed to the state data generator 135, which then generates state data.

Operation of the second checker 17 will be explained with reference to FIG. 58.

The process flow input unit 130 fetches a process flow from a storage unit to a main memory of a computer. An example of a process flow is shown in FIG. 63. The process flow contains processes, variables, and parameters that are expressed with codes. The codes are written in the order of execution of the processes. Each line in the process flow corresponds to one process.

The process flow converter 131 adds necessary data to the process flow fetched to the main memory. The data to be added are managed by the supplementary data table 132. The I/O controller 140 interprets the table 132 and obtains data therefrom. These operations help in reducing external data input operations when preparing a process flow, simplifying a process flow preparation work, and increasing a processible data quantity.

According to the process flow converted by the process flow converter 131, the process data generator 133 infers the name of every pattern of processes in the process flow, a range of the pattern, and a confidence value (probability) of the pattern. In practice, the I/O controller 140 interprets the process data table 134 and obtains such data from the table.

The pattern inference is terminated according to conditions stipulated in the environmental data table 139. An operation carried out after the pattern inference is also stipulated in the environmental data table 139. The I/O controller 140 interprets the table 139 and obtains those data therefrom. The inferred patterns are grouped according to the objects, contents, and meanings thereof. The process flow will be checked and simulated according to the pattern objects, contents, and meanings.

According to the data generated by the process data generator 133, the state data generator 135 generates state data indicating film structures, film thicknesses, and product shapes. These data are managed by the state data table 136. The I/O controller 140 interprets the table 136 and obtains data therefrom. Data such as an oxidation speed is controlled by the environmental data table 139. The I/O controller 140 interprets the table 139 and obtains data therefrom. The state data show changes in product conditions. Since the patterns have been grouped according to the objects, contents, and meanings thereof, the state data are easily obtainable.

The output data generator 187 properly checks the state data generated by the state data generator 135, and provides output data according to the output data table 138. The I/O controller 140 interprets the table 138 and obtains data therefrom. The output data are provided after checking the process flow according to the objects, contents, and meanings. A lowest allowable confidence value used for preparing the output data is written in the environmental data table 139.

The data output unit 141 provides the output data generated by the output data generator 137 to the external storage unit 143.

A flow of data will be explained with reference to FIG. 58.

A process flow stored in the storage unit is loaded by the process flow input unit 130 into the main memory. Supplemental data are added to the process flow by the process flow converter 131. According to the converted process flow, the process data generator 133 infers patterns and generates process data. As a result, processes contained in the process flow are classified according to the objects, contents, and meanings thereof. According to the process flow and process data, the state data generator 135 generates state data. According to the state data, the output data generator 137 checks the contents of the process flow and generates output data. The output data are provided to the external storage unit through the data output unit 141.

As explained above, the second checker 17 employs various data tables to generate various data, which are used to check and simulate a flow of processes at high speed.

The second checker 17 employs a computer to check and simulate a process flow. Namely, the second checker 17 enables expert know-how to be used by anyone. As the number of processes increases, human mistakes increase unavoidably. The second checker 17 employing a computer eliminates such mistakes. Unlike the prior art, the second checker 17 checks and simulates processes according to their objects, contents, and meanings, with the computer.

Next, the data generator 19 will be explained with reference to FIG. 79. The data generator 19 prepares a production process flow according to the process flow checked by the second checker 17.

Figure 79:
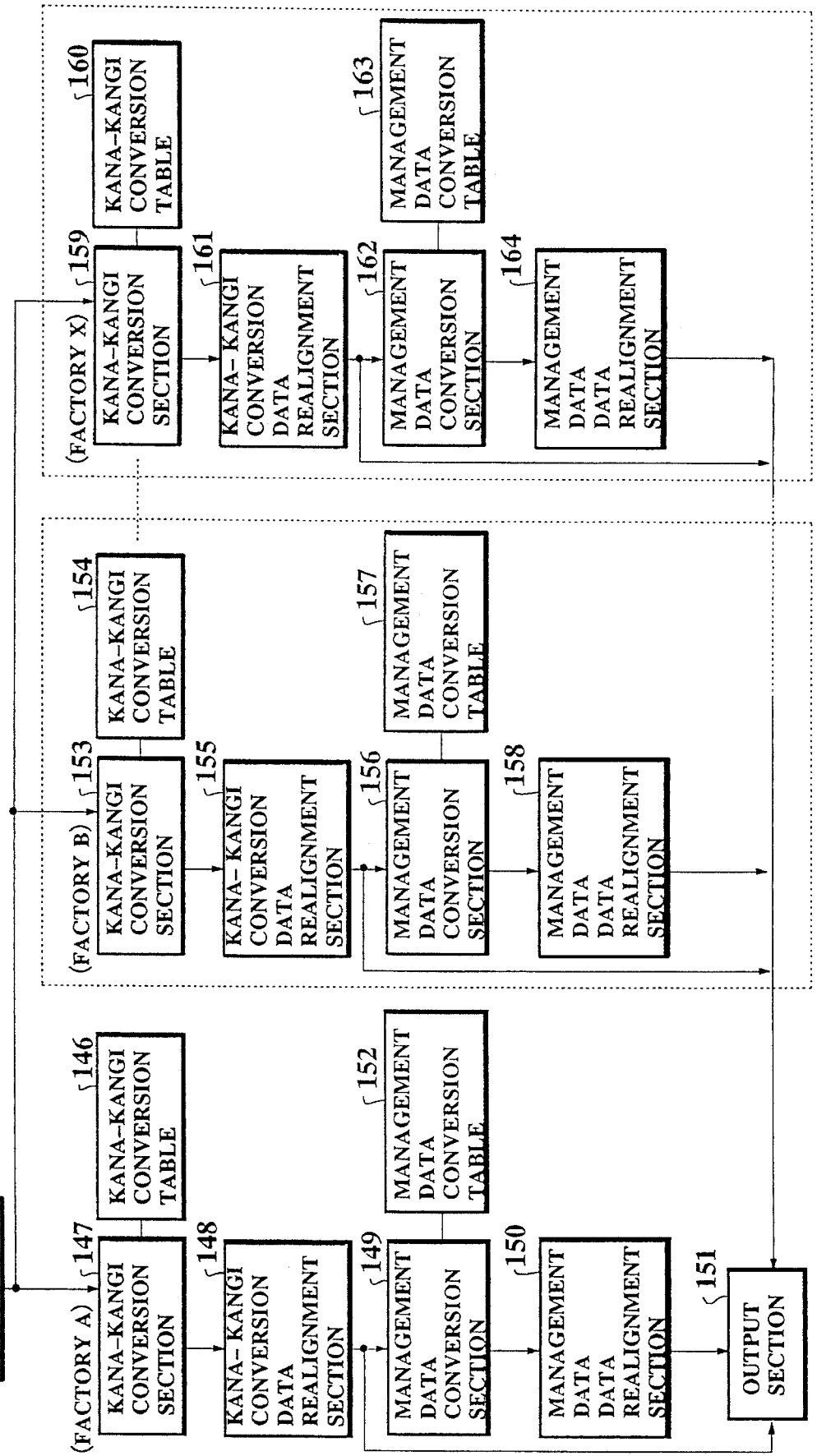
FIG. 79 shows a data preparation unit in the section of FIG. 3.

As shown in FIG. 79, a factory as a conversion target for conversion of code data input from the code description section is selected by a factory selection section 145. Selection of more than one factory is also possible. In the next example, an explanation will be given for the case where a factory A is selected.

In a kana-kanji conversion table 146, a plurality of codes input from a code description section 122 and the character data for each code are arranged to correspond. "Kana" in the "kana-kanji" means Japanese letter and "kanji" means Chinese character. One example of the factory A is shown in FIG. 80.

As shown in FIG. 80, the variable OXDIF corresponds to oxidation diffusion, and ASHR corresponds to asher. In a kana-kanji conversion section 147, a described code is converted to kana-kanji using a code management table 123 and the conversion table 146, and becomes character data.

In the realignment section 148, the character data which has been converted to kana-kanji is converted to the stipulated format. An example of use in a factory is shown in FIG. 81.

In a management data conversion table 152, character data and data input to the factory production management computer used at each factory are arranged to correspond. In FIG. 82, the illustrated table provides the relationship between the code combination and the management code/ recipe code for the device. The data in the table is converted by a management data conversion section 149.

The data converted to management data is further realigned in a data format appropriate for the respective computers by a management data realignment section 150. An example is given in FIG. 83.

The data items realigned in the converted data realignment section 148 and the management data realignment section 150 are separately stored in file form in a recording medium such as a floppy disk and a hard disk respectively.

Figure 84:
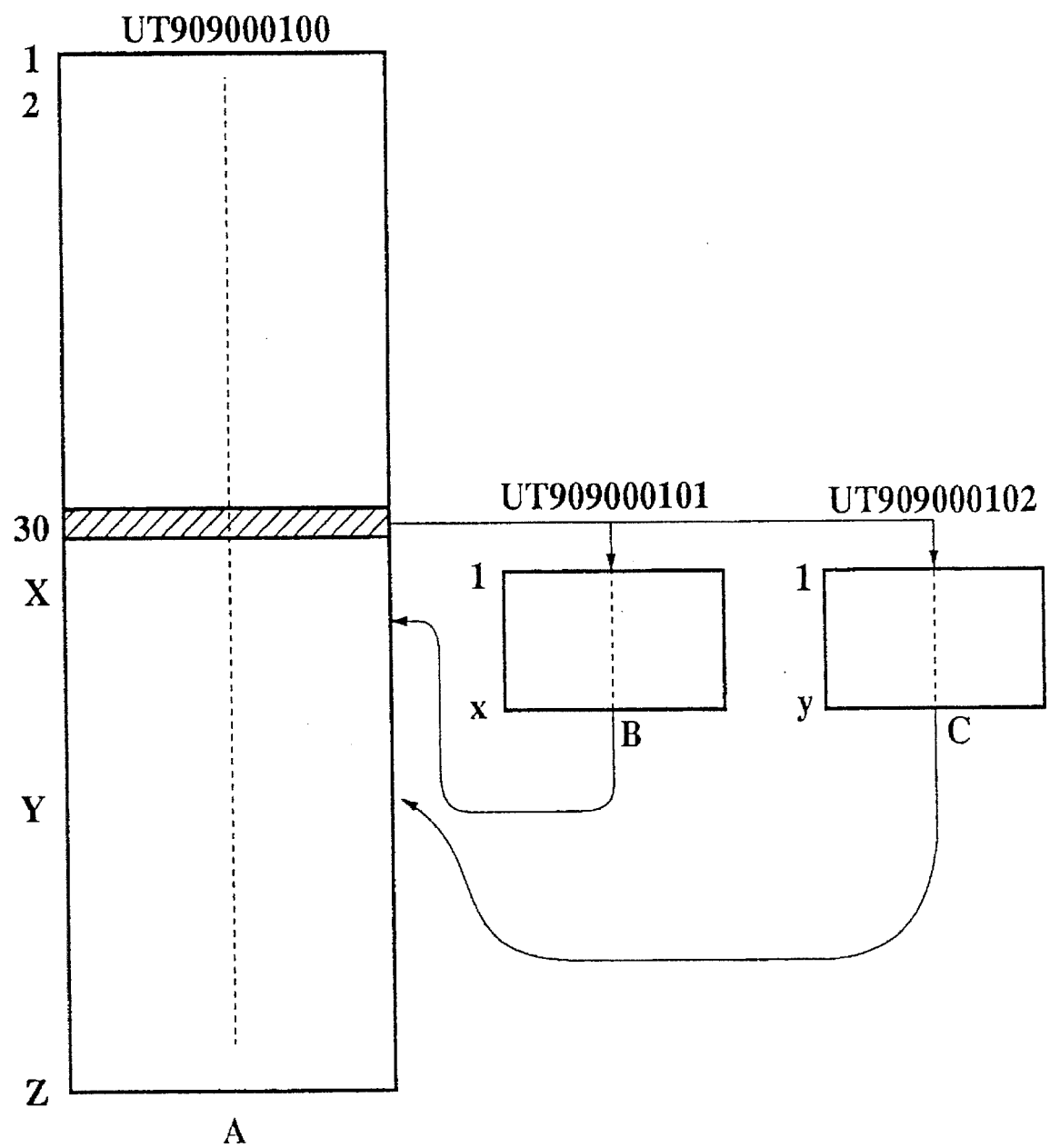
FIG. 84 shows a process flow divided into branches.

Further, the kana-kanji-converted character data which has been realigned in the realignment section 148 and converted into the stipulated format is printed out in the output section 151. Finally, it is also possible to output this data as a process flow check sheet. FIG. 84 is an example of such a sheet prepared from FIG. 81. Specifically, the outlet section 151 is a printer.

Next, the function of the data generator 19 will be explained.

If there is no error in the process flow data obtained from the second checker 17, the process flow data is converted to the codes in the conversion tables 146 to 163. The converted data is then realigned into a predetermined format by the realignment sections 148 to 164.

The case where the process flow data in the fifth statement shown in FIG. 42 is converted for use by the factory A will now be explained.

The fifth statement first calls the kana-kanji conversion section 147, and by means of the kana-kanji conversion table 146, OXDIF is converted to 'oxidation diffusion process', OX is converted to 'oxygen', OBJECT is converted to 'treatment object', GAS is converted to 'gas', TEMP is converted to 'temperature', THICK is converted to 'film thickness', in Japanese kana and/or kanji characters in all cases. However, because the kana-kanji conversion tables 37 differ for each factory, a table of a factory which the researchers wish to convert is selected in advance by using the factory selection section 145.

Next, the converted kana-kanji data is transmitted to the realignment section 148 and is realigned into the format for each factory. The realigned data is stored in a recording medium such as a floppy disk or a hard disk or the like in the output section 151. The factory format is shown in FIG. 85. The header code for indicating the type of manufacturing process is not shown. The subdivision code is shown in the third column, the variables associated with the treatment, in the fourth column, and the parameters (variable values) assigned to the variables, in the fifth column.

The process flow data is converted to the code for data used in the factory management system by the management data conversion table 152. The code combination for the fifth statement, specifically, "OXDIF, OX:OBJECT=FIELD, GAS=0, TEMP=1000, THICK=11000 (1100);" is converted to the management code D10, and, in addition, the corresponding equipment recipe code is withdrawn from the management data conversion table 152 and is used as data in the management system along with the management code. In this case, the equipment recipe code is shown as "OX 1000 P 11000". Although omitted from the drawings, other data (or codes) is assigned as required and data for use in the management system can be formed. (See FIG. 82.)

Data converted into management data is called by the management data realignment section 150 and realigned into a predetermined format. In this case, as shown in FIG. 83, the management code is realigned in the first column, and the equipment recipe code in the third column.

The realigned data is then stored as a file on a recording medium such as a floppy disk or a hard disk in the output section 151, handled in the same manner as the kana-kanji conversion data. This data is stored in a different file than the kana-kanji conversion data.

As described, in the data generator 19, when the kana-kanji conversion section and the realignment section are used the process flow check sheet is not directly revised, but instead a revised process flow check sheet can be easily obtained by revising the process flow data and then printing it out. Also, because the format is stipulated no differences arise as in preparation by different individuals, and the time required to draw boxes and rule lines throughout the sheet is saved.

Using the various conversion tables 146 to 163, the prescription sheets (run sheets) for each factory and the management data can be prepared at the same time. As a result, data for a plurality of objectives can be prepared simultaneously from one item of data and it becomes unnecessary to prepare the data one item at a time.

In this embodiment of the present invention, the types of codes used to describe the process flow data are the header, the subdivision, the variables, and the variable values, but the present invention is not limited to these types of codes. For example, the code group may consist of a description in the form of expressions. Each management table may also be provided by a management method for unifying a plurality of tables, or a decentralized management method. There are two prepared items of data (prescription sheet data and system management data), but it is also possible to expand the conversion tables and generate a large amount of data. In the data prepared by the code description section, the necessary data related to manufacturing,—for example, statistical data for the process or data related to the locus of the process position—can be set out, and a large amount of data, including these data items, can be output.

Figure 86:
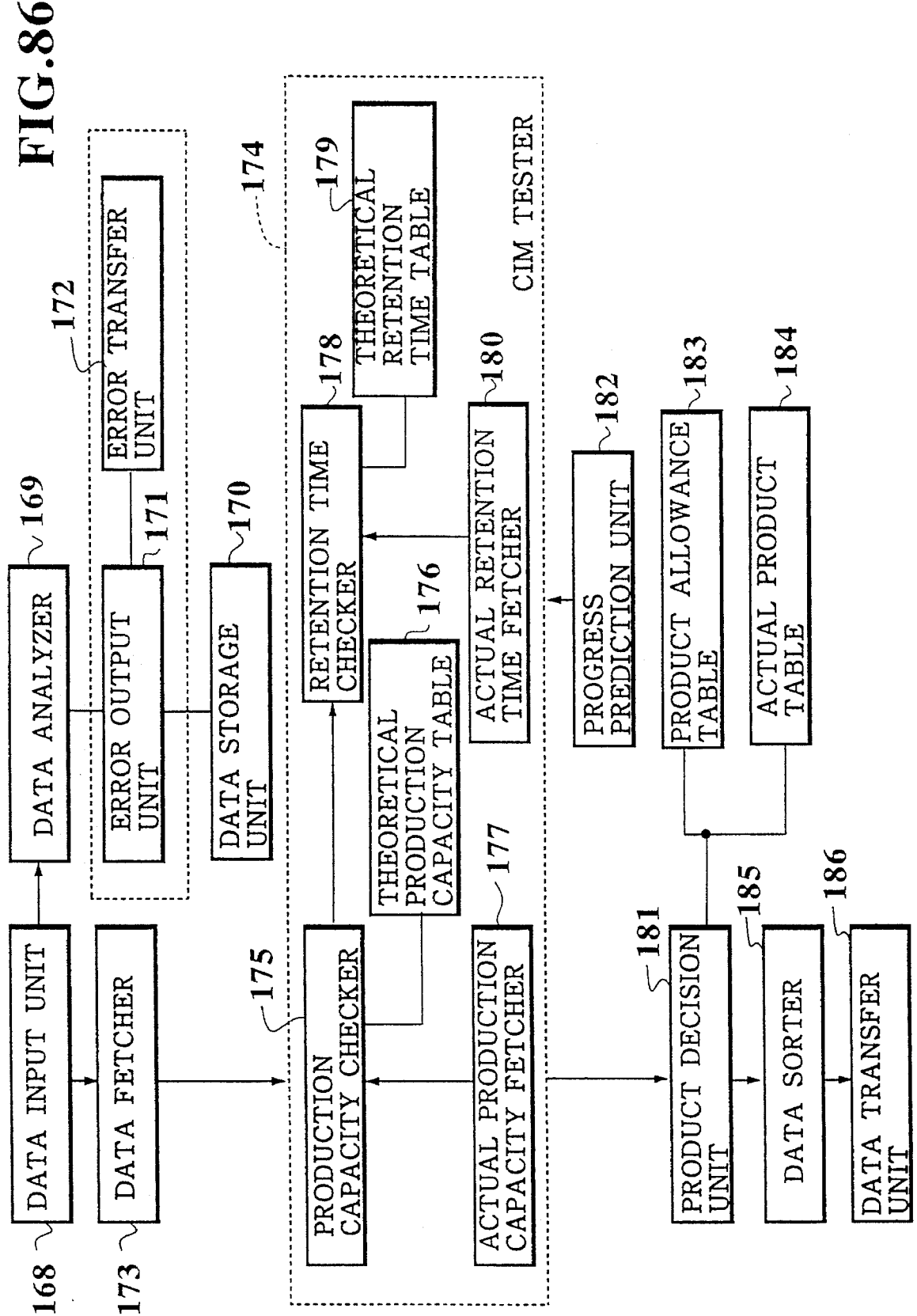
FIG. 86 shows a verify unit in the section of FIG. 3.

Next, the verify unit 21 will be explained with reference to FIG. 86. The verify unit 21 determines whether or not the process flow prepared by the data generator 19 is allowed to be charged to the production section 7.

The process flow provided by the data output section 151 of FIG. 79 is stored in a data input unit 168. The process flow is then analyzed by a data analyzer 169.

The data analyzer 169 checks the process flow to see whether or not the same name as this process flow is in a storage unit and whether or not the process flow has sufficient contents. If the process flow is satisfactory, the data analyzer 169 stores it in a data storage unit 170.

If the process flow has an error, an error output unit 171 and an error transfer unit 172 transfer an error message to a work station that has provided the process flow, through a mail system or a data transfer tool of a factory LAN. At this time, the error output unit 171 may delete the process flow that has caused the error, or save the same in a database of the data analyzer 169.

A process flow verifying operation will be explained.

A data fetcher 173 fetches the process flow from the storage unit and transfers it to a CIM tester 174.

The CIM tester 174 tests (1) the production capacity of equipment in a production line and (2) a product retention time of the equipment.

The production capacity check is carried out by a production capacity checker 175. The checker 175 compares a theoretical production capacity set in a theoretical production capacity table 176 with an actual production capacity.

FIG. 87 shows an example of the theoretical production capacity table 176. Each row of the table shows the name of equipment and the theoretical production capacity of the equipment. For example, equipment A is able to deal with 10 products at the maximum.

On the other hand, a recorder attached to a production management host computer, or a recorder attached to a computer for production block records an actual production capacity. An actual production capacity fetcher 177 fetches the actual production capacity from the recorder for the production capacity checker 175.

To check the production capacity of given equipment, the theoretical production capacity of the equipment is read from the table 176 and compared with an actual production capacity fetched by the fetcher 177. According to a result of the comparison, it is determined whether or not products specified in the process flow are allowed to be charged to the equipment.

If the theoretical production capacity is greater than the actual production capacity, it is determined that the process flow is applicable to the production line. Thereafter, the process flow is checked by a retention time checker 178.

If the theoretical capacity is smaller than the actual capacity, it is determined that the process flow must not be applied to the production line, and the verify operation ends. The process flow, however, is not deleted from the storage unit but kept for the next time.

The retention time checker 178 will be explained. This checker receives the process flow checked by the production capacity checker 175.

The retention time checker 178 compares a theoretical retention time set in a theoretical retention time table 179 with an actual retention time controlled by the production management host computer or by the production block computer.

An actual retention time fetcher 180 fetches the actual retention time for the retention time checker 178. The actual retention time is defined as "time at which the last product is started to be processed minus time at which a half-finished product is completely processed" in given equipment.

FIG. 88 shows an example of the theoretical retention time table 179. This table manages the theoretical retention time (minutes) of each processing equipment. For example, the theoretical retention time of equipment A is 300 minutes.

If the theoretical retention time is greater than an actual retention time, it is determined that the process flow is applicable to the production line. Thereafter, the process flow is transferred to a product decision unit 181.

If the theoretical retention time is smaller than the actual retention time, it is determined that the process flow must not be applied to the production line, and the verify operation ends. The process flow, however, is not deleted from the storage unit but saved for the next time.

A process flow usually involves a plurality of processes. Accordingly, when checking the production capacity and retention time of given equipment, it is necessary to predict production progress.

A progress prediction unit 182 predicts the actual production capacity and retention time of given equipment for a process flow involving many processes, and according to the prediction, the production capacity checker 175 and retention time checker 178 check the production capacity and retention time of the equipment for the process flow.

Although the embodiment checks only the production capacity and retention time of given equipment for a given process flow, other factors such as an operation rate of the equipment and a failure rate of the equipment may be checked.

After the CIM tester 174, the product decision unit 181 checks the process flow and determines products to be charged to a production line according to the kinds, sections, groups, and names of the products.

FIG. 89 shows an example of a product allowance table 183. For example, the allowable number of products of kind A is 120, in which products of section 1 are allowed up to 50 and products of section 2 up to 70. The products of the section 1 may include products of group 1 up to 30 and products of group 2 up to 20. The products of the group 1 may include products A1AA up to 10 and products A1AB up to 20.

In this way, products are hierarchically controlled according to their kinds, sections, groups, and names, to precisely determine products to be charged to the production line.

FIG. 90 shows an example of an actual product table 184 for managing the actual number of products in the production line.

According to the tables 183 and 184, the marginal numbers of products are found for the kinds, sections, groups, and names thereof.

For example, for the products of group 1, the product allowance table 183 indicates that 30 products are allowed. For the same group, the actual product table 184 indicates that 20 products are in the production line. Accordingly, the marginal number of products for the group 1 is 10. For the products of group 3, each of the tables 183 and 184 shows 70, so that there is no margin to charge the products of group 3 to the production line.

The product decision unit 181 receives the process flow from the CIM tester 174 and accumulates the numbers of products contained in the process flow according to their kinds, sections, groups, and names.

The product decision unit 181 compares the marginal numbers with the accumulated numbers, to determine whether or not the products are allowed to be charged to the production line. The checking is carried out on the products one by one. A given product is allowed to be charged to the production line if the corresponding marginal number is greater than the corresponding accumulated number. If a given product is allowed, the corresponding marginal number is decreased by one and the corresponding accumulated number is increased by one. Then, the next product is checked.

When the marginal number becomes equal to the accumulated number, or when there is no more product to be checked, the checking ends. The numbers of products in the actual product table 184 are saved for the next time.

After the product decision unit, the process flow is transferred to a data sorter 185. The data sorter 185 sorts the contents of the process flow according to the kinds, sections, groups, names, etc. The sorted data are displayed on a CRT.

A data transfer unit 186 transfers the process flow to the recorder of the production management host computer or of the production block's computer through a LAN.

As explained above, the verify unit 21 automatically and quickly checks a process flow, equipment data, and product retention data and verifies products to be charged to a production line, while taking production progress into account.

Next, the production section 7 (FIG. 1) will be explained with reference to FIG. 92.

The production section 7 includes an equipment recipe input unit 190, a process flow storage unit 191, a production progress manager 192, a cell manager 193, an equipment manager 194, processing equipment 195 and 195a, and an equipment data storage unit 196.

The equipment recipe input unit 190 reads an equipment recipe from the equipment manager 194 and transfers it to the process flow preparation section 1.

The recipe of equipment used for, for example, an oxidizing diffusion process specifies a series of operations to set a predetermined temperature, gas pressure, and gas flow rate.

Figure 91:
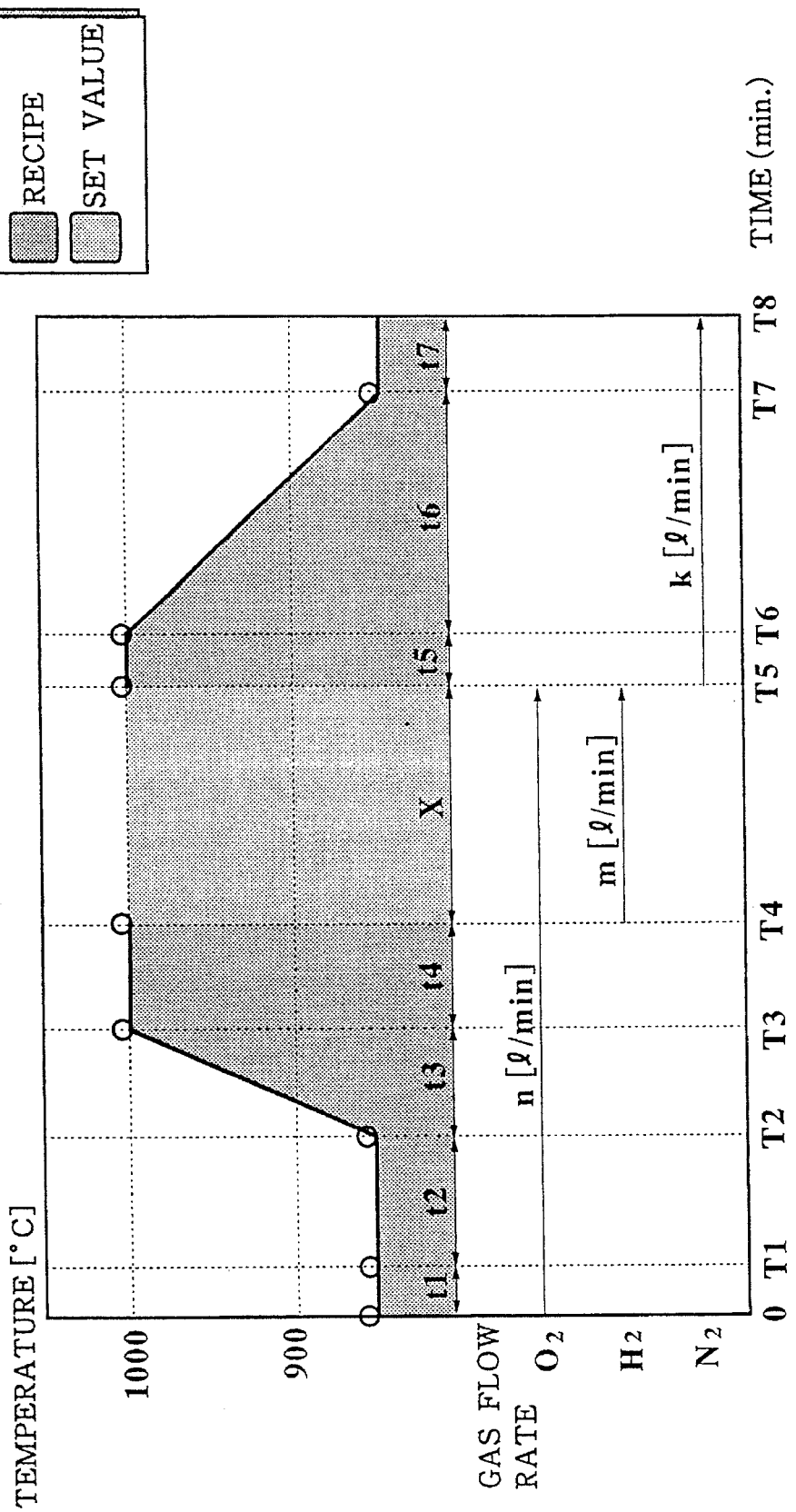
FIG. 91 shows a recipe for an oxidizing diffusion process.

FIG. 91 shows an example of a recipe for an oxidizing diffusion process in semiconductor device manufacturing. The equipment recipe input unit 190 fetches numerical data related to shaded areas in FIG. 91 and transfers them to the process flow preparation section 1. The numerical data indicates temporal changes in temperatures and gas flow rates.

The recipe of FIG. 91 indicates that the temperature is kept at 850 degrees centigrade (C) during t1 and t2, increased from 850° to 1000° C. during t3, and kept at 1000° C. during t4. An oxygen gas ($O_2$) of n (l/min) is injected during t1 to t4.

The process flow storage unit 191 stores a process flow provided by the process flow preparation section 1 before it is used by the production progress manager 192.

The production progress manager 192 receives the process flow from the section 1 through the process flow storage unit 191, manages a flow of processes and process conditions according to the process flow, and sequentially transfers process data to processing equipment and testers, to thereby correctly process products.

An example of a process flow is shown in FIG. 2. The production progress manager 192 transfers data of the process flow to the processing equipment and testers in the order of sequential numbers written in the left column of the process flow. For example, the manager 192 transfers data of "OX:GAS=O2, TEMP=900, TIME=50S" (an oxidation process carried out for 50 minutes with an oxygen gas) stipulated in the process flow to the processing equipment and testers.

Figure 92A:
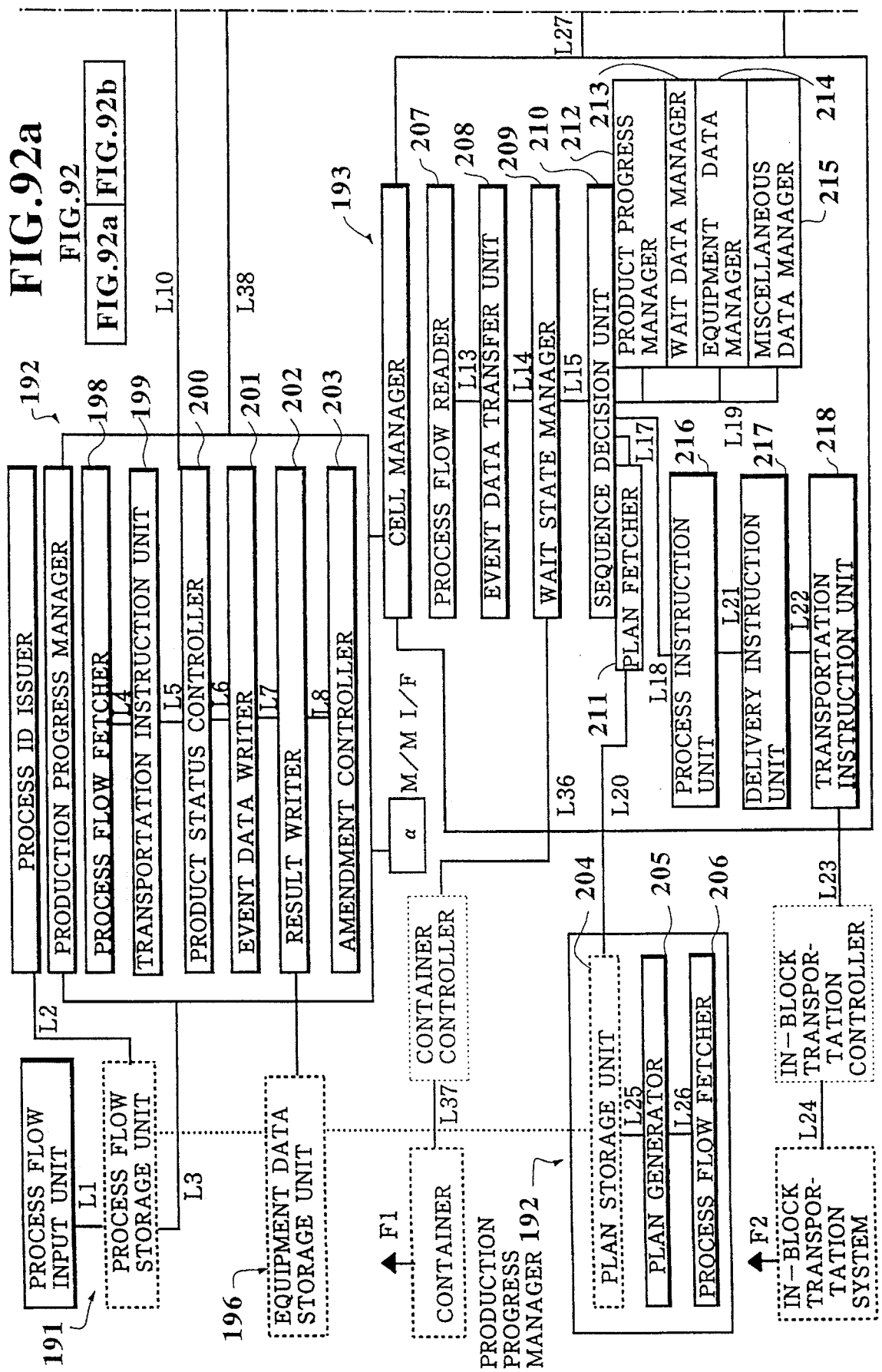
FIGS. 92a and 92b show the details of a production section in the system of FIG. 1.
Figure 92B:
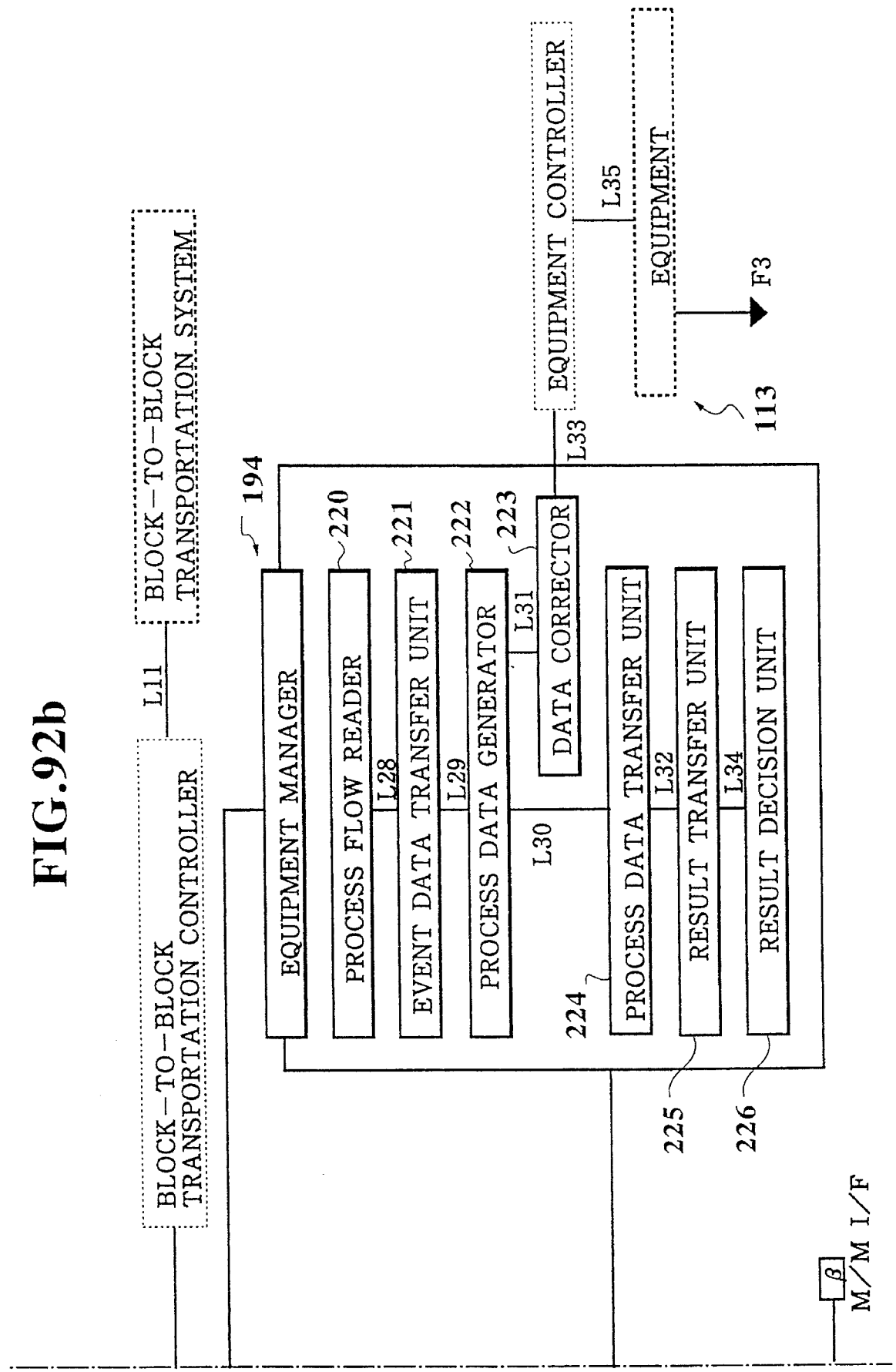

In FIG. 92, the production progress manager 192 includes a process flow fetcher 198, a transportation instruction unit 199, a product status controller 200, an event data writer 201, a result writer 202, and an amendment controller 203.

The process flow fetcher 198 fetches data necessary for processing products from the process flow storage unit to a main memory. The data to be fetched to the main memory may be for a process for a product, or for all processes for a product, or for all processes for all products. The quantity of data to be fetched depends on the capacity of the computer and system.

The process flow fetcher 198 also has a function of handling an ID of each lot of products or of each product. This function will be explained with reference to FIG. 84.

A process flow A involves processes 1 to Z for processing a lot of wafers having an ID of UT909000100. Among the wafers 1 to 24 in the lot, the wafers 1 to 8 are processed through a main route of the process flow A, the wafers 9 to 16 through a branch B, and the wafers 17 to 24 through a branch C. The branches B and C are branched from the main route at the 30th process. The branch B joins the main route at a process X and the branch C joins the main route at a process Y.

When processing these wafers 1 to 24 according to the process flow A, a clean room control computer 250 (FIG. 95) of the production progress manager 192 is accessed to assign an ID of UT909000101 for a lot of the wafers 9 to 16 passing through the branch B and an ID of UP90900102 for a lot of the wafers 17 to 24 passing through the branch C.

This technique is effective not only for branching a lot of products but also for forming films having different thicknesses on products.

Each product may have its own ID so that products may be separately controlled one by one.

As explained above, a process flow is formed of codes representing processes, variables, and parameters substituting for the variables. A combination of the variables is used to search for products.

For example, codes for a low-dose ion injection process of injecting boron ions of 1×1013/cm2 to a product at 50 KeV are as follows:

IMP, LDOSE:ELEMENT=BORON, ENERGY=50, DOSE=1E13;

The variables ELEMENT=BORON, ENERGY=50, and DOSE=1E13 may be properly combined to access the computers 250 and 251, to find the storage locations and process progress of corresponding products. In this case, the computers 250, 253, and 254 of FIG. 95 control transportation systems 255 and 256 to gather products into a lot, which is efficiently processed by the equipment 195.

For example, products specified by ELEMENT=BORON may be collected and processed before products specified by ELEMENT=AS are processed. Also, products specified by "ELEMENT=BORON, ENERGY=50, DOSE=1E13" may be collected and subjected to a batch process.

According to the present invention, equipment recipe codes are shared by different processes. For example, a process of annealing a product with an N2 gas at 900 degrees centigrade (C) for 10 minutes and an equipment recipe for this process are expressed as follows:

OXDIF, OX:TEMP=900, TIME=10M, GAS=N2, RECIPE=DDN

Here, the RECIPE is a header for retrieving data for operating the equipment 195 controlled by the computer 252 of the equipment manager 194.

The header varies depending on a sequence of process steps. For example, a heat treatment at 900° C. for 10 minutes may have a sequence of a lamp-up (warm-up) time of 3 minutes, a heating time of 10 minutes, and a lamp-down (cooling) time of 5 minutes, or a sequence of a lamp-up time of one minute, a heating time of 10 minutes, and a lamp-down time of 10 minutes, etc. In this way, each process has different sequences. The RECIPE is used to specify one of the sequences, such as RECIPE=DDN.

Figure 96:
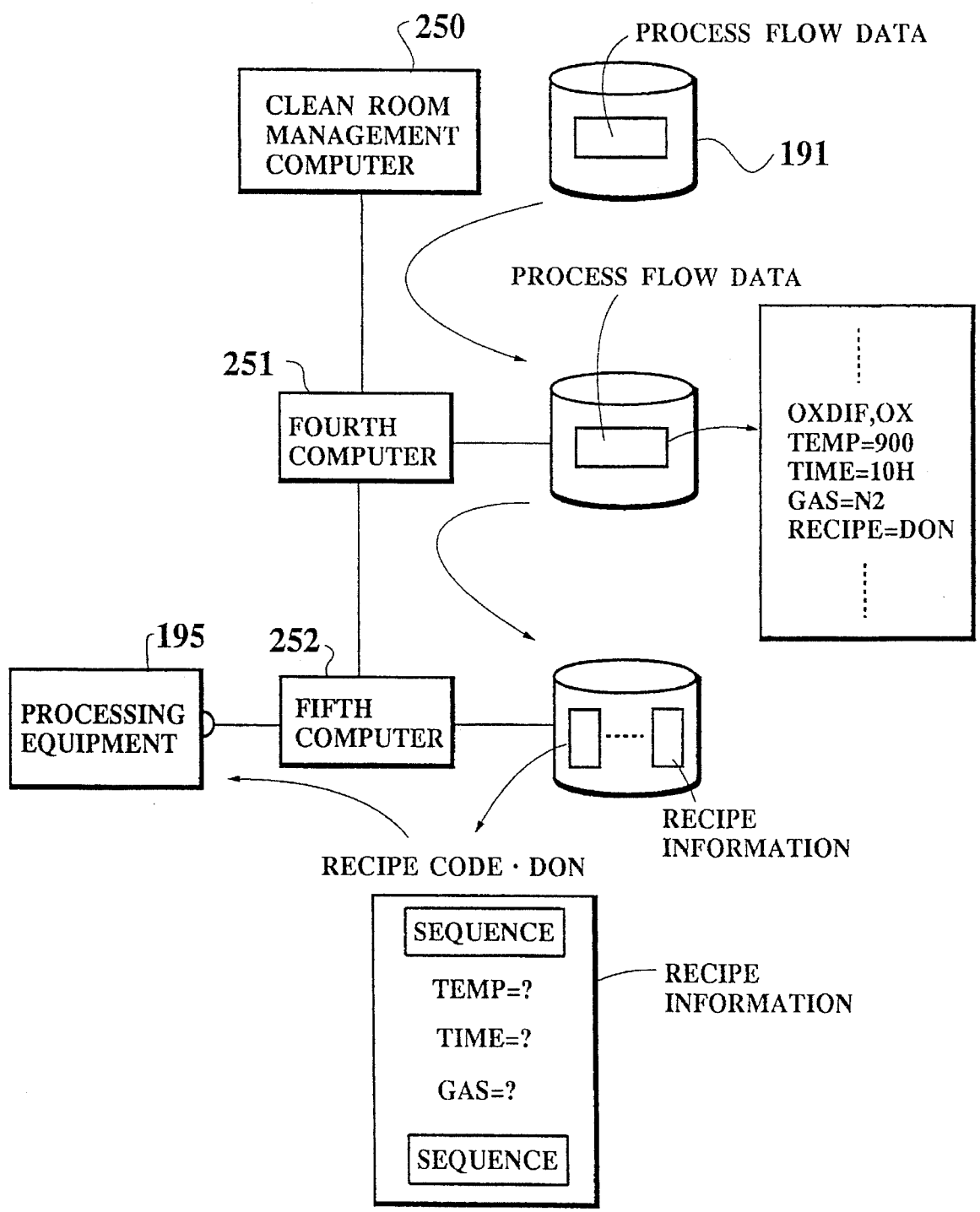
FIG. 96 explains the handling of a recipe.

FIG. 96 shows an example of the loading of a recipe.

The computer 252 stores recipe codes and data for operating the equipment 195. The clean room computer 250 transfers, for example, the following process flow to the lot managing computer 251 and then to the computer 252:

OXDIF, OX:TEMP=900, TIME=10M, GAS=N2, RECIPE=DDN

The computer 252 loads a recipe corresponding to RECIPE=DDN to a memory. Variables TEMP=?, TIME=?, and GAS=? in the recipe are substituted by TEMP=900, TIME=10M, and GAS=N2 stipulated in the process flow. According to the recipe, the equipment 195 is operated.

In this way, the computer 252 is not required to store recipes for every process expected in a process flow. Namely, each equipment recipe stored in the computer 252 can be shared by different processes to be contained in a process flow.

As explained above, the present invention provides each lot of products with a process flow, so that (1) the process conditions of a given lot are easily corrected, added, and deleted, (2) a process flow for a given lot may be branched, and (3) each product such as a wafer may have its own process flow, i.e., products may be controlled one by one according to their respective process flows.

Since a process flow is composed of codes representing processes, variables, and values substituting for the variables, (1) the variables may be properly combined to search for corresponding products, and (2) equipment recipe codes are shared by different processes.

The transportation instruction unit 199 determines whether or not a product must be transported between production blocks according to the fetched data and data provided by the product status controller 200. If the product must be transported, the unit 199 sends a transportation instruction to a block-to-block transportation controller a. The instruction specifies the product to be transported and an interval for transporting the product.

The product status controller 200 controls the progress of processes on a product. Temporal data and equipment status data are generated whenever a process starts or ends, whenever a transportation operation starts or ends, and whenever a product is stored in or delivered from a container. The product status controller 200 controls these data and provides an instruction to the event data writer 201 to write these data to the process flow storage unit 191. These data are obtainable by reading an ID of each product and by sensing ON/OFF states of the equipment. According to the data, the product status controller 200 controls and grasps production progress.

The data written by the event data writer 201 to the process flow storage unit 191 include status data, temporal data, and ID data gathered from products, equipment D, a container B, and transportation systems A and C.

The result writer 202 writes process conditions such as temperatures, vacuum levels, currents, and voltages, as well as inspection results such as film thicknesses, electrical characteristics, and resistance values provided by the equipment for processing products, testers for testing the results of processes, and measuring units, to the equipment data storage unit 196. These data are written according to the kinds, sections, groups, and names of the products. The equipment data storage unit 196 may be a database controlled by the result writer 202.

The result writer 202 may be realized in a computer that is independent of the production progress manager 192, if the capacity of the manager 192 is insufficient to accommodate the result writer 202.

The equipment data storage unit 196 may be linked to the process flow storage unit 191, or they may be controlled separately. The equipment data storage unit 196 is, for example, a magnetic recorder.

The amendment controller 203 adds data to, deletes data from, and amends the process flow stored in the process flow storage unit 191. These operations are manually made through a man-machine interface a. It is possible to employ a data corrector to automatically amend the process flow.

The production progress manager 192 further has a plan storage unit 204, a plan generator 205, and a process flow fetcher 206.

The plan storage unit 204 stores product progress data provided by the plan generator 205. The plan generator 205 computes the progress, time, priority, etc., of products and makes a schedule of the products. The process flow fetcher 206 receives the process flow from the storage unit 191 and transfers it to the plan generator 205.

The cell manager 193 has 12 units 207 to 218 each providing a specific function. Here, the "cell" means a group of equipment in a section in a factory, or a group of equipment grouped according to product processing conditions. The units 207 to 218 contained in the cell manager 193 will be explained in detail.

The process flow reader 207 reads the process flow from the process flow storage unit 191 through one of three ways: (1) the production progress manager 192 transfers the process flow to the reader 207 through a communication system L12, (2) the reader 207 positively reads the process flow through the communication system L12 and production progress manager 192, and (3) the reader 207 directly reads the process flow from the storage unit 191. The read process flow is stored in a main memory of the cell manager 193.

The timing of loading the process flow to the main memory of the cell manager 103 is when the cell manager 193 receives the ID of a product from a non-contact bar code reader F1 after the product is stored in the container B by the transportation system A.

The event data transfer unit 208 transfers event data to the event data writer 201. The event data is generated, for example, when a product has been stored in the container B, when a product has been delivered from the container B, when the transportation system C has loaded a product, when the system C is transporting a product, and when the system C has set a product on equipment. According to the event data provided by the event data transfer unit 208, the product status controller 200 updates product progress statuses in the process flow storage unit 191.

The wait state manager 209 manages the ID, stored time, process conditions, wait time, etc., of each product stored in the container B.

The sequence decision unit 210 makes a plan of a sequence of processes for a product according to data provided by the units 211 to 215. Once a processing sequence is determined, the corresponding product begins to be processed. The unit 210 also determines equipment that processes the product. When the product is discharged from the corresponding production block, the unit 210 determines equipment for the next process according to data provided by the units 211 to 215 of the cell manager of the next production block. The process sequence determination and equipment selection are manually achievable through a man-machine interface B.

Usually, a process flow prepared by the process flow preparation section 1 specifies no equipment. Accordingly, when a process sequence is determined or when a product is delivered from a production block, equipment for the next block must be determined. If the process flow preparation section 1 determines the equipment, priority is given to this determination in the sequence decision unit 210.

The plan input unit 211 fetches the schedule of product processing prepared by the plan generator 205 and transfers it to the sequence decision unit 210.

The product progress manager 212 manages the progress of a product and provides progress data to the sequence decision unit 210. The progress data indicates, for example, whether the product is in a wait state or in a just processed state. The progress data is controlled by the product status controller 200 and event data writer 201 and stored in the process flow storage unit 191. The product progress manager 212 fetches the data and transfers it to the sequence decision unit 210. When the process flow reader 207 reads a process flow, it may be temporarily stored in a proper storage unit of the cell manager 193, and when required, the product progress manager 212 may read the storage unit for progress data.

The wait data manager 213 controls the process wait time, process conditions, kind, etc., of each product stored in the container B and provides the sequence decision unit 210 with the data.

The equipment data manager 214 obtains equipment data from the equipment manager 194 and transfers the data to the sequence decision unit 210. The equipment data may indicate that given equipment is in operation, or out of order, or under maintenance, or in preparation. The equipment data may also indicate a processing method such as a batch method, a piece-by-piece method, and a continuous processing method.

The miscellaneous data manager 215 manages data that are not managed by the units 211 to 214 but are required to determine a process sequence. The data manager 215 transfers these data to the sequence decision unit 210.

The data provided by the units 211 to 215 are used by the sequence decision unit 210 to determine a product processing sequence.

According to the data provided by the sequence decision unit 210, a process instruction unit 216 provides data such as the ID and process conditions of a product to be processed, to the container B, transportation system C, and equipment manager 194, when the equipment that processes the product becomes available.

For example, if an object product is stored in the container B, the process instruction unit 216 lets the delivery instruction unit 217 provide a container controller b with an instruction to deliver the product. According to the instruction, the container B delivers the product. At the same time, the process instruction unit 216 lets the transportation instruction unit 218 provide an in-block transportation controller c with an instruction to transport the product to specified equipment. According to the instruction, the transportation system C transports the product to the equipment.

The function of the delivery instruction unit 217 may be achieved by the process instruction unit 216. Also, the function of the transportation instruction unit 218 may be achieved by the process instruction unit 216.

The equipment manager 194 manages a plurality of processing equipment and testers and provides recipes necessary for various processes. The equipment manager 194 stores data such as currents, voltages, vacuum levels, process time, and process results provided by the processing equipment and testers and transfers these data to an equipment data storage unit. The equipment manager 194 also transfers the recipes of the equipment to the equipment recipe input unit 190.

The equipment manager 194 includes seven units 220 to 226. The details of these units will be explained.

The process flow reader 220 reads a process flow from the process flow storage unit 191 through one of five ways: (1) the production progress manager 192 transfers the process flow to the reader 220 through a communication system L38, (2) the reader 220 positively reads the process flow through the communication system L38 and production progress manager 192, (3) the reader 220 directly reads the process flow from the storage unit 191, (4) the reader 220 reads the process flow through a communication system L27, the cell manager 193, and production progress manager 192, and (5) the reader 220 reads the process flow from the cell manager 193, instead of the storage unit 191, through the communication system L27. The process flow thus read is stored in a main memory of the equipment manager 194.

The timing of loading the process flow to the main memory of the equipment manager 194 is when the process instruction unit 216 provides an instruction to start processing a product.

The event data transfer unit 221 transfers event data to the event data writer 201 of the production progress manager 192. The event data may indicate that the transportation system C has transported a product to the equipment D, that the equipment has been turned ON or OFF, or that a product has been transferred from the equipment to the transportation system C. According to the event data, the product status controller 200 updates data in the process flow storage unit 191.

The process data generator 222 converts the process flow provided by the process flow reader 220 into data that is useable by an equipment controller d. This data is usually called a recipe.

The data corrector 223 corrects a part or the whole of the process flow according to previous data of products. This is an additional function to the process data generator 222 and is used as and when required.

The process data transfer unit 224 transfers the process flow provided by the process data generator 222 to the equipment controller d. The process flow at this point may have been corrected by the data corrector 223.

The result transfer unit 225 transfers the process result data of a product to the result writer 202 of the production progress manager 192. The result data may involve current values, voltage values, vacuum levels, temperatures, film thicknesses, and electric characteristics provided by the equipment D that has processed the product.

The result decision unit 226 diagnoses the result data before they are transferred to the result transfer unit 225. For example, the unit 226 statistically analyzes the result data and diagnoses whether or not the present data deviates from an average of past result data.

The equipment data storage unit 196 stores all data provided by the equipment manager 194.

Next, the feedback section 9 (FIG. 1) will be explained.

The feedback section 9 has an equipment data analyzer 228. The analyzer 228 analyzes the data provided by the equipment data storage unit 196 and sends a result of the analysis to a correction-comparison-feedback unit 229.

The unit 229 compares simulation results provided by the process simulator 60, shape simulator 61, device simulator 63, circuit simulator 70, and layout design unit 71 with the actual results provided by the equipment data analyzer 228, corrects the simulation results, and feeds them back to the process flow preparation section 1.

Before the process flow preparation section 1 registers a process flow in the process flow storage unit 191, the correction-comparison-feedback unit 229 feeds back the simulation results provided by the simulators 60 to 70 to the section 1 so that the process flow is corrected.

Hardware arrangement of the production management system according to the present invention will be explained with reference to FIG. 93.

The production management system according to the present invention may be wholly realized in a single computer if the capacity of the computer is sufficient. The system is achievable in a plurality of computers if the functions and data flow of the system are secured.

Figure 93:
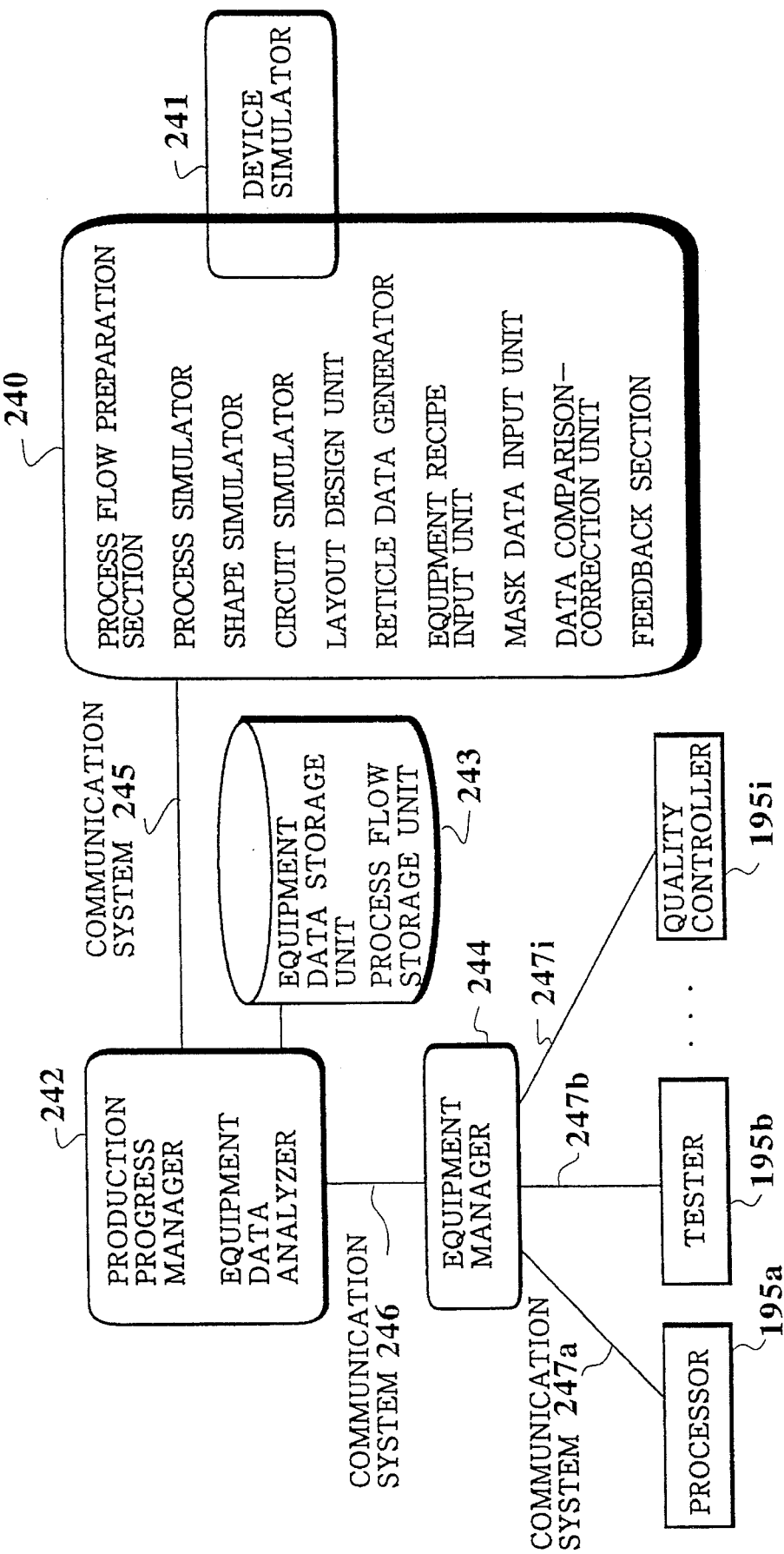
FIG. 93 shows a hardware arrangement of the system of FIG. 1.

FIG. 93 shows only an example of hardware arrangement of the production management system according to the present invention. The present invention is not limited to this arrangement.

A computer 240 such as an engineering work station (EWS) realizes the process flow preparation section 1, process simulator 60, shape simulator 61, device simulator 63, circuit simulator 70, layout design unit 71, reticle data generator 72, mask data input unit 73, equipment recipe input unit 190, and correction-comparison-feedback unit 229. If the capacity of the computer 240 is insufficient to achieve all of these elements, they may be distributed to a plurality of computers. In particular, the device simulator 63, circuit simulator 70, and layout design unit 71 involve a lot of computation so that they may be achieved in a separate computer 241. The computers 240 and 241 must be connected to each other through a communication system such as a LAN.

If the computer 240 has sufficient capacity, the process flow storage unit 191, production progress manager 192, equipment data storage unit 196, and equipment data analyzer 228 may be realized in the computer 240. In FIG. 93, the units 192 and 228 are realized in a separate computer 242 and the units 191 and 196 are realized in a storage unit 243 such as a hard disk.

In FIG. 93, the equipment manager 194 is in a separate computer 244. It may be realized in the computer 242. The computer 242 is connected to processing equipment and testers through communication systems.

When the system of the present invention is distributed to a plurality of computers as shown in FIG. 93, the computers must be connected to one another through the communication systems 245, 246, and 247a to 247i to communicate data among them.

Figure 94A:
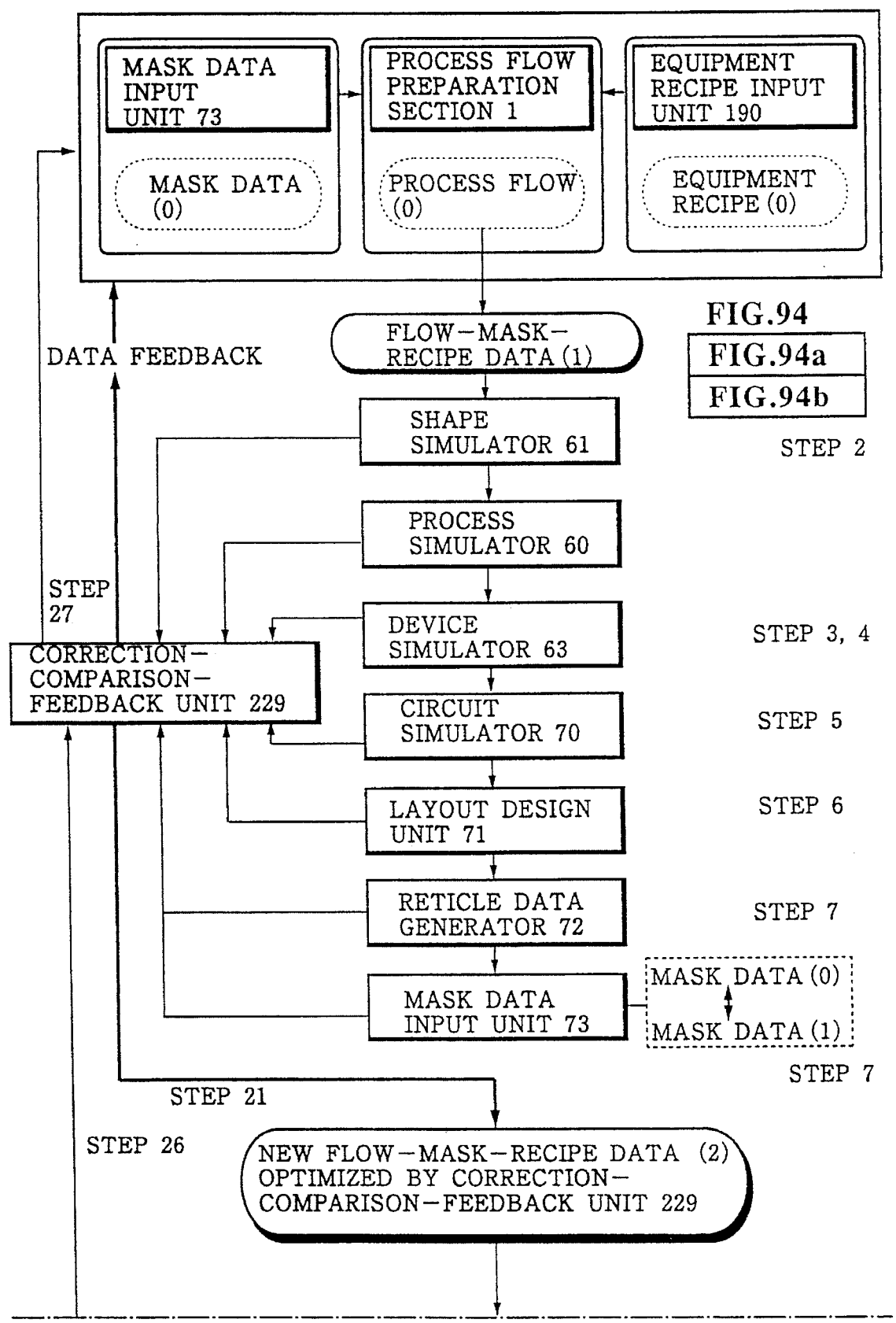
FIGS. 94a and 94b show a flow of data in the system of FIG. 1.
Figure 94B:
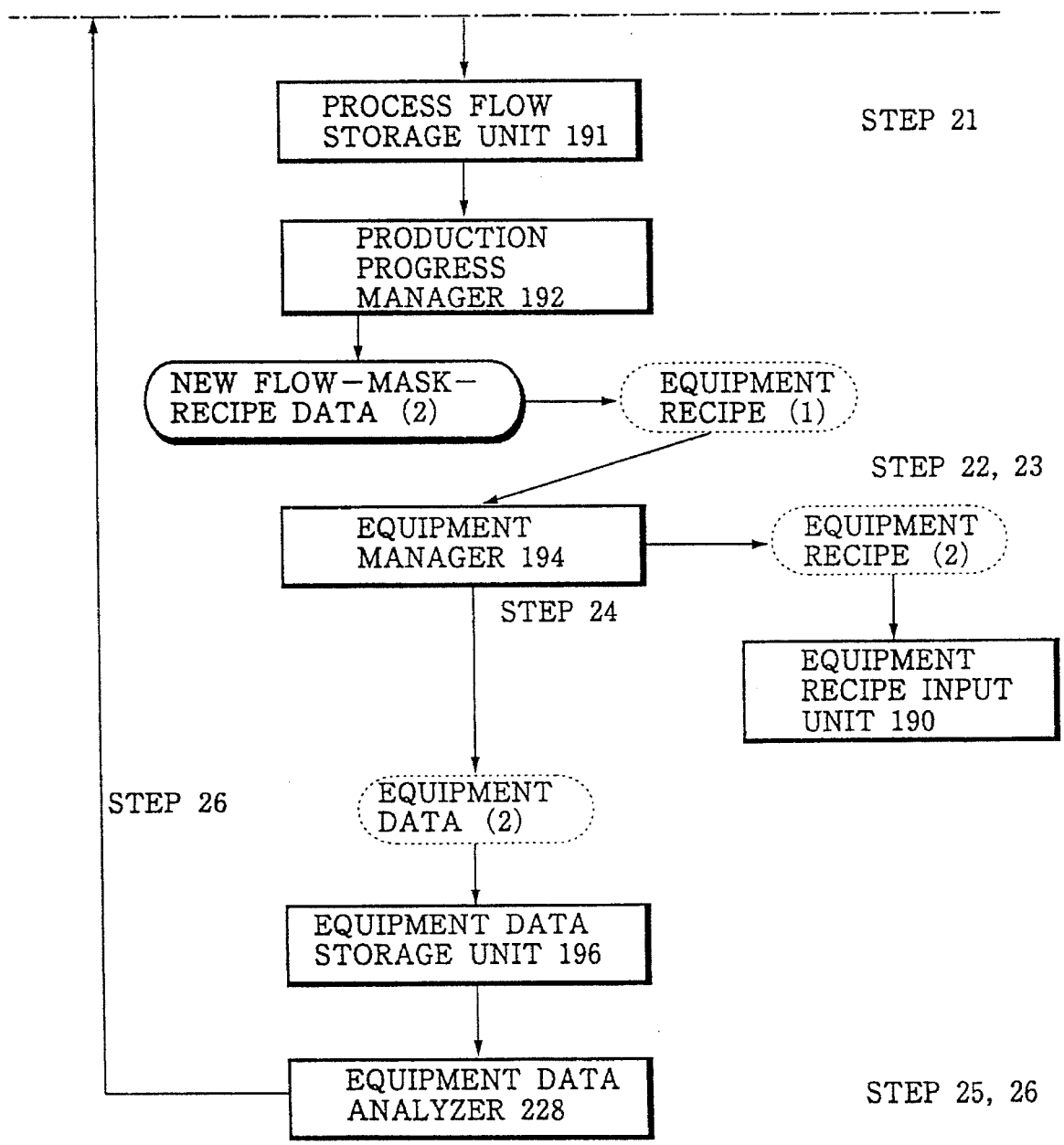

A flow of data and functions of the present invention will be explained with reference to FIGS. 1 and 94.

Step 01: The process flow preparation section 1 prepares a process flow (0), the mask data input unit 73 provides mask data (0), and the equipment recipe input unit 190 provides an equipment recipe (0). These data are gathered into flow-mask-recipe data (1).

Step 02: The flow-mask-recipe data (1) is transferred to the process simulator 60 and shape simulator 61.

Step 03: Simulation results from the simulators 60 and 61 are sent to the device simulator 63, which simulates the device characteristics of the data (1). The simulation results are also sent to the correction-comparison-feedback unit 229, which determines whether or not required results have been obtained. If the simulation results differ from the required results, the step 01 is repeated to let the section 1 correct the process flow, to provide new flow-mask-recipe data (1').

Step 04: A simulation result from the device simulator 63 is sent to the circuit simulator 70. The simulation result from the simulator 63 is also sent to the correction-comparison-feedback unit 229, to repeat the operations from the step 01 if necessary.

Step 05: A simulation result from the circuit simulator 70 is sent to the layout design unit 71. The simulation result from the simulator 70 is also sent to the correction-comparison-feedback unit 229, to repeat the operations from the step 01 if necessary.

Step 06: A result from the layout design unit 71 is sent to the reticle data generator 72. The result from the unit 71 is also sent to the correction-comparison-feedback unit 229, to repeat the operations from the step 01 if necessary.

Step 07: Reticle data generated by the reticle data generator 72 is sent to the mask data input unit 73. If the reticle data differs from previous mask data (0), it is updated to new mask data (1).

The steps 01 to 07 are repeated until a best process flow is obtained.

Step 21: Flow-mask-recipe data (2) prepared through the steps 01 to 07 and accepted by the correction-comparison-feedback unit 229 or by an operator is transferred to the process flow storage unit 191.

Step 22: The process flow stored in the process flow storage unit 191 is sent to the corresponding equipment manager 194 through the production progress manager 192 and cell manager 193, to process corresponding products.

Step 23: The flow-mask-recipe data (2) transferred to the equipment manager 194 is converted into one having an executable format and sent to processing equipment and testers. If the original equipment recipe (1) is changed, the equipment manager 194 transfers a new equipment recipe (2) to the equipment recipe input unit 190 to update the equipment recipe (1).

Step 24: After the completion of processes, all equipment data (2) generated are stored in the equipment data storage unit 196 through the equipment manager 194.

Step 25: The equipment data (2) in the equipment data storage unit 196 are analyzed by the equipment data analyzer 228, or are subjected to computations that are not specified by the present invention.

Step 26: The equipment data (2) and an analysis result (2) provided by the analyzer 228 are sent to the correction-comparison-feedback unit 229, and compared with the simulation results provided by the steps 02 to 05.

Step 27: If the step 26 finds deviations, a result of the comparison is fed back to the simulators 60 to 70. The comparison result is also used by the process flow preparation section 1 to correct the flow-mask-recipe data (2) and prepare new flow-mask-recipe data (3). Then, the operations are repeated from the step 21.

Steps 01 to 07 and 21 to 27 are repeated to efficiently manufacture best products.

As explained above, a production management system according to the present invention carries out many simulations to prepare an optimum process flow before actually processing products. This system simplifies an optimization of process conditions, to thereby reduce a delivery period of products.

The system compares the actual film thicknesses, film resistance values, transistor threshold voltages, and electric characteristics of products with simulation results, to improve simulation accuracy.

This system smoothly exchanges data between actual production and simulation, to improve efficiency in manufacturing new products and in changing process conditions.

Various modifications will become possible for those skilled in the art after receiving the teachings of the present disclosure without departing from the scope thereof.

What is claimed is:

1. A system for automatically producing semiconductor products, comprising:

means for preparing a process flow containing a series of processes and process conditions for producing different semiconductor products in different quantities in a production line;

means for simulating the producing of semiconductor products according to the process flow;

means for feeding a result of the simulation back to said process flow preparation means, which optimizes the process flow according to the simulation result; and means for producing semiconductor products according to the optimized process flow, the process flow preparation unit including a code management table for hierarchically managing codes and variables that are used to specify processes and process conditions in a process flow.

2. The system according to claim 1, wherein said feedback means analyzes products produced by said production means, compares a result of the analysis with the simulation result, and adjusts said simulation means according to a result of the comparison.

3. The system according to claim 2, wherein said feedback means includes:

an equipment data analyzer for analyzing and managing the data provided by the equipment data storage unit; and a correction-comparison-feedback unit for comparing simulation results provided by said simulation means with actual data provided by said production means, corrects the simulation results, and feeds them back to said process flow preparation means.

4. The system according to claim 1, wherein said process flow preparation means includes:

a unit for preparing the process flow;

a converter for converting the process flow into one that is processible by said simulation means;

a first checker for checking the process flow;

a second checker for checking the process flow;

a data generator for converting the process flow checked by the first and second checkers into one that is processible by said production means; and a verify unit for verifying the process flow provided by the data generator.

5. The system according to claim 4, wherein the process flow preparation unit includes:

attribute management tables each for managing the attributes of one of the codes and variables;

a variable manager for managing relationships between the code management table and the attribute management tables;

a data selector for selecting codes and variables from the code management table; and a display unit for displaying the selected codes and variables as well as a process flow formed of the selected codes and variables.

6. The system according to claim 4, wherein the converter includes:

a code conversion table for managing relationships between a process flow for production management and a process flow for simulation;

a data converter for converting a process flow for production management into a process flow for simulation according to the code conversion table;

a recipe file for storing equipment operating conditions used for simulation; and a recipe adder for adding the equipment operating conditions to the process flow for simulation.

7. The system according to claim 4, wherein the first checker includes:

a process flow input unit for loading the process flow from an external storage unit to a main memory;

a branch data generator for finding branching processes in the process flow, and if there is any branching process, preparing branch data to allot products to branches;

a layer data generator for loading a mask data management table to the main memory and preparing layer data according to the table, the mask data management table managing mask pattern dimensions and resists that are needed by lithography process;

a film structure management table for managing two-dimensional film structures deposited on the face and back of each product, according to the layer data;

a film structure checker for determining whether or not the structure of a film stipulated in an etching process in the process in the process flow is equal to the structure of a film actually deposited on a product;

a wafer surface condition management table for managing processes that are permitted or prohibited on a film exposed on the wafer surface of a product;

a wafer surface checker for checking the wafer surface of a product according to the face condition management table;

a back condition management table for managing processes that are permitted or prohibited on a film exposed on the back of a product;

a back checker for checking the back of a product according to the back condition management table;

a substrate condition management table for managing processes that are permitted or prohibited on films deposited on a product;

a substrate checker for checking a product according to the substrate condition management table;

a diffusion condition management table for ranking and managing the contamination levels of diffusion furnaces;

a diffusion checker for checking the process flow according to the diffusion condition management table;

a package condition management table for managing processes that are permitted or prohibited in a package of processes;

a package checker for checking the process flow according to the package condition management table;

a sequence management table for managing a sequence of processes;

a sequence checker for checking the process flow according to the sequence management table;

an off-routine management table for managing unauthorized processes and processes that must not be carried out after a given process;

an off-routine checker for checking the process flow according to the off-routine management table;

a test piece management table for managing the insertion position, extracting position, and kind of a test piece;

a test piece checker for checking the process flow according to the test piece management table;

a chain process management table for managing processes that must be continuously carried out;

a chain process checker for checking the process flow according to the chain process management table;

an error code management table for managing error messages;

an error message generator for generating error messages according to the error code management table;

a check management table for managing whether or not the above-mentioned checkers are activated;

a decision unit for selecting checkers to be activated according to the check management table; and a result output unit for providing results of the check operations of the checkers.

8. The system according to claim 4, wherein the second checker includes:

a process flow storage unit for storing the process flow;

a process data table for storing process data corresponding to process conditions;

a process data generator for retrieving proper process data from the process data table according to the process conditions contained in the process flow;

a state data generator for simulating the processing state of each product according to the process data and process flow;

an output data table for storing error data corresponding to process conditions; and an output data generator for comparing the data provided by the process data generator with the output data table, to find errors in the process flow and providing an error output if there is any error.

9. The system according to claim 8, wherein the process data table manages combinations of process conditions and the summary of each of the combinations.

10. The system according to claim 8, further comprising:

a supplementary data table for storing supplementary data for each specific process condition and a way of obtaining the supplementary data; and a process flow converter for adding proper supplementary data to a corresponding process condition contained in the process flow according to the supplementary data table.

11. The system according to claim 4, wherein the data generator includes:

a table for relating the process flow to character data;

a converter for converting the process flow into character data according to the table;

a character data sorter for sorting the character data into a specified format; and an output unit for providing the sorted character data.

12. The system according to claim 4, wherein the verify unit includes:

a data input unit for receiving the process flow;

a data analyzer for determining whether or not the process flow has an error;

an error output unit for providing error information if the data analyzer finds any error;

an error transfer unit for transferring the error information to the process flow preparation unit;

a data fetcher for fetching the process flow if the data analyzer finds no error therein;

a progress prediction unit for predicting production progress in each equipment;

a production condition tester for examining the process flow, the predicted production progress, and the product and equipment data provided by said production means and determining whether or not products stipulated in the process flow are allowed to be charged to the production line;

a product decision unit for determining products to be charged to the production line according to the determination of the production condition tester;

a data sorter for sorting the products to be charged in the process flow; and a data transfer unit for transferring the process flow with the products to be charged to said production means.

13. The system according to claim 1, wherein said simulation means includes:

a process simulator for simulating an impurity distribution according to the process flow;

a shape simulator for simulating the surface shapes of each product according to the process flow;

a device simulator for simulating the characteristics of circuit elements of each product according to the process flow; and a CAD unit.

14. The system according to claim 13, wherein the CAD unit includes:

a circuit simulator for simulating the operations of circuits of each product according to the process flow;

a layout design unit for designing an optimum circuit layout according to results of the simulations;

a reticle data generator for generating reticle data according to the circuit layout; and a mask data input unit for storing the reticle data as mask data.

15. The system according to claim 1, wherein said production means includes an equipment recipe input unit, a process flow storage unit, a production progress manager, a cell manager, an equipment manager, a group of processing equipment, and an equipment data storage unit, the equipment recipe input unit reading an equipment recipe from the equipment manager and transferring it to said process flow preparation means, the process flow storage unit storing a process flow provided by said process flow preparation means before it is used by the production progress manager, the production progress manager receiving the process flow from the process flow storage unit, managing a flow of processes and process conditions according to the process flow, and sequentially transferring process data to the processing equipment according to the process flow, so that products are correctly processes, the equipment manager managing the equipment and providing their recipes according to the process flow, the equipment data storage unit storing all data provided by the equipment manager.

16. A system for automatically producing semiconductor products, comprising:

means for preparing a process flow containing a series of processes and process conditions for producing different semiconductor products in different quantities in a production line;

means for simulating the producing of semiconductor products according to the process flow;

means for feeding a result of the simulation back to said process flow preparation means, which optimizes the process flow according to the simulation result; and means for producing semiconductor products according to the optimized process flow, said process flow preparation means including:

a unit for preparing the process flow;

a converter for converting the process flow into one that is processible by said simulation means;

a first checker for checking the process flow;

a second checker for checking the process flow;

a data generator for converting the process flow checked by the first and second checkers into one that is processible by said production means; and a verify unit for verifying the process flow provided by the data generator, said first checker including:

a film structure checker for determining whether or not the structure of a film stipulated in an etching process in the process flow is equal to the structure of a film actually deposited on a product; and a wafer surface checker for checking the wafer surface of a product according to a wafer surface condition management table.

17. A system for automatically producing semiconductor products, comprising:

means for preparing a process flow containing a series of processes and process conditions for producing different semiconductor products in different quantities in a production line;

means for simulating the producing of semiconductor products according to the process flow;

means for feeding a result of the simulation back to said process flow preparation means, which optimizes the process flow according to the simulation result; and means for producing semiconductor products according to the optimized process flow, said process flow preparation means including:

a unit for preparing the process flow;

a converter for converting the process flow into one that is processible by said simulation means;

a first checker for checking the process flow;

a second checker for checking the process flow;

a data generator for converting the process flow checked by the first and second checkers into one that is processible by said production means; and a verify unit for verifying the process flow provided by the data generator, said first checker including:

a film structure checker for determining whether or not the structure of a film stipulated in an etching process in the process flow is equal to the structure of a actually deposited on a product;

a wafer surface checker for checking the wafer surface of a product according to a wafer surface condition management table;

a process flow input unit for loading the process flow from an external storage unit to a main memory;

a branch data generator for finding branching processes in the process flow, and if there is any branching process, preparing branch data to allot products to branches;

a layer data generator for loading a mask data management table to the main memory and preparing layer data according to the table, the mask data management table managing mask pattern dimensions and resists that are needed by lithography process;

a film structure management table for managing two-dimensional film structures deposited on the wafer surface and back of each product, according to the layer data;

a wafer surface condition management table for managing processes that are permitted or prohibited on a film exposed on the wafer surface of a product;

a back condition management table for managing processes that are permitted or prohibited on a film exposed on the back of a product;

a back checker for checking the back of a product according to the back condition management table;

a substrate condition management table for managing processes that are permitted or prohibited on films deposited on a product;

a substrate checker for checking a product according to the substrate condition management table;

a diffusion condition management table for ranking and managing the contamination levels of diffusion furnaces;

a diffusion checker for checking the process flow according to the diffusion condition management table;

a package condition management table for managing processes that are permitted or prohibited in a package of processes;

a package checker for checking the process flow according to the package condition management table;

a sequence management table for managing a sequence of processes;

a sequence checker for checking the process flow according to the sequence management table;

an off-routine management table for managing unauthorized processes and processes that must not be carried out after a given process;

an off-routine checker for checking the process flow according to the off-routine management table;

a test piece management table for managing the insertion position, extracting position, and kind of a test piece;

a test piece checker for checking the process flow according to the test piece management table;

a chain process management table for managing processes that must be continuously carried out;

a chain process checker for checking the process flow according to the chain process management table;

an error code management table for managing error messages;

an error message generator for generating error messages according to the error code management table;

a check management table for managing whether or not the above-mentioned checkers are activated;

a decision unit for selecting checkers to be activated according to the check management table; and a result output unit for providing results of the check operations of the checkers.

18. A system for automatically producing semiconductor products, comprising:

means for preparing a process flow containing a series of processes and process conditions for producing different semiconductor products in different quantities in a production line;

means for simulating the producing of semiconductor products according to the process flow;

means for feeding a result of the simulation back to said process flow preparation means, which optimizes the process flow according to the simulation result; and means for producing semiconductor products according to the optimized process flow, said process flow preparation means including:

a unit for preparing the process flow, a converter for converting the process flow into one that is processible by said simulation means;

a first checker for checking the process flow;

a second checker for checking the process flow;

a data generator for converting the process flow checked by the first and second checkers into one that is processible by said production means; and a verify unit for verifying the process flow provided by the data generator, said first checker including:

a diffusion checker for checking the process flow according to the diffusion condition management table; and a package checker for checking the process flow according to the package condition management table.

19. A system for automatically producing semiconductor products, comprising:

means for preparing a process flow containing a series of processes and process conditions for producing different semiconductor products in different quantities in a production line;

means for simulating the producing of semiconductor products according to the process flow;

means for feeding a result of the simulation back to said process flow preparation means, which optimizes the process flow according to the simulation result; and means for producing semiconductor products according to the optimized process flow, said process flow preparation means including a data generator comprising:

a table for relating the process flow to character data;

a converter for converting the process flow into character data according to the table;

a character data sorter for sorting the character data into a specified format; and an output unit for providing the sorted character data.

20. The system according to claim 19 wherein said process flow preparation means comprises:

a unit for preparing the process flow;

a converter for converting the process flow into one that is processible by said simulation means;

a first checker for checking the process flow; a second checker for checking the process flow; and a verify unit for verifying the process flow provided by the data generator.

21. A system for automatically producing semiconductor products, comprising:

means for preparing a process flow containing a series of processes and process conditions for producing different semiconductor products in different quantities in a production line;

means for simulating the producing of semiconductor products according to the process flow;

means for feeding a result of the simulation back to said process flow preparation means, which optimizes the process flow according to the simulation result; and means for producing semiconductor products according to the optimized process flow, said process flow preparation means including:

a unit for preparing the process flow;

a converter for converting the process flow into one that is processible by said simulation means;

a first checker for checking the process flow; a second checker for checking the process flow;

a data generator for converting the process flow checked by the first and second checkers into one that is processible by said production means; and a verify unit for verifying the process flow provided by the data generator, said verify unit including:

a data input unit for receiving the process flow; a data analyzer for determining whether or not the process flow has an error;

an error output unit for providing error information if the data analyzer finds any error;

an error transfer unit for transferring the error information to the process flow preparation unit;

a data fetcher for fetching the process flow if the data analyzer finds no error therein;

a progress prediction unit for predicting production progress in each equipment;

a production condition tester for examining the process flow, the predicted production progress, and the product and equipment data provided by said production means and determining whether or not products stipulated in the process flow are allowed to be charged to the production line;

a product decision unit for determining products to be charged to the production line according to the determination of the production condition tester;

a data sorter for sorting the products to be charged in the process flow; and a data transfer unit for transferring the process flow with the products to be charged to said production means.

22. The system according to claim 21, wherein the production condition tester includes:

a production capacity checker for comparing a theoretical production capacity of each equipment specified by the process flow with an actual production capacity of the equipment predicted by the progress prediction unit; and a retention time checker for comparing a theoretical retention time of a product in the equipment with an actual retention time.

23. The system according to claim 21, wherein the product decision unit compares an allowable number of products processible by each equipment with an actual number of products that are being processed by the equipment, to find a marginal number of products processible by the equipment, and then compares the marginal number with the number of products to be charged to the equipment, to determine the number of products that can be actually charged to the equipment, the determined number being informed to said production means.

24. A system for automatically producing semiconductor products, comprising:

means for preparing a process flow containing a series of processes and process conditions for producing different semiconductor products in different quantities in a production line;

means for simulating the producing of semiconductor products according to the process flow;

means for feeding a result of the simulation back to said process flow preparation means, which optimizes the process flow according to the simulation result; and means for producing semiconductor products according to the optimized process flow, said process flow preparation means including:

a unit for preparing the process flow, a converter for converting the process flow into one that is processible by said simulation means;

a first checker for checking the process flow;

a second checker for checking the process flow;

a data generator for converting the process flow checked by the first and second checkers into one that is processible by said production means;

a verify unit for verifying the process flow provided by the data generator;

a code management table for hierarchically managing codes and variables that are used to specify processes and process conditions in a process flow;

attribute management tables each for managing the attributes of one of the codes and variables;

a variable manager for managing relationships between the code management table and the attribute management tables;

a data selector for selecting codes and variables from the code management table; and a display unit for displaying the selected codes and variables as well as a process flow formed of the selected codes and variables.

* * * * *